(12) United States Patent
Takenaka et al.

(10) Patent No.: US 8,467,948 B2
(45) Date of Patent: Jun. 18, 2013

(54) OMNIDIRECTIONAL MOVING BODY OPERATION SYSTEM AND OMNIDIRECTIONAL MOVING BODY OPERATION METHOD

(75) Inventors: Toru Takenaka, Wako (JP); Kazushi Akimoto, Wako (JP); Hideo Murakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 13/247,004

(22) Filed: Sep. 28, 2011

(65) Prior Publication Data
US 2012/0078482 A1    Mar. 29, 2012

(30) Foreign Application Priority Data

Sep. 29, 2010 (JP) ................. 2010-218220
Sep. 29, 2010 (JP) ................. 2010-219412
Sep. 29, 2010 (JP) ................. 2010-219413

(51) Int. Cl.
*G06F 19/00* (2011.01)
(52) U.S. Cl.
USPC .................... 701/70; 701/23; 701/22; 701/42
(58) Field of Classification Search
USPC ......................... 701/22, 23, 42, 70
See application file for complete search history.

(56) References Cited

U.S. PATENT DOCUMENTS

| | | | |
|---|---|---|---|
| 7,730,978 B2 * | 6/2010 | Dixon | 180/7.1 |
| 7,980,336 B2 | 7/2011 | Takenaka et al. | |
| 7,987,029 B2 * | 7/2011 | Takenaka et al. | 701/33.8 |
| 8,386,159 B2 * | 2/2013 | Takenaka et al. | 701/124 |
| 2009/0051136 A1 * | 2/2009 | Yamada et al. | 280/205 |
| 2009/0187302 A1 * | 7/2009 | Takenaka et al. | 701/29 |
| 2009/0319114 A1 * | 12/2009 | Takenaka et al. | 701/29 |
| 2010/0042256 A1 * | 2/2010 | Takenaka et al. | 700/245 |
| 2010/0096905 A1 | 4/2010 | Takenaka et al. | |
| 2011/0071714 A1 * | 3/2011 | Takenaka | 701/22 |

FOREIGN PATENT DOCUMENTS

| | | |
|---|---|---|
| JP | 3070015 B2 | 7/2000 |
| WO | 2008/132778 A1 | 11/2008 |
| WO | 2008/132779 A1 | 11/2008 |

* cited by examiner

*Primary Examiner* — Mary Cheung
*Assistant Examiner* — Michael Berns
(74) *Attorney, Agent, or Firm* — Carrier Blackman & Associates, P.C.; Joseph P. Carrier; William D. Blackman

(57) ABSTRACT

A vehicle target velocity calculator of an omnidirectional moving body converts a manipulated vector which is a manipulated variable of the omnidirectional moving body instructed by an operator by using an operation portion of an operation device to a manipulated vector of the omnidirectional moving body in the relative coordinate system based on an angle difference between the presence direction of the omnidirectional moving body detected by the operation device sensor unit and the presence direction of the operation device detected by the vehicle sensor unit, and determines the target moving velocity vector according to the converted manipulated vector. The wheel velocity command calculator instructs a wheel drive unit to drive the base body according to this target moving velocity vector.

14 Claims, 34 Drawing Sheets

US 8,467,948 B2

OMNIDIRECTIONAL MOVING BODY OPERATION SYSTEM AND OMNIDIRECTIONAL MOVING BODY OPERATION METHOD

The present application claims priority on Japanese Patent Application No. 2010-218220, filed on Sep. 29, 2010, Japanese Patent Application No. 2010-219412, filed on Sep. 29, 2010, and Japanese Patent Application No. 2010-219413, filed on Sep. 29, 2010, the content of which is incorporated herein by reference.

BACKGROUND OF THE INVENTION

1. Field of the Invention

The present invention relates to the omnidirectional moving body operation system and the omnidirectional moving body operation method.

2. Description of the Related Art

Traditionally, in a case of operating an inverted pendulum type vehicle, the inverted pendulum type vehicle is configured to be mounted with the operation device and to operate corresponding to input to the operation device by the passenger (rider) (e.g., reference to Japanese Patent No. 3070015).

In the technology of this Japanese Patent No. 3070015, since the operator rides on the inverted pendulum type vehicle and the operator performs operating by using a Joystick provided in a frame of the inverted pendulum type vehicle, the relative relationship between the operating direction of the Joystick and the direction to move the inverted pendulum type vehicle is consistently not changed, thus the operation is simple. Meanwhile, in a case of operating the omnidirectional moving body such as the inverted pendulum type vehicle without riding thereon, if the relative relationship between the progressing direction instructed by a remote controller and the direction to move the omnidirectional moving body is stationary, the direction instructed is necessary to be changed corresponding to the direction to progress viewed from the operator and the present direction of the omnidirectional moving body. When remotely operating the vehicle where the front and rear thereof are specifically distinguished, the operator may easily associate the direction to move the vehicle with the progressing direction instructed by the remote controller to move the vehicle to that direction. However, since the omnidirectional moving body may progress toward the fore-and-aft and lateral directions without circling, it is difficult to find out which direction is the front direction thereof in the present, particularly, if an external appearance thereof where the front and rear are not specifically distinguished, the difficulty is noticeable. Therefore, the operator may not easily associate the direction to move the omnidirectional moving body and the direction instructed by the remote controller to move the omnidirectional moving body in that direction, thus the operation requires time.

An object of the present invention is to provide the omnidirectional moving body operation system and the omnidirectional moving body operation method which may easily and remotely operate the omnidirectional moving body by way of the operation device.

SUMMARY OF THE INVENTION (1) According to a first aspect of the present invention, an omnidirectional moving body operation system comprises: an omnidirectional moving body; and an operation device that communicates with the omnidirectional moving body and operates the omnidirectional moving body, wherein: the operation device includes a manipulated variable generator that generates an manipulated variable which is a manipulated vector related to a movement of a base body provided in the omnidirectional moving body, and a manipulated variable transmitter that transmits the manipulated variable generated by the manipulated variable generator; the omnidirectional moving body includes the base body, a drive portion that is connected to the base body and is capable of omnidirectionally driving the base body in the driving surface, a manipulated variable receiver that receives the manipulated variable transmitted by the manipulated variable transmitter, and a drive control unit that controls the drive portion by using the manipulated variable received by the manipulated variable receiver; the omnidirectional moving body operation system further comprises: a detector that detects the relative relationship between a direction of the omnidirectional moving body and a direction of the operation device, and a manipulated variable converter that converts the manipulated variable from the coordinate system used in the operation device to the coordinate system used in the omnidirectional moving body based on the relative relationship between the direction of the omnidirectional moving body detected by the detector and the direction of the operation device.

As a result, when the operator controls the omnidirectional moving body by way of the operation device such as the remote controller, the manipulated variable converter converts the manipulated variable of the omnidirectional moving body generated by the operation generator of the operation device operated by the operator based on the relative relationship between the direction of the omnidirectional moving body detected by the detector and the direction of the operation device to be the manipulated variable corresponding to the direction of the omnidirectional moving body, and the drive control unit instructs the drive portion to drive the base body of the omnidirectional moving body according to the converted manipulated variable.

(2) According to (1) above, the drive control unit may have a target moving velocity vector generator that generates a target moving velocity vector of the omnidirectional moving body from the manipulated variable converted by the manipulated variable converter; and the target moving velocity vector generator may generate the target moving velocity vector so as to be the same direction as the direction of the manipulated vector generated by the manipulated variable generator in the absolute coordinate system.

As a result, when generating the target moving velocity vector for driving the omnidirectional moving body from the manipulated variable generated by the manipulated variable generator based on the operation by the operator, the drive control unit generates so that a target progressing direction of the omnidirectional moving body indicated by the target moving velocity vector and the manipulated variable generated by the manipulated variable generator are the same as in the absolute coordinate system.

(3) According to (1) above, the omnidirectional moving body may further include a sensor unit that detects a tilting movement of the base body; and the drive control unit calculates the manipulated variable of the base body based on the detection result of the sensor unit, adds the calculated manipulated variable and the manipulated variable converted by the manipulated variable converter, and controls the drive portion by using the addition resultant manipulated variable.

As a result, using the inverted pendulum type moving body as the omnidirectional moving body, the moving direction of the inverted pendulum type moving body is controlled to add the manipulated variable of the direction instructed by the operator by using the operation device to the manipulated variable autonomously determined by the inverted pendulum type moving body based on the tilting of the base body thereof.

(4) According to a second aspect of the present invention, an omnidirectional moving body operation method used for the omnidirectional moving body operation system that comprises an omnidirectional moving body, and an operation device that communicates with the omnidirectional moving body operates the omnidirectional moving body, the omnidirectional moving body includes a base body, and a drive portion that is connected to the base body and is capable of omnidirectionally driving the base body in a driving surface, the method comprises: generating a manipulated variable which is a manipulated vector related to the movement of the base body provided in the omnidirectional moving body; communicating the generated manipulated variable; controlling the drive portion by using the communicated manipulated variable; detecting the relative relationship between the direction of the omnidirectional moving body and the direction of the operation device; and converting the manipulated variable from the coordinate system used in the operation device to the coordinate system used in the omnidirectional moving body based on the relative relationship between the detected direction of the omnidirectional moving body and the detected direction of the operation device.

In this omnidirectional moving body operation method, when the operator controls the omnidirectional moving body with the operation device such as the remote controller, the omnidirectional moving body operation system converts the manipulated variable of the omnidirectional moving body generated by the operation device operated by the operator based on the relative relationship between the detected direction of the omnidirectional moving body and the direction of the operation device to be the manipulated variable corresponding to the direction of the omnidirectional moving body, and the omnidirectional moving body instructs the drive portion to drive the base body according to the converted manipulated variable.

(5) According to a third aspect of the present invention, an omnidirectional moving body operation system comprises: an omnidirectional moving body; an operation device with which an operator controls the omnidirectional moving body; a detector that detects the relative relationship among the position of the omnidirectional moving body, the position of the operator and the position of the operation device; a manipulated variable generator that generates a manipulated variable which is a manipulated vector related to a movement of a base body provided in the omnidirectional moving body based on the relative relationship among the position of the omnidirectional moving body, the position of the operator and the position of the operation device detected by the detector, wherein the omnidirectional moving body includes: the base body; a drive portion that is connected to the base body and is capable of omnidirectionally driving the base body in a driving surface; and a drive control unit controls the drive portion by using the manipulated variable generated by the manipulated variable generator.

In this omnidirectional moving body operation system, when the operator controls the omnidirectional moving body with the operation device such as the remote controller, the manipulated variable generator calculates the target position of the moving body based on the relative relationship between the position of the operator and the position of the operation device and generates the manipulated variable which is the manipulated vector of the omnidirectional moving body from the relative relationship between the position of the omnidirectional moving body and that target position, and the drive control unit of the moving body instructs the drive portion to drive the base body of the omnidirectional moving body according to the generated manipulated variable.

(6) According to (5) above, the manipulated variable generator may generate the manipulated variable so that distance between the operator and the omnidirectional moving body increases with increasing the distance between the operator and the operation device.

As a result, the drive control unit generates the manipulated variable of the omnidirectional moving body so that the moving target position of the moving body is the position farther from the operator with increasing the distance between the operator and the operation device detected by the detector.

(7) According to (5) or (6) above, the omnidirectional moving body further may include a sensor unit that detects a tilting movement of the base body; and the drive control unit may calculate the manipulated variable of the base body based on the detection result of the sensor unit, adds the calculated manipulated variable and the manipulated variable generated by the manipulated variable generator, and controls the drive portion by using the addition resultant manipulated variable.

As a result, using the inverted pendulum type moving body as the omnidirectional moving body, the moving direction of the inverted pendulum type moving body is controlled to add the manipulated variable of the direction instructed by the operator by using the operation device to the manipulated variable autonomously determined by the inverted pendulum type moving body based on the tilting of the base body thereof.

(8) According to a fourth aspect of the present invention, an omnidirectional moving body operation method used for the omnidirectional moving body operation system that comprises an omnidirectional moving body; and an operation device with which an operator controls the omnidirectional moving body, the omnidirectional moving body includes a base body, and a drive portion that is connected to the base body and is capable of omnidirectionally driving the base body in a driving surface, the method comprises: detecting the relative relationship among the position of the omnidirectional moving body, the position of the operator and the position of the operation device; generating a manipulated variable which is a manipulated vector related to the movement of the base body based on the relative relationship among the position of the detected omnidirectional moving body, the position of the operator and the position of the operation device; and controlling the drive portion by using the generated manipulated variable.

In this omnidirectional moving body operation method, when the operator controls the omnidirectional moving body with the operation device such as the remote controller, the omnidirectional moving body operation system calculates the target position of the moving body based on the relative relationship between the position of the operator and the position of the operation device and generates the manipulated variable which is the manipulated vector of the omnidirectional moving body from the relative relationship between the position of the omnidirectional moving body and that target position, and the omnidirectional moving body instructs the drive portion to drive the base body by this generated manipulated variable.

(9) According to a fifth aspect of the present invention, an omnidirectional moving body operation system comprises an omnidirectional moving body, and an operation device that communicates with the omnidirectional moving body and operates the omnidirectional moving body, wherein: the operation device includes a manipulated variable generator that outputs a manipulated variable related to a movement of a base body provided in the omnidirectional moving body, and a manipulated variable transmitter that transmits the manipulated variable output by the manipulated variable generator; the omnidirectional moving body includes the base body, a drive portion that is connected to the base body and is capable of omnidirectionally driving the base body in a driving surface, a manipulated variable receiver that receives the manipulated variable transmitted by the manipulated variable transmitter, and a drive control unit that controls the drive portion by using the manipulated variable received by the manipulated variable receiver; the omnidirectional moving body operation system further comprises a detector that detects a relative position relationship between an operation body reference position, which indicates a reference position for operating the omnidirectional moving body, and the omnidirectional moving body; and the manipulated variable indicates a movement to a target position, which is represented in a coordinate system where an origin thereof is the operation body reference position, with respect to the relative position relationship detected by the detector.

In this omnidirectional moving body operation system, when the operator controls movement of the omnidirectional moving body with the operation device such as the remote controller, it is possible to acquire the relative position relationship (the vehicle position) of the omnidirectional moving body with respect to the operation body reference position, convert the target position with the operation device into the same polar coordinate system as the vehicle position according to this acquired relative position relationship, and determine the moving direction and velocity of the omnidirectional moving body.

(10) According to (9) above, the manipulated variable may represent the target position in a polar coordinate system where an origin thereof is the operation body reference position.

As a result, when generating the target moving velocity vector for driving the omnidirectional moving body from the manipulated variable output by the manipulated variable unit based on the operation by the operator, the drive control unit can determine the direction and distance of the target position with respect to the operation body reference position corresponding to the manipulated variable applied to the manipulated variable generator.

(11) According to (10) above, the detector may detect a presence position of the omnidirectional moving body as the relative position relationship in the polar coordinate system where the origin thereof is the operation body reference position.

As a result, when generating the target moving velocity vector for driving the omnidirectional moving body from the manipulated variable output by the manipulated variable unit based on the operation by the operator, the drive control unit can convert the target position with the operation device and the vehicle position into the same polar coordinate system and can determine the moving direction and velocity of the omnidirectional moving body.

(12) According to a sixth aspect of the present invention, an omnidirectional moving body operation system comprises an omnidirectional moving body, and an operation device that communicates with the omnidirectional moving body and operates the omnidirectional moving body, wherein: the operation device includes a manipulated variable generator that outputs a first manipulated variable for operating the distance between an operation body reference position, which represents a reference position for operating the omnidirectional moving body, and the omnidirectional moving body and a second manipulated variable for operating the direction of the omnidirectional moving body viewed from the operation body reference position as the manipulated variable related to the movement of the base body provided in the omnidirectional moving body, and a manipulated variable transmitter that transmits the first manipulated variable and the second manipulated variable output by the manipulated variable generator; and the omnidirectional moving body includes a base body, a drive portion that is connected to the base body and is capable of omnidirectionally driving the base body in a driving surface, a manipulated variable receiver that receives the first manipulated variable and the second manipulated variable transmitted by the manipulated variable transmitter, and a drive control unit that changes the distance between the operation body reference position and the omnidirectional moving body based on the first manipulated variable, and controls the drive portion to rotate the omnidirectional moving body about the operation body reference position based on the second manipulated variable; the omnidirectional moving body operation system further comprises a detector that detects a relative position relationship between the operation body reference position and the omnidirectional moving body; and the manipulated variable indicates a movement to a target position, which is represented in a coordinate system where an origin thereof is the operation body reference position, with respect to the relative position relationship detected by the detector.

In this omnidirectional moving body operation system, when generating the target moving velocity vector for driving the omnidirectional moving body from the manipulated variable output by the manipulated variable unit based on the operation by the operator, the drive control unit calculates the moving direction up to the target position in the polar coordinate system, thus the omnidirectional moving body may be controlled to rotate about the operation body reference position.

(13) According to a seventh aspect of the present invention, an omnidirectional moving body operation method which operates the omnidirectional moving body in an omnidirectional moving body operation system that comprises an omnidirectional moving body, and an operation device communicates with the omnidirectional moving body and operates the omnidirectional moving body, the method comprises: outputting a manipulated variable related to a movement of a base body provided in the omnidirectional moving body; communicating the manipulated variable; detecting a relative position relationship between an operation body reference position, which represents a reference position for operating the omnidirectional moving body, and the omnidirectional moving body; and performing an omnidirectional drive control of the base body in a driving surface based on the manipulated variable which represents a movement to a target position, which is represented in a coordinate system where an origin thereof is the operation body reference position, with respect to the detected relative position relationship.

In this omnidirectional moving body operation method, when the operator controls movement of the omnidirectional moving body with the operation device such as the remote controller, it is possible to acquire the relative position relationship (the vehicle position) of the omnidirectional moving body with respect to the operation body reference position, convert the target position with the operation device into the same polar coordinate system as the vehicle position according to this acquired relative position relationship, and determine the moving direction and velocity of the omnidirectional moving body.

The aspects according to (1) and (4) above converts the manipulated variable of the omnidirectional moving body instructed with the operation device by the operator based on the relative relationship between the direction of the omnidirectional moving body and the direction of the operation device to be the manipulated variable corresponding to the present direction of the omnidirectional moving body and drives the base body of the omnidirectional moving body according to this converted manipulated variable, thus it is not necessary to change the operation of the operation device at a time of instructing the progressing direction depending on the direction of the omnidirectional moving body. Therefore, the operator can remotely control the omnidirectional moving body by using the operation device by the simplified operation.

The aspect according to (2) above generates the target moving velocity vector so that the operating direction generated by the operation device operated by the operator and the direction where the omnidirectional moving body should be operated are the same as in the absolute coordinate system, thus even if whichever direction the omnidirectional moving body faces, the operator may always instruct the direction to move the omnidirectional moving body with viewing from the operator and may control the omnidirectional moving body by the simplified operation.

The aspect according to (3) above adds the manipulated variable for steering toward the direction instructed by the operator with the operation device with respect to the manipulated variable determined by the inverted pendulum type moving body based on the tilting of the base body and acquires the final manipulated variable, thus it is possible to control the inverted pendulum type moving body which moves to come close to the direction instructed by the operator.

The aspect according to (5) and (8) above acquires the manipulated variable from the relative relationship among the position of the omnidirectional moving body, the position of the operator and the position of the operation device and drives the base body of the omnidirectional moving body, thus the operator may remotely control the omnidirectional moving body while having the operation device by the simplified operation of moving in lateral directions or moving to come closer to or to get away from the body.

According to (6) above, the manipulated variable is generated so that the moving target position of the omnidirectional moving body is the position farther from the operator with increasing the distance between the operator and the operation device, thus the operator may control the distance between the omnidirectional moving body and the operator by the simplified operation of moving the operation device to come closer to or get away from the body.

According to (7) above, the final manipulated variable is acquired to add the manipulated variable for steering toward the direction instructed by the operator with the operation device with respect to the manipulated variable determined by the inverted pendulum type moving body based on the tilting of the base body, thus it is possible to control the inverted pendulum type moving body which moves to come close to the direction instructed by the operator.

According to (9) above, when the operator controls movement of the omnidirectional moving body with the operation device such as the remote controller, it is possible to acquire the relative position relationship (the vehicle position) of the omnidirectional moving body with respect to the operation body reference position, convert the target position with the operation device into the same polar coordinate system as the vehicle position according to this acquired relative position relationship, and determine the moving direction and velocity of the omnidirectional moving body. Therefore, it is not necessary to change the operation of the operation device at a time of instructing the progressing direction depending on the direction of the omnidirectional moving body. Therefore, the operator may remotely control the omnidirectional moving body by using the operation device by the simplified operation.

According to (10) above, when generating the target moving velocity vector for driving the omnidirectional moving body from the manipulated variable output by the manipulated variable unit based on the operation by the operator, the drive control unit determine the direction and distance of the target position with respect to the operation body reference position corresponding to the manipulated variable applied to the manipulated variable generator. Therefore, the azimuthal angle θ_des and the distance r_des which represent the target position in polar coordinates may be easily determined.

According to (11) above, when generating the target moving velocity vector for driving the omnidirectional moving body from the manipulated variable output by the manipulated variable unit based on the operation by the operator, the drive control unit may convert the target position with the operation device and the vehicle position into the same polar coordinate system and may determine the moving direction and velocity of the omnidirectional moving body. Therefore, the moving direction and velocity of the omnidirectional moving body may be easily determined by using the azimuthal angle θ_act and the distance r_act, which represent the vehicle position in polar coordinates and the azimuthal angle θ_des and the distance r_des which represent the target position.

According to (12) above, when generating the target moving velocity vector to drive the omnidirectional moving body from the manipulated variable output by the manipulated variable unit based on the operation by the operator, the drive control unit calculates the moving direction up to the target position in the polar coordinate system, thus the omnidirectional moving body may be controlled to rotate about the operation body reference position. Therefore, the omnidirectional moving body can move to rotate about the operator.

DETAILED DESCRIPTION OF THE PREFERRED EMBODIMENTS

[Explanation of a Basic Configuration and Movement of an Omnidirectional Vehicle to which the Present Invention is Applied]

First, an explanation of a basic configuration and movement of an omnidirectional vehicle to which the present invention is applied is provided below. The omnidirectional vehicle operational system (an omnidirectional vehicle operational system) according to the present invention comprises an operational device and the omnidirectional vehicle (an omnidirectional moving body) which moves according to controls via the operational device. The omnidirectional vehicle that configures the omnidirectional vehicle operational system is configured so that an omnidirectional vehicle 1 shown in FIG. 1 is a basic component, and a component where the operational device performs to control is added to this omnidirectional vehicle 1.

Figure 1:
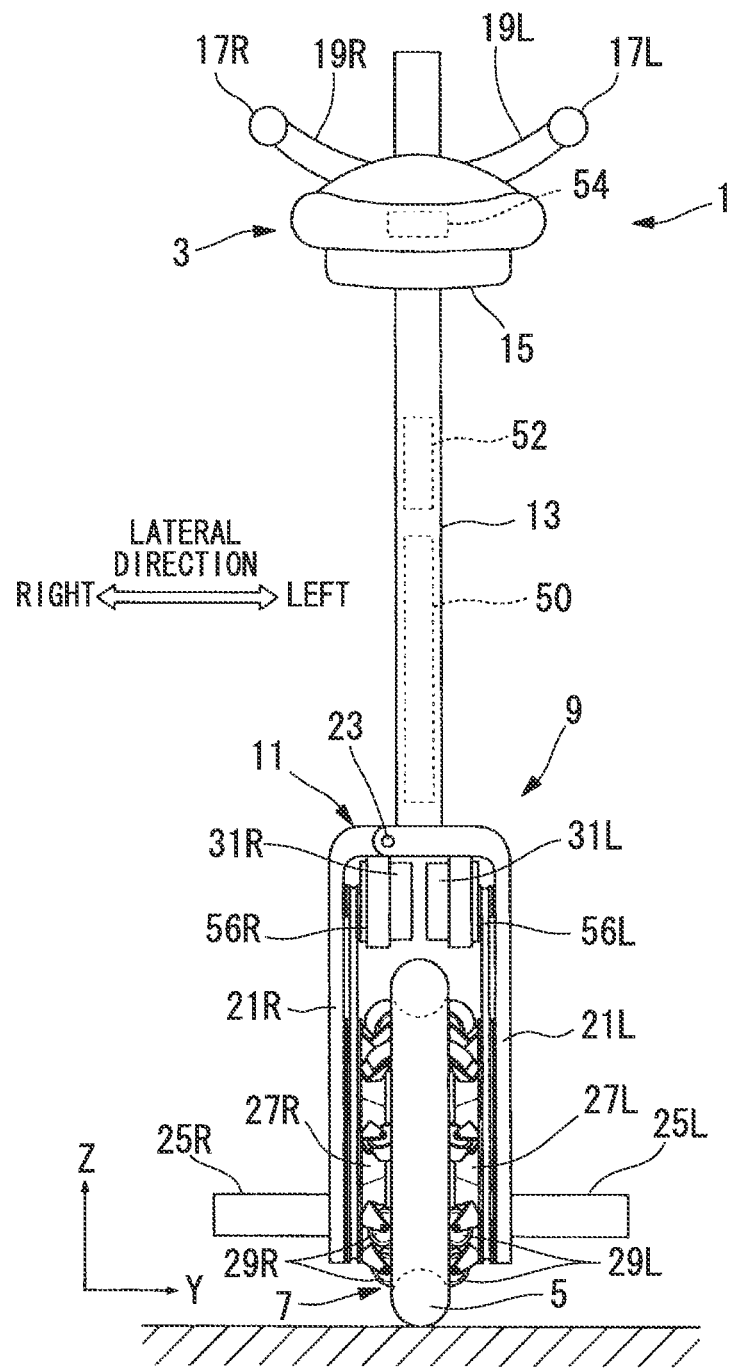
FIG. 1 is a frontal view of an omnidirectional vehicle according to an embodiment of the present invention.

FIG. 1 is a diagram showing a basic configuration of the omnidirectional vehicle. FIG. 1 shows a configuration of an omnidirectional vehicle without controls via the operational device of the omnidirectional vehicle operational system according to the present invention. First, a configuration of an omnidirectional vehicle 1 according to the present embodiment is described with reference to FIGS. 1-6.

Figure 2:
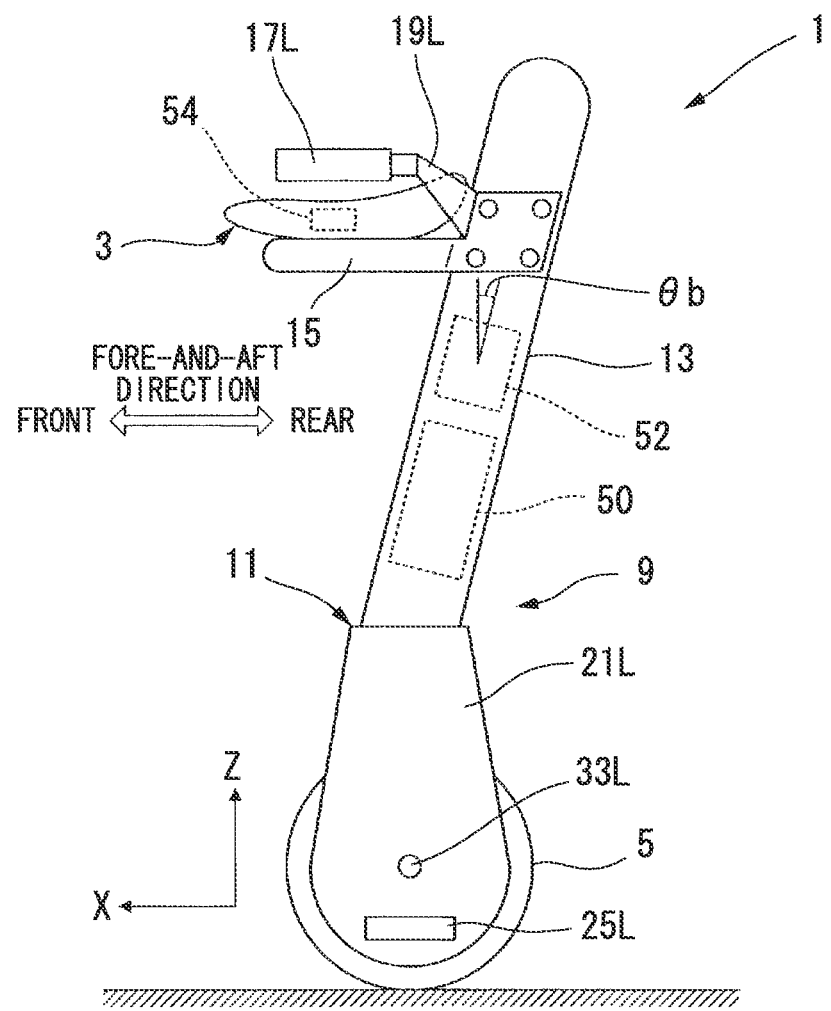
FIG. 2 is a side view of an omnidirectional vehicle according to an embodiment of the present invention.

As shown in FIGS. 1 and 2, the omnidirectional vehicle 1 comprises a payload supporting part 3 for an occupant, who may also be a driver, a drive unit 5, which can move in all directions (i.e., all directions in two dimensional space including the fore-and-aft direction and a lateral direction) on a floor surface while contacting the floor surface, an actuator 7 which supplies to the drive unit 5, a power for driving the drive unit 5, a base body 9 assembled with the payload supporting part 3, the drive unit 5, and the actuator 7.

Here, the "fore-and-aft direction" and the "lateral direction" respectively refer to a direction which is equal to or approximately matches the fore-and-aft direction and the lateral direction of an upper body of an occupant riding in a standard posture in the payload supporting part 3. Incidentally, a "standard posture" refers to a posture which can be estimated based on a configuration of the payload supporting part 3. This "standard posture" is such that the axis of the upper body of the occupant is aligned roughly in an upper-lower direction. Further, the upper body of the occupant is not twisted and the like.

Here, in FIG. 1, the "fore-and-aft direction" and the "lateral direction" respectively refer to a direction perpendicular to the paper and a lateral direction of the paper. In FIG. 2, the "fore-and-aft direction" and the "lateral direction" respectively refer to a lateral direction of the paper and a direction perpendicular to the paper. Further in the description regarding the omnidirectional vehicle 1, a suffix "R" or a suffix "L" are appended to a reference numeral. The suffix "R" is used to refer to a component or a concept corresponding to a right side of the vehicle 1. The suffix "L" is used to refer to a component or a concept corresponding to a left side of the omnidirectional vehicle 1.

The base body 9 comprises a lower part frame 11, which is assembled to the drive unit 5 and the actuating unit 7, and a supporting frame 13, which is provided to extend upwards from an upper end of the lower part frame 11.

A seat frame 15 is fixed to an upper part of the supporting frame 13. The seat frame 15 protrudes towards the front from the supporting frame 13. In addition, a seat 3 is provided on the seat frame 15. An occupant sits on the seat 3. According to the present embodiment, this seat 3 is the riding unit of the occupant. Therefore, the omnidirectional vehicle 1 (hereinafter may also be referred simply as a "vehicle 1") according to the present embodiment moves over a floor surface while the occupant is seated on the seat 3.

In addition, a grip 17R and a grip 17L are placed on the left and right portions of the seat 3. The occupant seated on the seat 3 holds on to the grips 17R, or 17L, if necessary. Each of these grips 17R, 17L fixed respectively on a tip part of a bracket 19R, and a bracket 19L, which extend from the supporting frame 13 (or the seat frame 15).

The lower part frame 11 comprises a pair of cover members 21R and 21L. Each of the cover members 21R and 21L are placed to face one another in a two-pronged form while being separated in a lateral direction. The upper part of these cover members 21R and 21L (i.e., a branching portion of the two-pronged form) are connected via a hinge shaft 23 comprising a shaft center in the fore-and-aft direction. One of the cover members 21R and 21L can move around the hinge shaft 23 relative to the other one of the cover members. In this case, the cover members 21R and 21L are biased towards a direction by a spring (not illustrated) in a direction in which that the lower end portions of the cover members 21R and 21L (i.e., a tip portion of the two-pronged form) narrow towards one another.

Further, a step 25R at an external surface portion of each of the cover members 21R and 21L, a step 25R, on which the right foot of the occupant seated on the seat 3 is placed, and a step 25L, on which the left foot of the occupant is placed, are provided so as to protrude respectively towards the right and the left directions.

The drive unit 5 and the actuator 7 are placed between the cover members 21R, 21L of the lower part frame 11. A configuration of the drive unit 5 and the actuator 7 are described with reference to FIGS. 3-6.

Incidentally, for example, the drive unit 5 and the actuator 7 have the configurations disclosed in FIG. 1 of PCT International Publication No. WO 08/132779. Therefore, the matters for the drive unit 5 and the actuator 7 disclosed in FIG. 1 of PCT International Publication No. WO 08/132779 will be simply described.

According to the present embodiment, the drive unit 5 is a wheel assembly being a ring-shaped component comprising a rubber elastic material. The cross section of the drive unit 5 is approximately a circle. This drive unit 5 (hereinafter may also be referred to as a wheel assembly 5) can rotate around a center C1 of the circular cross section as indicated in arrow Y1 in FIGS. 5 and 6 due to the elastic deformation of the wheel assembly 5. In particular, the wheel assembly 5 rotates around a circumferential line which passes through the center C1 of the circular cross section and becomes concentric with the shaft core of the wheel assembly 5.

This wheel assembly 5 is placed between the cover members 21R and 21L while the shaft center C2 (a shaft center C perpendicular to the diameter direction of the wheel assembly 5 in general) faces the lateral direction. In addition, the wheel assembly 5 contacts the floor surface with the lower end part of the outer peripheral surface of the wheel assembly 5.

Figure 5:
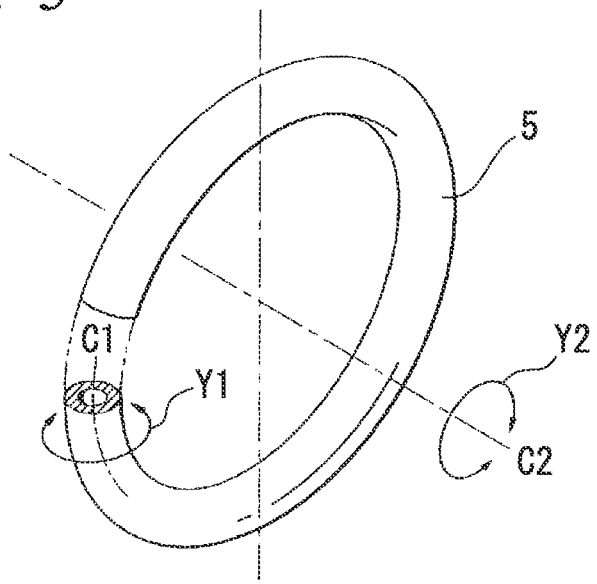
FIG. 5 is a perspective view of a drive unit (wheel assembly) of an omnidirectional vehicle according to an embodiment of the present invention.

Further, the wheel assembly 5 may perform a movement rotating around the shaft center C2 of the wheel assembly 5 as indicated in arrow Y2 in FIG. 5 (a movement rolling around the floor surface), and a movement rotating around the shaft center C1 of the cross section of the wheel assembly 5. As a result, the wheel assembly 5 may move in all directions on the floor surface by a combination of these rotating movements.

The actuator 7 comprises a free roller 29R and a rotating part 27R, provided between the wheel assembly 5 and the right cover member 21R, a free roller 29L and a rotating part 27L, provided between the wheel assembly 5 and the left cover member 21L, an electric motor 31R placed as an actuator above the rotating part 27R and the free roller 29R, and an electric motor 31L placed as an actuator above the rotating part 27L and the free roller 29L.

A housing of each of the electric motors 31R and 31L is attached respectively to the cover members 21R and 21L. Although not diagrammed, the power source (capacitor) of the electric motors 31R, 31L is provided on appropriate places on the base body 9 such as on the supporting frame 13 and the like.

The rotation member 27R is rotatably supported by the cover member 21R via the supporting axis 33R comprising a shaft center in the lateral direction. Similarly, the rotation member 27L is rotatably supported by the cover member 21L via the supporting axis 33L comprising a shaft center in the lateral direction. In this case, rotational shaft center of the rotation member 27R (the shaft center of the supporting axis 33R) and a rotational shaft center of the rotation member 27L (the shaft center of the supporting axis 33L) are coaxial.

Figure 3:
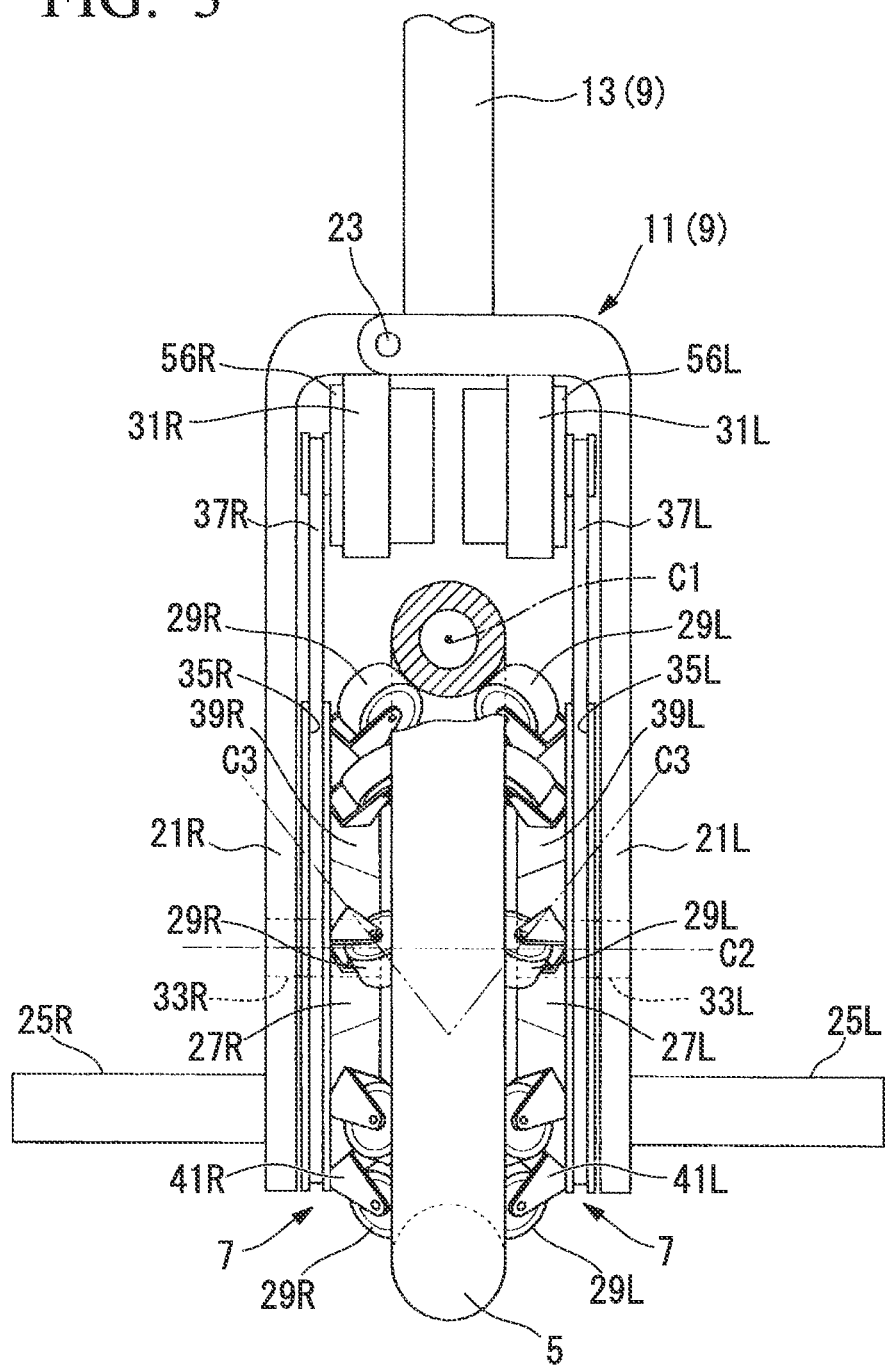
FIG. 3 is an expanded view of a lower portion of an omnidirectional vehicle according to an embodiment of the present invention.
Figure 4:
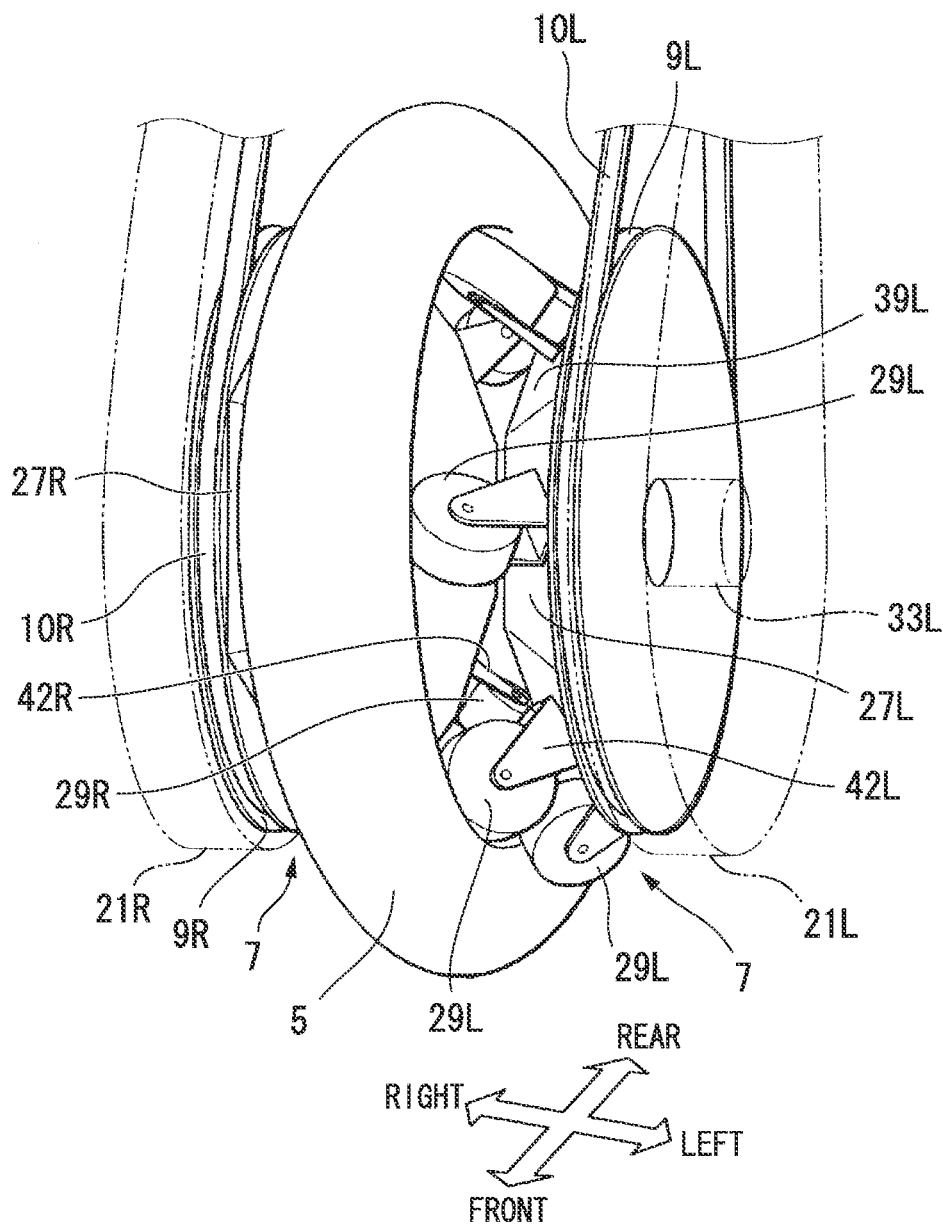
FIG. 4 is a perspective view of a lower portion of an omnidirectional vehicle according to an embodiment of the present invention.

The rotation members 27R, 27L are connected respectively to the output axis of the electric motors 31R, 31L via a power transmission mechanism comprising a decelerating mechanism. The rotation members 27R, 27L are rotated by a power (torque) transmitted by each of the electric motors 31R, 31L. Examples of the power transmission mechanism include a pulley-type/belt-type device. In other words, as shown in FIGS. 3, the rotation member 27R is connected to the output axis of the electric motor 31R via the pulley 35R and the belt 37R. Similarly, the rotation member 27L is connected to the output axis of the electric motor 31L via the pulley 35L and the belt 37L.

Further, the power transmission mechanism may, for example, be a device comprising a sprocket and a linking chain, or, a device comprising a plurality of gears. Further, for instance, the electric motors 31R and 31L may be placed so as to face the rotation members 27R and 27L respectively, so that the output axis of each of the electric motors 31R and 31L is coaxial with the rotation members 27R and 27L respectively. In addition, the output axis of each of the electric motors 31R, 31L may be connected to the rotation members 27R, 27L respectively, via a decelerating device such as a planetary gear drive and the like.

Each of the rotation members 27R and 27L are configured to be the same shape as a circular cone, the diameter of which decreases towards the side of the wheel assembly 5. The outer peripheral surface of the rotation members 27R and 27L are the tapered outer peripheral surfaces 39R and 39L respectively.

A plurality of free rollers 29R are aligned around the tapered outer peripheral surface 39R of the rotation member 27R. Here, the plurality of free rollers 29R are aligned at equal intervals along the circumference of a circle which is coaxial with the rotation member 27R. Further, these free rollers 29R are attached respectively to the tapered outer peripheral surface 39R via the bracket 41R. Moreover, the free rollers 29R are rotatably supported by the bracket 41R.

Similarly, a plurality of free rollers 29L are aligned around the tapered outer peripheral surface 39L of the rotation member 27L. Here, the plurality of free rollers 29L are aligned at equal intervals along the circumference of a circle which is coaxial with the rotation member 27L. Further, these free rollers 29L are attached respectively to the tapered outer peripheral surface 39L via the bracket 41L. Moreover, the free rollers 29L are rotatably supported by the bracket 41L. The number of free rollers 29L is equal to the number of free rollers 29R.

The wheel assembly 5 is placed coaxial with the rotation member 27R and 27L so as to be sandwiched between the free roller 29R at the rotation member 27R side and the free roller 29L at the rotation member 27L side.

Figure 6:
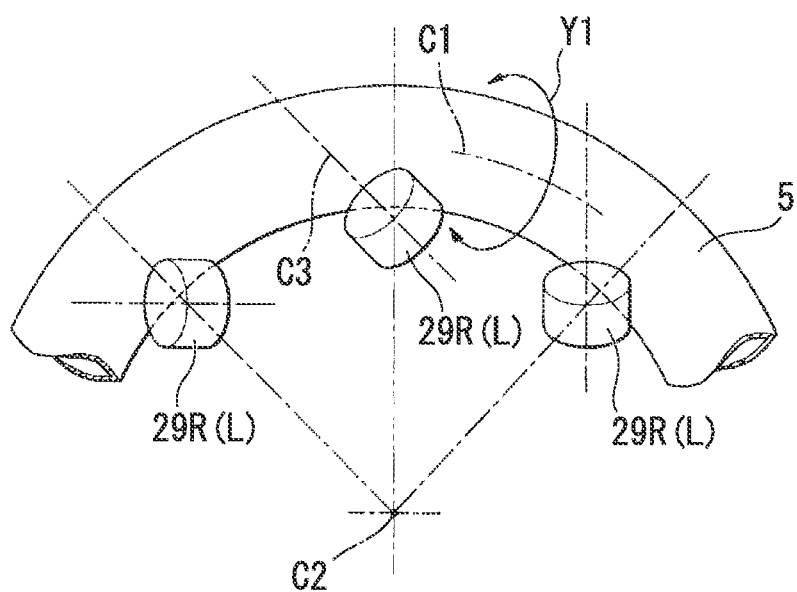
FIG. 6 is a view showing a relative position of a drive unit (wheel assembly) of an omnidirectional vehicle and a free roller according to an embodiment of the present invention.

In this case, as shown in FIGS. 1 and 6, the shaft center C3 of each of the free rollers 29R and 29L is tilted with respect to the shaft center C2 of the wheel assembly 5. At the same time, the shaft center C3 is placed so as to be tilted with respect to the diameter direction of the wheel assembly 5. Here, the "diameter direction" refers to a radial direction connecting the shaft center C2 and each of the free rollers 29R, 29L, viewing the wheel assembly 5 from a direction of the shaft center C2 of the wheel assembly 5. Further, in this position, the outer peripheral surface of each of the free rollers 29R, 29L are pressed against the inner peripheral surface of the wheel assembly 5 in a diagonal direction.

In more general terms, the free roller 29R at the right side is pressed against the inner peripheral surface of the wheel assembly 5 so that, when the rotation member 27R is driven to rotate around the shaft center C2, a frictional force element in a peripheral direction of the shaft center C2, and a frictional force element in a peripheral direction of the center C1 of the cross section of the wheel assembly 5, may be applied to the wheel assembly 5 at a surface at which the free roller 29R contacts the wheel assembly 5. Here, the frictional force element in the peripheral direction of the shaft center C2 refers to a frictional force element in a direction of a tangential line of an inner circumference of the wheel assembly 5. In addition, the frictional force element in a peripheral direction of the center C1 refers to a frictional force element in a direction of a tangential line of a circular cross section of the wheel assembly 5. The free roller 29L at the left side is configured in a similar manner.

As described above, the cover members 21R and 21L are biased towards a direction by a spring (not diagramed) in a direction in which that the lower end portion of the cover members 21R and 21L (i.e., a tip portion of the two-pronged form) narrows towards one another.

Due to this biasing force, the wheel assembly 5 is held between the free roller 29R at the right side and the free roller 29L at the left side. At the same time, the condition of the free rollers 29R and 29L being pressed against the wheel assembly 5 is maintained. In particular, the condition in which frictional force may be applied between each of the free rollers 29R, 29L and the wheel assembly 5 is maintained.

According to the vehicle 1 configured as described above, when the rotation members 27R, 27L are driven to rotate in the same direction at a same velocity by the electric motors 31R and 31L, the wheel assembly 5 rotates around the shaft center C2 in the same direction as the rotation member 27R, 27L. Therefore, the wheel assembly 5 rolls in a fore-and-aft direction on the floor surface. Thus, the entire vehicle 1 moves in a fore-and-aft direction. Incidentally, in this case, the wheel assembly 5 does not rotate around the center C1 of the lateral cross section.

Further, when the rotation members 27R, 27L are driven to rotate in directions opposite to one another and at a same speed, the wheel assembly 5 rotates around the center C1 of the lateral cross section. As a result, the wheel assembly 5 moves in a direction of the shaft center C2 (i.e., the lateral direction). Further, the entire vehicle 1 moves in the lateral direction. In this case, the wheel assembly 5 does not rotate around the shaft center C2.

Further, when the rotation members 27R, 27L are driven in different velocities in the same direction or in opposite directions, the vehicle wheel 5 rotates around the shaft center C2, and, at the same time, rotates round the center C1 of the lateral cross section of the vehicle wheel 5.

At this time, due to the combination of these rotational movements, the wheel assembly 5 moves in a direction tilted with respect to the fore-and-aft direction and a lateral direction. Moreover, the entire vehicle 1 moves in the same direction as the wheel assembly 5. The direction in which the wheel assembly 5 moves in this case varies depending on the difference between rotational velocities of the rotation members 27R, 27L. Here, the rotational velocity refers to a rotational velocity vector such that the polarity is defined based on the rotational direction.

Since the moving operation of the wheel assembly 5 is conducted as described above, the velocity with which the vehicle 1 moves and the direction in which the vehicle 1 moves may be controlled by controlling the rotational velocity of each of the electrically operated motors 31R and 31L, and by controlling the rotational velocity of the rotation members 27R and 27L.

Next, a configuration for the moving operation of the vehicle 1 shown in FIG. 1 is described. In the following description, an xyz coordinate system is envisioned comprising the x axis, referring to the horizontal axis in the fore-and-aft direction, the y axis, referring to the horizontal axis in the lateral direction, and the z axis, referring to the orthogonal axis, as shown in FIGS. 1 and 2. The fore-and-aft direction may also be referred to as the x axis direction. The lateral direction may also be referred to as the y axis direction.

First, a moving operation of the vehicle 1 is described below in general terms. When an occupant who sits on the seat 3 tilts his or her upper body, the base body 9 and the seat 3 tilts towards the direction that the occupant's upper body was tilted. In particular, the tilting of the occupant's upper body refers to a displacement of the position of the center-of-gravity point of a combination of the occupant and the vehicle 1 projected on a horizontal plane. Further, at this time, the moving operation of the wheel assembly 5 is controlled so that the vehicle 1 moves in a direction in which the base body 9 is tilted. For example, when the occupant tilts his or her upper body forward, and also tilts the base body 9 and the seat 3 forward, the moving operation of the wheel assembly 5 is controlled so that the vehicle 1 moves forward.

In other words, according to the vehicle 1 shown in FIG. 1, the motion of the occupant moving his or her upper body and tilting the base body 9 along with the seat 3 is considered to be a basic maneuvering operation with respect to the vehicle 1. This motion is referred to as an operation request of the vehicle 1. According to this maneuvering operation, the moving operation of the wheel assembly 5 is controlled via the actuator 7.

Here, according to the vehicle 1 based on the present embodiment, a surface at which the wheel assembly 5 contacts the floor surface is a surface at which the entire vehicle 1 contacts the floor surface. This surface at which the wheel assembly 5 contacts the floor surface is a single local region and has a small area (i.e., size) compared to a region obtained by projecting the vehicle 1 and the occupant riding the vehicle 1 in their entirety to the floor surface. A floor reaction force applies only on this single local region. Therefore, in order to prevent the base body 9 from tilting and falling down, it is necessary to move the wheel assembly 5 so that the centerof-gravity point of the occupant and the vehicle 1 in their entirety is positioned approximately right above the surface at which the wheel assembly 5 touches the ground.

Therefore, according to the vehicle 1, a target posture is referred to as a position of the base body 9 under a condition in which the center-of-gravity point of the occupant and the vehicle 1 in their entirety is positioned approximately right above the center point of the wheel assembly 5 (i.e. the center point along the shaft center C2). In more accurate terms, the center-of-gravity point of the occupant and the vehicle 1 in their entirety is positioned approximately right above the surface at which the wheel assembly 5 contacts the ground. The moving operation of the wheel assembly 5 is controlled so that the actual position of the base body 9 converges with the target posture.

Further, when the vehicle 1 is started to move forward and the like, and when the vehicle 1 receives a propulsion force due to the actuator 7 along with an additional external force such as a propulsion force provided by the occupant kicking the floor with his or her foot when necessary in order to increase the velocity at which the vehicle 1 moves, the moving operation of the wheel assembly 5 is controlled so that the velocity of the vehicle 1 increases along with the application of the propulsion force and an additional external force. In more precise terms, the moving operation of the wheel assembly is controlled so that the velocity of the center-of-gravity point of the occupant and the vehicle 1 in their entirety increases. Here, the additional external force provided by the occupant is a propulsion force due to the frictional force created by the back side of the occupant's foot and the floor.

Incidentally, in a condition in which the additional external force is not provided as a propulsion force, the moving operation of the wheel assembly 5 is controlled so that the velocity of the vehicle 1 is once retained at a certain velocity, the velocity of the vehicle 1 then decreases, and the vehicle 1 comes to a halt.

Further, in a condition in which the occupant is not riding the vehicle 1, a target posture is referred to as a position of the base body 9 such that the center-of-gravity point of the vehicle 1 in its singular form is positioned approximately right above the center point of the wheel assembly 5 (i.e., the center point of the shaft center C2). In more precise terms, this center-of-gravity point is positioned approximately right above the surface at which the wheel assembly 5 contacts the floor. The moving operation of the wheel assembly 5 is controlled so that the actual posture of the base body 9 converges to the target posture, and that the vehicle 1 may stand on its own without the base body 9 tilting.

According to the vehicle 1, in order to control the movement of the vehicle 1 as described above, the vehicle 1 comprises a control unit 50, a tilting sensor 52, a load sensor 54, and rotary encoders 56R, 56L at appropriate places, as indicated in FIGS. 1 and 2. The control unit 50 comprises an electric circuit unit comprising, for example, a micro computer and a drive circuit unit of the electric motor 31R, 31L. The tilting sensor 52 measures a tilt angle θb with respect to an orthogonal direction (gravitational direction) of a predetermined component of the base body 9. The tilting sensor 52 also measures a rate of change of the tilt angle (=dθb/dt). The load sensor 54 detects whether or not an occupant is boarding the vehicle 1. The rotary encoders 56R, 56L acts as an angle sensor to detect a rotational angle and a rotational angular velocity of an output axis of each of the electric motors 31R and 31L.

In this case, the control unit 50 and the tilting sensor 52 are, for example, assembled to the supporting frame 13 in a condition such that the control unit 50 and the tilting sensor 52 are contained inside the supporting frame 13 of the base body 9. In addition, the load sensor 54 is embedded in the seat 3. Further, each of the rotary encoders 56R and 56L are integrated respectively with the electrically motors 31R and 31L. In addition, each of the rotary encoders 56R and 56L may be integrated respectively with the rotating parts 27R and 27L.

In more detail, the tilting sensor 52 comprises a rate sensor (angular velocity sensor) such as an acceleration sensor and a gyro sensor and the like. The tilting sensor 52 outputs the detection signal of these sensors to the control unit 50. In addition, the control unit 50 carries out a predetermined measurement and computation procedure based on an output by the acceleration sensor and the rate sensor of the tilting sensor 52. The predetermined measurement and computation procedure may be a known computation. In this way, the control unit 50 computes a measured value of a tilt angle θb of the component equipped with the tilting sensor 52 with respect to an orthogonal direction and a measured value of a tilting angular velocity θbwdot, which is a rate of change, i.e., a differential of the tilt angle θb. According to the present embodiment, the component equipped with the tilting sensor 52 is the supporting frame 13.

In this case, the measured tilt angle θb (hereinafter, may be referred to as a base body tilt angle θb) each comprises a component θb_x in the y axis rotational direction (the pitch direction) and a component θb_y in the x axis rotational direction (the rolling direction). Similarly, the measured tilting angular velocity θbdot (hereinafter, may be referred to as a base body tilting angular velocity θbdot) also comprises a component θbdot_x (=dθb_x/dt) in the y axis rotational direction (the pitch direction) and a component θbdot_y (=dθb_y/dt) in the x axis rotational direction (the rolling direction).

Further, in the description of the vehicle 1, a variable representing a quantity of a movement condition comprising an element in the x axis direction and in the y axis direction or a direction rotating around each of the axes such as the base body tilt angle θb is used. In addition, a variable representing a coefficient and the like relating to the quantity of a movement condition is used. When each element of these variables are expressed separately, a subscript "_x" or "_y" are appended to the reference numeral indicating these variables.

In this case, for variables concerning a translational movement, such as a translational velocity and the like, a subscript "_x" is appended to an element in the x axis direction, while a subscript "_y" is appended to an element in the y axis direction.

Meanwhile, for variables concerning a rotational movement such as an angle, a rotational velocity, i.e., an angular velocity, and an angular acceleration, a subscript "_x" is appended to an element in the y axis direction, while a subscript "_y" is appended to an element in the x axis direction, as a matter of convenience, in order to make the subscripts consistent with the subscripts of the variables concerning a translational movement.

Furthermore, when a variable is represented as a pair of elements in the x axis direction and in the y axis direction, or as a pair of elements rotating around the y axis and around the x axis, a subscript "_xy" is appended to the reference numeral indicating these variables. For example, when the base body tilt angle θb is represented as a pair of a component θb_x around the y axis and a component θb_y around the x axis, the subscript "_xy" is used as follows: "base body tilt angle θb_xy."

The load sensor 54 is embedded in the seat 3 so that, when the occupant sits on the seat 3, the load sensor 54 receives a load due to the weight of the occupant.

Thus, the load sensor 54 outputs to the control unit 50, a detection signal according to the load. Further, the control unit 50 determines whether or not the occupant is riding the vehicle 1 based on a measured value of a load represented by an output of this load sensor 54.

By the way, instead of the load sensor 54, a switch type sensor may be used such that the sensor is turned on when the occupant sits on the seat 3.

The rotary encoder 56R generates a pulse signal every time the output axis of the electric motor 31R rotates by a predetermined angle. Thus, the rotary encoder 56R outputs the pulse signal to the control unit 50. Further, the control unit 50 measures the rotational angle of the output axis of the electric motor 31R based on the pulse signal. Further, the control unit 50 measures the temporal rate of change, i.e., the differential of the measured value of the rotational angle as a rotational angular velocity of the electric motor 53R. The rotary encoder 56L at the side of the electric motor 31L is configured in a similar manner as well.

The control unit 50 determines a velocity command, which is a target value of the rotational angular velocity of each of the electric motors 31R and 31L by executing a predetermined computation procedure using the above measured values. The control unit 50 performs a feedback control of the rotational angular velocity of each of the electric motors 31R and 31L according to the velocity command.

Further, the relation between the rotational velocity of the output axis of the electric motor 31R and the rotational velocity of the rotating part 27R is a proportional relation according to a certain value of a deceleration ratio between the output axis and the rotation member 27R.

In the description of the vehicle 1, the rotational angular velocity of the electric motor 31R refers to a rotational angular velocity of the rotation member 27R. Similarly, the rotational angular velocity of the electric motor 31L refers to a rotational angular velocity of the rotation member 27L.

Hereinafter, a controlling process of the control unit 50 is further described in detail.

Figure 7:
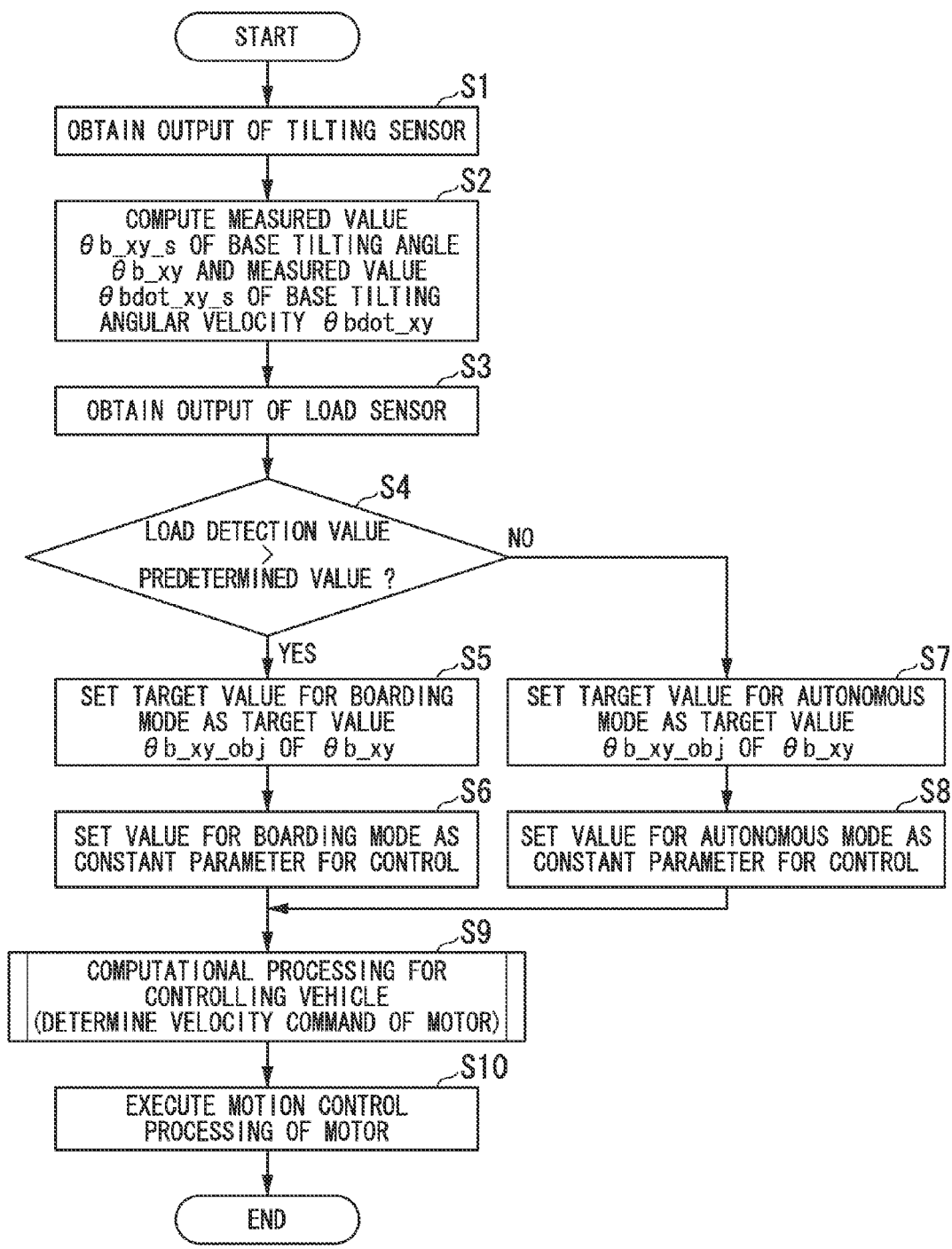
FIG. 7 is a flowchart showing a processing of a control unit of an omnidirectional vehicle according to an embodiment of the present invention.

The control unit 50 executes a procedure indicated in the flowchart shown in FIG. 7, at a predetermined control processing period. Here, the procedure indicated in the flowchart is referred to as a main routine processing.

First, in step 51, the control unit 50 obtains an output from the tilting sensor 52.

Next, the procedure moves on to step S2. In step S2, the control unit 50 computes a measured value $\theta b\_xy\_s$ of the base body tilt angle $\theta b$ and the measured value $\theta bdot\_xy\_s$ of the base body tilting angular velocity $\theta bdot$ based on an output obtained from the tilting sensor 52.

In the following description, when a measured value (a measured value or an estimated value) of an actual value of a variable representing a quantity of a condition such as the measured value $\theta b\_xy\_s$ is referenced, a subscript "_s" is appended to the reference numeral of the variable.

In step S3, after the control unit 50 obtains an output of the load sensor 54, the control unit 50 performs a determination processing of the step S4. In this determination processing, the control unit 50 determines whether or not the occupant is riding the vehicle 1, i.e., whether or not the occupant is seated on the seat 3, based on whether or not a load observed value obtained by an output of the load sensor 54 is greater than a predetermined value.

Further, when the determination result of step S4 is in the positive, the control unit 50 performs a processing in step S5 in which the target value $\theta b\_xy\_obj$ of the base body tilt angle $\theta b$ is set. In addition, when the determination result of step S4 is in the positive, the control unit 50 performs a processing in step S6 in which a value of a constant parameter for controlling the movement of the vehicle 1 is set. An example of the constant parameter includes a basic value for each type of gain and the like.

In step S5, the control unit 50 sets a predetermined target value for a boarding mode as a target value $\theta b\_xy\_obj$ of the base body tilt angle $\theta b$.

Here, a "boarding mode" refers to an operating mode of the vehicle 1 in a condition in which the occupant is riding the vehicle 1. The target value $\theta b\_xy\_obj$ for this boarding mode is predetermined so as to be equal to or approximately equal to the measured value $\theta b\_xy\_s$ of the base body tilt angle $\theta b$ measured based on an output by the tilting sensor 52 in a position of the base body 9 in which a center-of-gravity point of the vehicle 1 and an occupant seated on the seat 3 in their entirety is located approximately right above the surface at which the wheel assembly 5 contacts the floor surface. Hereinafter, the center-of-gravity point of the vehicle 1 and an occupant seated on the seat 3 in their entirety is referred to as a "vehicle/occupant integrated center-of-gravity point."

Further, in step S6, the control unit 50 sets a value of a constant parameter for controlling the motion of the vehicle 1 as a predetermined value for a boarding mode. Incidentally, the constant parameter includes hx, hy, Ki_a_x, Ki_b_x, Ki_a_y, Ki_by (i=1, 2, 3) and the like.

Meanwhile, when the determination result of step S4 is in the negative, the control unit 50 performs a processing in S7 in which the target value $\theta b\_xy\_obj$ of the base body tilt angle $\theta b\_xy$ is set. In addition, when the determination result of step S4 is in the negative, the control unit 50 performs a processing in S8 in which the value of the constant parameter for controlling the movement of the vehicle 1 is set.

In step S7, the control unit 50 sets a predetermined target value for an autonomous mode as a target value $\theta b\_xy\_obj$ of the tilt angle $\theta b$.

Here, an "autonomous mode" refers to a moving mode of the vehicle 1 in a condition in which the occupant is not riding the vehicle 1. The target value $\theta b\_xy\_obj$ for the autonomous mode is predetermined so as to be equal to or approximately equal to the measured value $\theta b\_xy\_s$ of the base body tilt angle $\theta b$ measured based on an output by the tilting sensor 52 in a position of the base body 9 in which a center-of-gravity point of the vehicle 1 in its single form is located approximately right above the surface at which the wheel assembly 5 contacts the floor surface. Hereinafter, a center-of-gravity point of the vehicle 1 in its single form is referred to as a "singular vehicle body center-of-gravity point". In general, the target value $\theta b\_xy\_obj$ for the autonomous mode is different from the target value $\theta b\_xy\_obj$ for the boarding mode.

Further, in step S8, the control unit 50 sets a predetermined value for an autonomous mode as a value of a constant parameter for controlling the movement of the vehicle 1. The value of the constant parameter for the autonomous mode is different from the value of the constant parameter for the boarding mode.

The value of the constant parameter is differed in the boarding mode and in the autonomous mode, because the characteristics of how the movement of the vehicle 1 responds to a control input are different in the boarding mode and in the autonomous mode, since the height of the center-of-gravity point and the total mass and the like are different in the boarding mode and in the autonomous mode.

According to the processing performed in steps S4-S8, the target value $\theta b\_xy\_obj$ of the base body tilt angle $\theta b\_xy$ and the value of the constant parameter is different for each movement mode, i.e., the boarding mode and the autonomous mode.

Incidentally, the processing in steps S5 and S6, or the processing in steps S7 and S8 need not be performed for every cycle of the control processing, and may be only performed when there is a change in the determination result of step S4. Incidentally, in both the boarding mode and the autonomous mode, the target value of the component θbdot_x in a direction around the y axis and the target value of the component θbdot_y in a direction around the x axis of the base body tilting angular velocity θbdot are both "0". Therefore, it is not necessary to set the target value of the base body tilting angular velocity θbdot_xy.

As described above, after executing the processing in steps S5 and S6, or the processing in steps S7 and S8, the control unit 50 then moves on to step S9. In step S9, the velocity commands of each of the electric motors 31R, 31L are determined by executing the computational processing for controlling the vehicle. This computational processing for controlling the vehicle is described later. Next, the processing moves on to step S10. In step S10, the control unit 50 executes the control operation of the electric motors 31R and 31L according to the velocity command determined in step S9. In this control operation, the control unit 50 determines the target value of the output torque of the electric motor 31R so that a difference between a velocity command of the electric motor 31R determined in step S9 and the measured value of the rotational velocity of the electric motor 31R measured based on the output of the rotary encoder 56R is converged to "0". The target value of the output torque may also be referred to as the target torque. Furthermore, the control unit 50 controls the electric current supplied to the electric motor 31R so that the output torque of the target torque is outputted to the electric motor 31R. The movement control of the left electric motor 31L is configured in a similar manner.

Heretofore, an overall control processing executed by the control unit 50 has been described.

Next, the computational processing for controlling the vehicle executed in step S9 is described in detail.

Incidentally, in the following description, the vehicle/occupant integrated center-of-gravity point in the boarding mode and the singular vehicle body center-of-gravity point in the autonomous mode are collectively referred to as the "vehicle system center of gravity". When the operating mode of the vehicle 1 is the boarding mode, the vehicle system center of gravity refers to the vehicle/occupant integrated center-of-gravity point. When the operating mode of the vehicle 1 is the autonomous mode, the vehicle system center of gravity refers to the singular vehicle body center-of-gravity point.

Further, in the following description regarding a value determined or renewed by the control unit 50 in each period of control processing, a value determined in the current, most recent period of control processing may be referred to as the current value. Meanwhile, a value determined in the period immediately prior to the current period of control processing may be referred to as the previous value. Further, when a value is referred to without specifying whether the value is a current value or a previous value, the value is meant to be a current value.

Further, regarding the velocity and acceleration in the x axis direction, the frontal direction is considered to be a positive direction. Regarding the velocity and acceleration in the y axis direction, the left direction is regarded as the positive direction.

Figure 8:
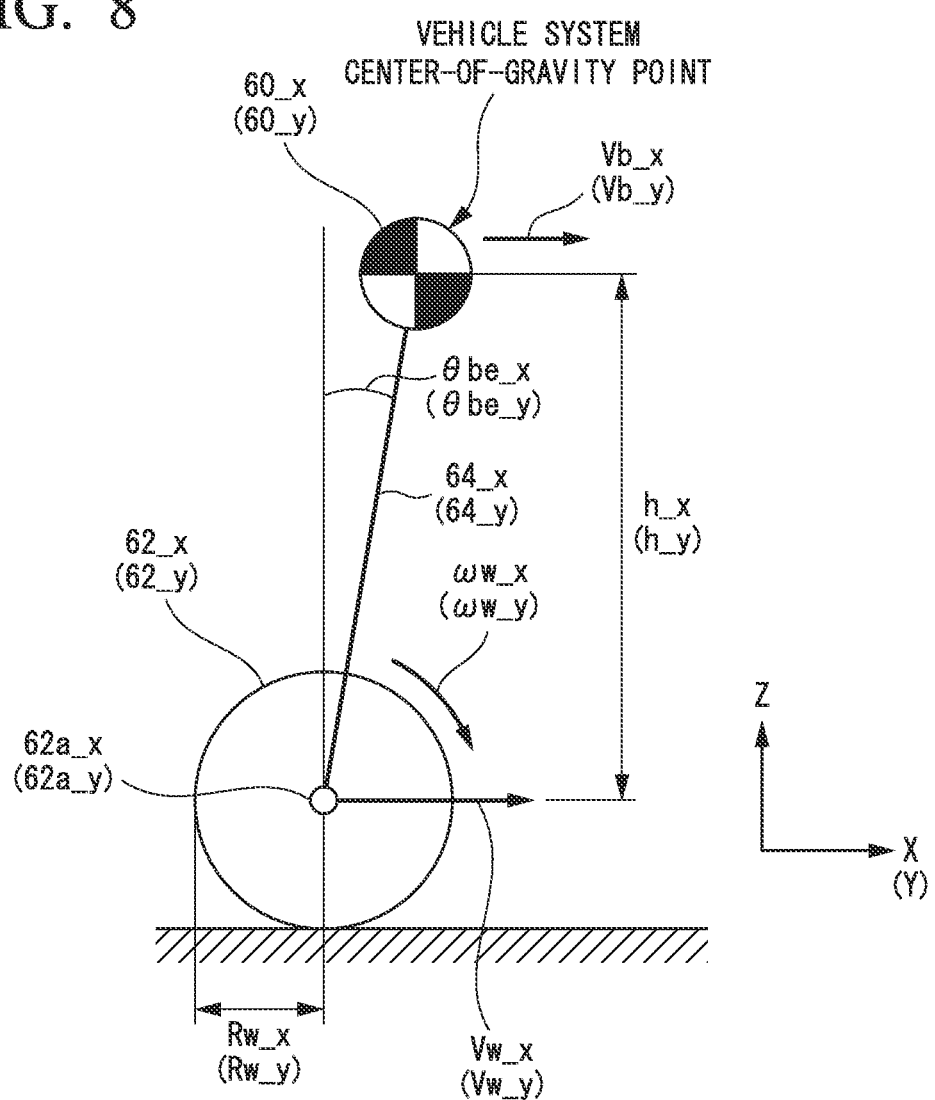
FIG. 8 is a diagram showing an inverted pendulum type model representing the dynamic behavior of an omnidirectional vehicle according to an embodiment of the present invention.

Furthermore, the computational processing for controlling the vehicle is executed in step S9 under the assumption that a dynamic movement of the vehicle system center of gravity is represented approximately as a behavior of the inverted pendulum model as shown in FIG. 8. In particular, the dynamic movement of the center-of-gravity point refers to a movement viewed by projecting from a y axis direction to the xz surface which is perpendicular to the y axis, and also refers to a movement viewed by projecting from an x axis direction to the yz surface which is perpendicular to the x axis. Furthermore, the behavior of the inverted pendulum model mentioned above refers to a dynamic movement of the inverted pendulum.

Further, in FIG. 8, a reference numeral without a parenthesis is a reference numeral corresponding to an inverted pendulum model seen from a y axis direction. Meanwhile, a reference numeral with a parenthesis is a reference numeral corresponding to an inverted pendulum model seen from the x axis direction.

In this case, an inverted pendulum model representing a behavior seen from a y axis direction comprises a mass point 60_x positioned at the vehicle system center of gravity and an imaginary wheel 62_x. Here, the imaginary wheel 62_x comprises a rotating axis 62a_x parallel to the y axis direction. The imaginary wheel 62_x and can rotate freely over a floor surface. Further, the mass point 60_x is supported by the rotating axis 62a_x of the imaginary wheel 62_x via a rod 64_x shaped like a straight line. In addition, the mass point 60_x may swing freely around the rotating axis 62a_x, with the rotating axis 62a_x being the fulcrum point.

According to this inverted pendulum model, the movement of the mass point 60_x corresponds to the movement of the vehicle system center of gravity seen from a y axis direction. In addition, the tilt angle θbe_x of the rod 64_x with respect to the orthogonal direction is equal to a difference θbe_x_s (=θb_x_s−θb_x_obj) between a measured value of a base body tilt angle θb_x_s and a target value of a base body tilt angle θb_x_obj in the direction around the y axis. Further, a rate of change (=dθbe_x/dt) of the tilt angle θbe_x of the rod 64_x equals the measured value θbdot_x_s of the base body tilting angular velocity around the y axis. Further, the velocity Vw_x of the imaginary wheel 62_x (the translational velocity in the x axis direction) is equal to the velocity of the wheel assembly 5 of the vehicle 1 in the x axis direction.

Similarly, the inverted pendulum model representing a movement seen from the x axis direction (see reference numeral in FIG. 8 with parenthesis) comprises a mass point 60_y located at the vehicle system center of gravity and an imaginary wheel 62_y, which comprises a rotational axis 62a_y parallel in the x axis direction and can roll around freely on a floor surface. Further, the mass point 60_y is supported by the rotational axis 62a_y of the imaginary wheel 62_y via a linear rod 64_y. Furthermore, the mass point 60_y may freely wobble around the rotational axis 62a_y, with the rotational axis 62a_y being a fulcrum point.

According to this inverted pendulum model, the movement of the mass point 60_y corresponds to the movement of the vehicle system center of gravity seen from an x axis direction. In addition, the tilt angle θbe_y of the rod 64_y with respect to the orthogonal direction is equal to a difference θbe_y_s (=θb_y_s−θb_y_obj) between a measured value of a base body tilt angle θb_y_s and a target value of a base body tilt angle θb_y_obj in the direction around the x axis. Further, a rate of change (=dθbe_y/dt) of the tilt angle θbe_y of the rod 64_y equals the measured value θbdot_y_s of the base body tilting angular velocity around the x axis. Further, the velocity Vw_y of the imaginary wheel 62_y (the translational velocity in the y axis direction) is equal to the velocity of the wheel assembly 5 of the vehicle 1 in the y axis direction.

Furthermore, the imaginary wheels 62_x and 62_y each have a predetermined radius of Rw_x and Rw_y.

Furthermore, the rotational angular velocity ωw_x and ωw_y of each of the imaginary wheels 62_x and 62_y, and a rotational angular velocity ω_R and ω_L of each of the electric motors 31R and 31L (in more precise terms, the rotational angular velocity ω_R and ω_L of the rotation members 27R and 27L) satisfy the following equations 01a and 01b.

$$\omega w\_y = C \cdot (\omega\_R - \omega\_L)/2 \quad \text{(Equation 01a)}$$

$$\omega w\_x = (\omega\_R + \omega\_L)/2 \quad \text{(Equation 01b)}$$

Incidentally, "C" in the equation 01a refers to a predetermined constant which depends on a mechanical relationship and a slippage between the free roller 29R, 29L and the wheel assembly 5.

Here, the dynamics of the inverted pendulum model shown in FIG. 8 is represented by the following equations 03x and 03y. Incidentally, the equation 03x is an equation representing the dynamics of the inverted pendulum model seen from a y axis direction. The equation 03y is an equation representing the dynamics of the inverted pendulum model seen from an x axis direction.

$$d^2\theta be\_x/dt^2 = \alpha\_x \cdot \beta\_x \cdot \omega wdot\_x \quad \text{(Equation 03x)}$$

$$d^2\theta be\_y/dt^2 = \alpha\_y \cdot \theta be\_y + \beta\_y \cdot \omega wdot\_y \quad \text{(Equation 03y)}$$

Here, the ωwdot_x in equation 03x represents a rotational angular acceleration of the imaginary wheel 62_x, i.e., the first differential of the rotational angular velocity ωw_x. In addition, α_x represents a coefficient depending on the mass and the height h_x of the mass point 60_x. β_x is a coefficient depending on the inertia (the moment of inertia) of the imaginary wheel 62_x and the radius Rw_x. The above description also applies to ωwdot_y, α_y, and β_y in equation 03y.

As indicated in equations 03x and 03y, the movement of the mass points 60_x and 60_y of the inverted pendulum is prescribed depending on the rotational angular acceleration ωwdot_x of the imaginary wheel 62_x, and the rotational angular acceleration ωwdot_y of the imaginary wheel 62_y.

Therefore, the rotational angular acceleration ωwdot_x of the imaginary wheel 62_x is used as a motor manipulated variable (control input) for controlling the movement of the vehicle system center of gravity seen from the y axis direction. At the same time, the rotational angular acceleration ωwdot_y of the imaginary wheel 62_y is used as a motor manipulated variable (control input) for controlling the movement of the vehicle system center of gravity seen from the x axis direction.

Heretofore, a computational processing for controlling the vehicle, executed in step S9, is described in general. The control unit 50 determines an imaginary wheel rotational angular acceleration commands ωwdot_x_cmd and ωwdot_y_cmd, which are command values (target values) of the rotational angular acceleration ωwdot_x and ωwdot_y as a motor manipulated variable, so that the movement of the mass point 60_x seen from the x axis direction and the movement of the mass point 60_y seen from the y axis direction becomes a movement corresponding to a predetermined movement of the vehicle system center of gravity. Furthermore, the control unit 50 determines a value obtained by integrating each of the imaginary wheel rotational angular acceleration commands ωwdot_x_cmd and ωwdot_y_cmd as the imaginary wheel rotational angular velocity commands ωw_x_cmd and ωw_y_cmd, which are the command values (target values) of the rotational angular velocity ωw_x and ωw_y of each of the imaginary wheels 62_x and 62_y.

In addition, the control unit 50 regards the velocity (=Rw_x·ωw_x_cmd) of the imaginary wheel 62_x corresponding to the imaginary wheel rotational angular velocity command ωw_x_cmd as the target velocity of the wheel assembly 5 of the vehicle 1 in the x axis direction. The control unit 50 also regards the velocity (=Rw_y·ωw_y_cmd) of the imaginary wheel 62_y corresponding to the imaginary wheel rotational angular velocity command ωw_y_cmd as the target velocity of the wheel assembly 5 of the vehicle 1 in the y direction. The control unit 50 determines the velocity commands ω_R_cmd and ω_L_cmd of respectively the electric motors 31R and 31L so as to reach these target velocities.

Further, the imaginary wheel rotational angular acceleration commands ωwdot_x_cmd and ωwdot_y_cmd, being a motor manipulated variable (control input), is determined by adding up three components of the motor manipulated variable as indicated in Equations 07x and 07y described later.

Figure 9:
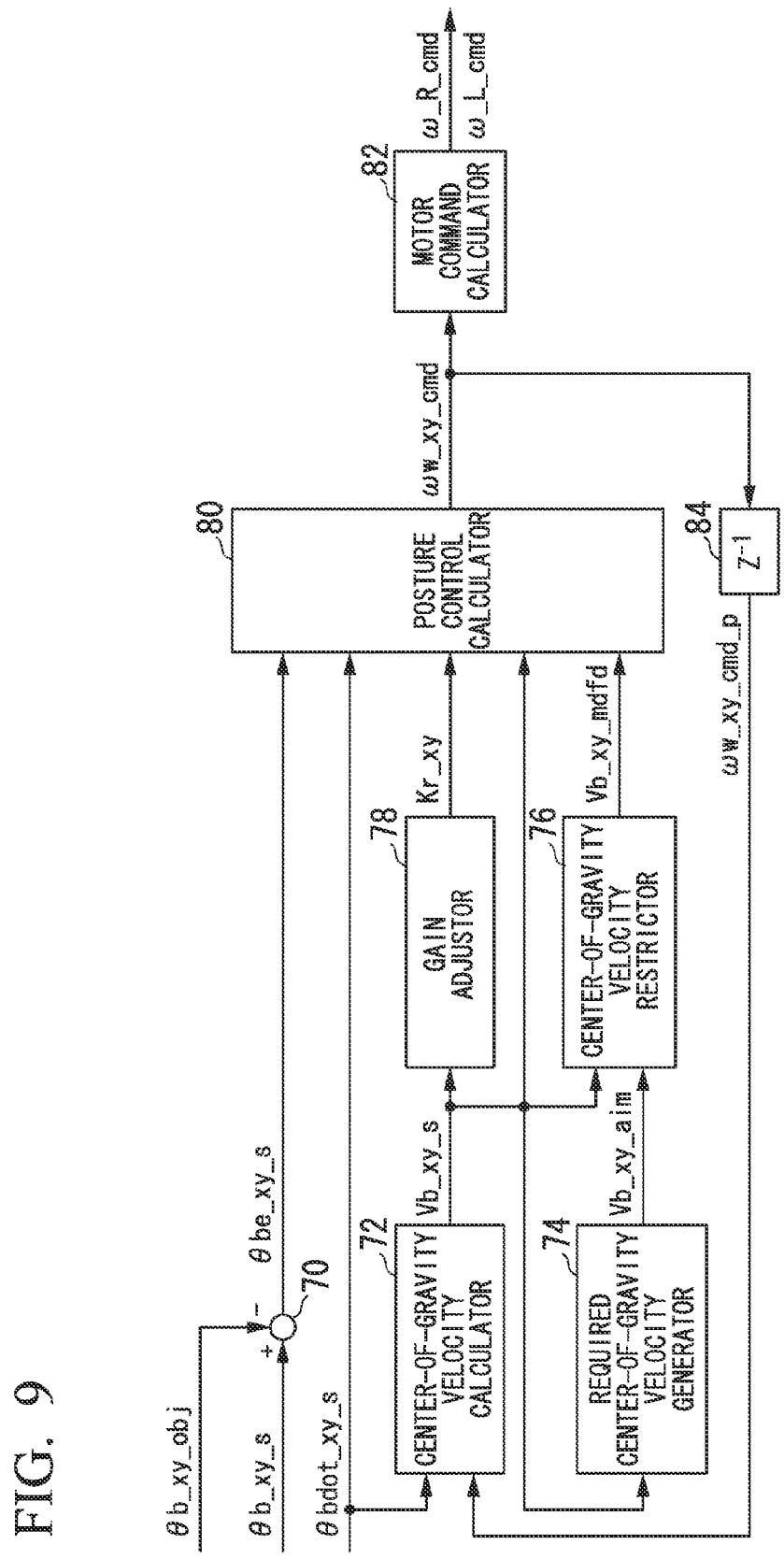
FIG. 9 is a block diagram showing a processing of step S9 shown in FIG. 7.

As described above, the control unit 50 comprises the feature represented in the block diagrams shown in FIG. 9 in order to execute the computational processing for controlling the vehicle in step S9.

In other words, the control unit 50 comprises an error calculator 70, a center-of-gravity velocity calculator 72, a required center-of-gravity point velocity generator 74, a center-of-gravity point velocity restrictor 76, and a gain adjustor 78. The error calculator 70 computes the base body tilt angle deviation observed value θbe_xy_s, which is a deviation between the base body tilt angle observed value θb_xy_s and the base body tilt angle target value θb_xy_obj. The center-of-gravity velocity calculator 72 computes a center-of-gravity point velocity estimate value Vb_xy_s as a observed value of the center-of-gravity point velocity Vb_xy, which is the velocity of the vehicle system center of gravity. The required center-of-gravity point velocity generator 74 generates a required center-of-gravity point velocity V_xy_aim as a required value of the center-of-gravity point velocity Vb_xy, which is estimated to be required according to the driving operation of the vehicle 1 by the occupant and the like (i.e., an operation adding an impellent force to the vehicle 1). The center-of-gravity point velocity restrictor 76 determines the target center-of-gravity point velocity for control Vb_xy_mdfd as a target value of the center-of-gravity point velocity Vb_xy based on the estimated center-of-gravity velocity value Vb_xy_s and the required center-of-gravity point velocity V_xy_aim taking into consideration the limitations according to the tolerable range of the rotational angular velocity of the electric motors 31R and 31L. The gain adjustor 78 determines a gain adjustment parameter Kr_xy to adjust the value of the gain coefficient of the equations 07x, 07y.

The control unit 50 further comprises a posture control calculator 80 and a motor command calculator 82. The posture control calculator 80 computes the imaginary wheel rotational angular velocity command ωw_xy_cmd. The motor command calculator 82 converts the imaginary wheel rotational angular velocity command ωw_xy_cmd into a pair of right side velocity command ω_R_cmd of the electric motor 31R (the command value of the rotational angular velocity) and a left side velocity command ω_L_cmd of the electric motor 31L (the command value of the rotational angular velocity).

Incidentally, the reference numeral 84 in FIG. 9 indicates a delay element imputing an imaginary wheel rotational angular velocity command ωw_xy_cmd computed by the posture control calculator 80 for each control processing cycle. In each control processing cycle, the delay element 84 outputs the previous value ωw_xy_cmd_p of the imaginary wheel rotational angular velocity command ωw_xy_cmd.

Each of these operations are performed by each of the processors in the computational processing for controlling the vehicle in step S9.

In other words, the control unit 50 first executes a processing of the error calculator 70 and the center-of-gravity velocity calculator 72.

The error calculator 70 receives an input of the base body tilt angle observed value θb_xy_s (θb_x_s and θb_y_s) computed in the step S2. The error calculator 70 also receives an input of the target value θb_xy_obj (θb_x_obj and θb_y_obj) set in steps S5 or step S7. Further, the error calculator 70 computes the base body tilt angle deviation observed value θbe_x_s in the direction around the y axis by subtracting θb_x_obj from θb_x_s (=θb_x_s−θb_x_obj). At the same time, the error calculator 70 computes the base body tilt angle deviation observed value θbe_y_s in the direction around the x axis by subtracting θb_y_obj from θb_y_s (=θb_y_s−θb_y_obj).

In addition, the processing of the error calculator 70 may be executed before the computational processing for controlling the vehicle performed in step S9. For example, the processing by the error calculator 70 may be executed during the processing of steps S5 or S7.

The center-of-gravity velocity calculator 72 receives an input of the current value of the base body tilting angular velocity observed value θbdot_xy_s (θbdot_x_s and θbdot_y_s) computed in step S2. In addition, the center-of-gravity velocity calculator 72 receives an input of the previous value ωw_xy_cmd_p (ωw_x_cmd_p and ωw_y_cmd_p) of the imaginary wheel velocity command ωw_xy_cmd from the delay element 84. In addition, the center-of-gravity velocity calculator 72 computes the center-of-gravity point velocity estimation value Vb_xy_s (Vb_x_s and Vb_y_s) from these inputs according to a predetermined arithmetic equation based on the inverted pendulum model.

In detail, the center-of-gravity velocity calculator 72 computes each of Vb_x_s and Vb_y_s according to the following equations 05x and 05y.

$$Vb\_x\_s = Rw\_x \cdot \omega w\_x\_cmd\_p + h\_x \cdot \theta bdot\_x\_s \quad \text{(Equation 05x)}$$

$$Vb\_y\_s = Rw\_y \cdot \omega w\_y\_cmd\_p + h\_y \cdot \theta bdot\_y\_s \quad \text{(Equation 05y)}$$

In these equations 05x and 05y, Rw_x and Rw_y each represent the radius of the wheels 62_x and 62_y, and are predetermined values. Further, h_x and h_y each represent the height of the mass points 60_x and 60_y of the inverted pendulum model. In this case, the height of the vehicle system center of gravity is maintained at an approximately constant level. Here, predetermined values are used for h_x and h_y. Thus, the heights h_x and h_y are included in the constant parameter, the value of which is set in steps S6 or S8.

The first term of the right side of the equation 05x is a moving velocity of the imaginary wheel 62_x in the x axis direction, corresponding to the previous value ωw_x_cmd_p of the velocity command of the imaginary wheel 62_x. This velocity corresponds to the current value of the actual velocity of the wheel assembly 5 in the x axis direction. Further, the second term of the right side of the equation 05x corresponds to the current value of the velocity of the vehicle system center of gravity in the x axis direction (the relative velocity with respect to the wheel assembly 5) due to the base body 9 tilting in the direction around the y axis in a tilting angular velocity of θbdot_x_s. These characteristics apply to equation 05y as well.

Further, a pair of observed values (current values) of the rotational angular velocity for each of the electric motors 31R and 31L measured based on the output of the rotary encoder 56R and 56L may be converted to a pair of rotational angular velocities for each of the imaginary wheels 62_x and 62_y. These rotational angular velocities may be used instead of ωw_x_cmd_p and ωwy_cmd_p in equations 05x and 05y. However, in terms of eliminating the influence of noise included in the observed value of the rotational angular velocity, it is more preferable to use the target values ωw_x_cmd_p and ωw_y_cmd_p.

Next, the control unit 50 executes the processing in the required center-of-gravity point velocity generator 74 and the gain adjustor 78. In this case, the required center-of-gravity point velocity generator 74 and the gain adjustor 78 each receives an input of the center-of-gravity point velocity estimation value Vb_xy_s (Vb_x_s and Vb_y_s) computed as described above in the center-of-gravity velocity calculator 72.

Further, when the operation mode of the vehicle 1 is in a boarding mode, the required center-of-gravity point velocity generator 74 determines the required center-of-gravity point velocity V_xy_aim (V_x_aim, V_y_aim) based on the inputted center-of-gravity point velocity estimation value Vb_xy_s (Vb_x_s and Vb_y_s). Details of the computation are described later. Incidentally, according to the present embodiment, when the operation mode of the vehicle 1 is in an autonomous mode, the required center-of-gravity point velocity generator 74 sets the required center-of-gravity point velocity V_x_aim and V_y_aim to zero.

Further, the gain adjustor 78 determines the gain adjustment parameter Kr_xy (Kr_x and Kr_y) based on the inputted center-of-gravity point velocity estimation value Vb_xy_s (Vb_x_s and Vb_y_s).

The processing by the gain adjustor 78 is described below with reference to FIGS. 10 and 11.

Figure 10:
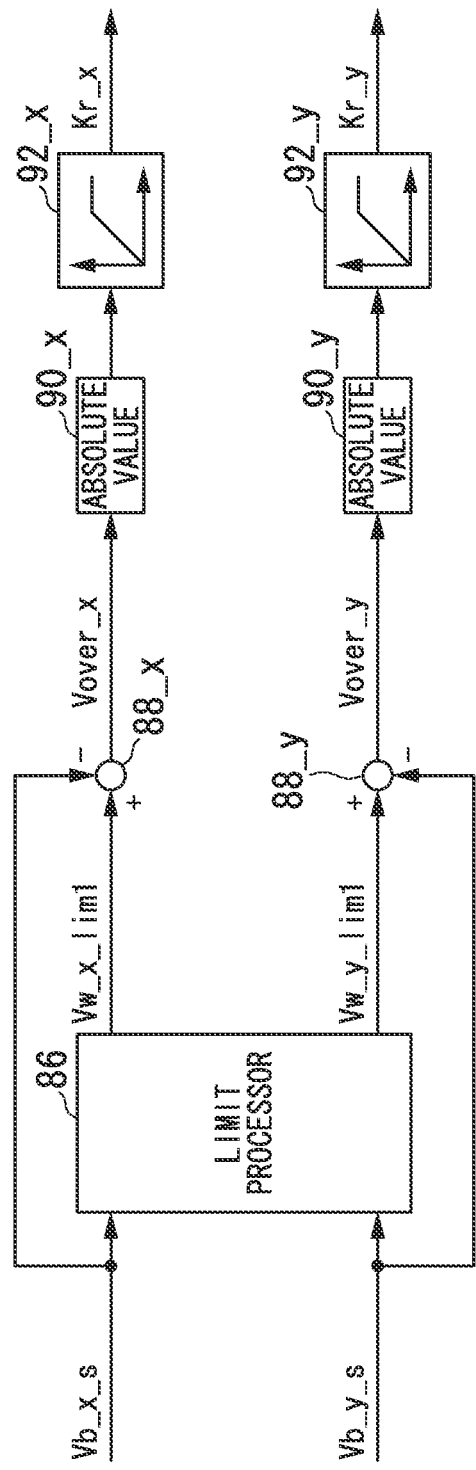
FIG. 10 is a block diagram showing a processing of a gain adjustor shown in FIG. 9.
Figure 11:
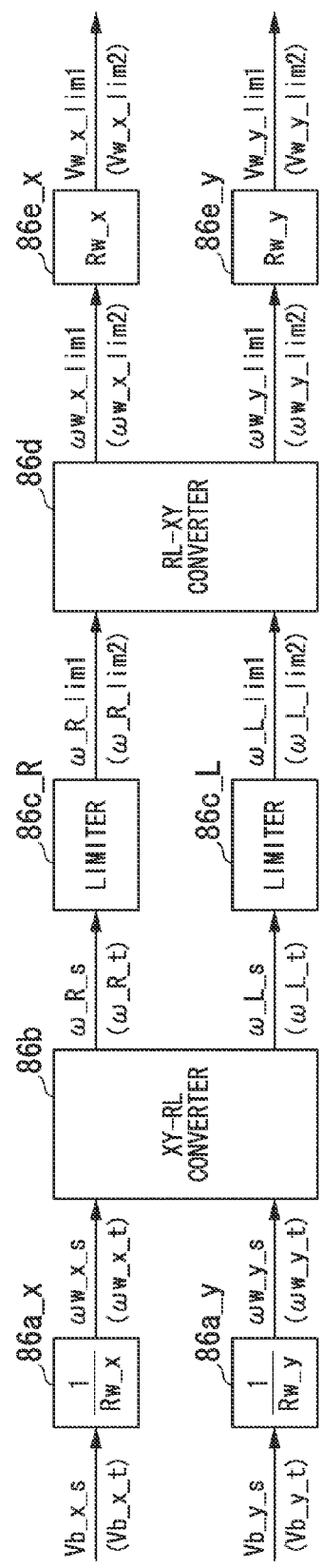
FIG. 11 is a block diagram showing a processing of a limiting processor shown in FIG. 10 (or a limiting processor shown in FIG. 12).

As shown in FIG. 10, the gain adjustor 78 enters the imputed center-of-gravity point velocity estimation values Vb_x_s and Vb_y_s to the limiting processor 86. This limiting processor 86 generates the output values Vw_x_lim1 and Vw_y_lim1 by adding a limitation according to the tolerable range of the rotational angular velocity of each of the electrically operated motors 31R and 31L to the center-of-gravity point velocity estimation value Vb_x_s and Vb_y_s. The output value Vw_x_lim1 indicates the value after the limitation imposed on the velocity Vw_x of the imaginary wheel 62_x in the x axis direction. The output value Vx_y_lim1 indicates the value after the limitation is imposed on the velocity Vw_y of the imaginary wheel 62_y in the y axis direction.

The processing by the limiting processor 86 is described in further detail with reference to FIG. 11. The parenthesized reference numerals in FIG. 11 represent a processing of the limiting processor 100 of the center-of-gravity point velocity restrictor 76, and may be ignored in the description concerning the procedure executed by the limiting processor 86.

The limiting processor 86 first enters the center-of-gravity point velocity estimation values Vb_x_s and Vb_y_s to the processors 86a_x and 86a_y. The processor 86a_x divides Vb_x_s with the radius Rw_x of the imaginary wheel 62_x, and computes the rotational angular velocity ωw_x_s of the imaginary wheel 62_x, in a case assuming that the moving velocity of the imaginary wheel 62_x in the x axis direction is matched with Vb_x_s. Similarly, the processor 86a_y computes the rotational angular velocity ωw_y_s (=Vb_y_s/Rw_y) of the imaginary wheel 62_y, in a case assuming that the moving velocity of the imaginary wheel 62_y in the y axis direction is matched with Vb_y_s.

Next, the limiting processor 86 converts the pair ωw_x_s and ωw_y_s into a pair of rotational angular velocity ω_R_s of the electric motor 31R and the rotational angular velocity ω_L_s of the electric motor 31L, via the XY-RL converter 86b.

This conversion is performed by solving the simultaneous equation of the unknowns ω_R_s and ω_L_s obtained by replacing the variables ωw_x, ωw_y, ω_R, and ω_L in the equations 01a and 01b into ωw_x_s, w_y_s, ω_R_s, and ω_L_s.

Next, the limiting processor 86 inputs the output values ω_R_s and ω_L_s of the XY-RL converter 86b respectively into the limiters 86c_R and 86c_L. At this time, when ω_R_s is within a tolerable range for the right motor comprising a predetermined upper limit (>0) and a lower limit (<0), the limiter 86c_R outputs ω_R_s directly as the output value ω_R_lim1. Meanwhile, when ω_R_s is outside of the tolerable range for the right motor, the limiter 86c_R outputs either one of the boundary values (the upper limit or the lower limit) of the tolerable range for the right motor closer to ω_R_s as the output value ω_R_lim1. As a result, the output value ω_R_lim1 of the limiter 86c_R is limited to a value within the tolerable range for the right motor.

Similarly, when ω_L_s is within a tolerable range for the left motor comprising a predetermined upper limit (>0) and a lower limit (<0), the limiter 86c_L outputs ω_L_s directly as the output value ω_L_lim1. Meanwhile, when ω_L_s is outside of the tolerable range for the left motor, the limiter 86c_L outputs either one of the boundary values (the upper limit or the lower limit) of the tolerable range for the left motor closer to ω_L_s as the output value ω_L_lim1. As a result, the output value ω_L_lim1 of the limiter 86c_L is limited to a value within the tolerable range for the left motor.

The tolerable range for the right motor is set in order to prevent the absolute value of the rotational angular velocity of the electric motor 31R at the right side from becoming too large, and to prevent the maximum value of the torque which can be outputted from the electric motor 31R from declining. This feature applies to the tolerable range for the left motor as well.

Next, the limiting processor 86 converts the pair of output values ω_R_lim1 and ω_L_lim1 of the limiters 86c_R and 86c_L to a pair of rotational angular velocity ωw_x_lim1 and ωw_y_lim1 of the imaginary wheels 62_x and 62_y through the RL-XY converter 86d.

This conversion is a reverse conversion process performed by the XY-RL converter 86b. This procedure is executed by solving the simultaneous equation of the unknowns ωw_x_lim1 and ωw_y_lim1 obtained by replacing the variables ωw_x, ωw_y, ω_R, and ω_L in the equations 01a and 01b into ωw_x_lim1, ωw_y_lim1, ω_R_lim1, and ω_L_lim1.

Next, the limiting processor 86 inputs the output values ωw_x_lim1 and ωw_y_lim1 from the RL-XY converter 86d into the processors 86e_x and 86e_y. The processor 86e_x multiplies ωw_x_lim1 with the radius Rw_x of the imaginary wheel 62_x, and thereby converts ωw_x_lim1 into the velocity Vw_x_lim1 of the imaginary wheel 62_x. Similarly, the processor 86e_y converts ωw_y_lim1 into the velocity Vw_y_lim1 (=ωw_y_lim1·Rw_y) of the imaginary wheel 62_y.

As a result of the processing executed by the limiting processor 86, when the velocity Vw_x of the imaginary wheel 62_x in the x axis direction and the velocity Vw_y of the imaginary wheel 62_y in the y axis direction are assumed to be respectively matched with the center-of-gravity point velocity estimation values Vb_x_s and Vb_y_s (i.e., when the velocity of the wheel assembly 5 in the x axis direction and the y direction is respectively matched with Vb_x_s and Vb_y_s), and when the rotational angular velocities ω_R_s and ω_L_s of the electric motors 31R and 31L necessary to attain the velocities are both within a tolerable range, the pair of output values Vw_x_lim1 and Vw_y_lim1 respectively matching Vb_x_s and Vb_y_s are outputted by the limiting processor 86.

Meanwhile, when both or either one of the rotational angular velocities ω_R_s and ω_L_s of the electric motors 31R and 31L is outside the tolerable range, both or either one of the rotational angular velocities is confined to be included in the tolerable range. Under this limitation, the pair of velocities Vw_x_lim1 and Vw_y_lim1 in the x axis direction and the y axis direction corresponding to the pair of rotational angular velocities ω_R_lim1 and ω_L_lim1 of the electric motors 31R and 31L is outputted from the limiting processor 86.

Therefore, under the compulsory, necessary condition that each of the rotational angular velocities of the electric motors 31R and 31L corresponding to the pair of output values Vw_x_lim1 and Vw_y_lim1 is not outside of the tolerable range, the limiting processor 86 generates a pair of output values Vw_x_lim1 and Vw_y_lim1 so that each of the output values Vw_x_lim1 and Vw_y_lim1 is matched respectively with Vb_x_s and Vb_y_s to the extent possible under the above necessary condition.

Returning to the description concerning FIG. 10, the gain adjustor 78 executes the processing of the calculators 88_x and 88_y. The calculator 88_x receives an input of the center-of-gravity point velocity estimation value Vb_x_s in the x axis direction and the output value Vw_x_lim1 of the limiting processor 86. Further, the calculator 88_x computes a value Vover_x by subtracting Vb_x_s from Vw_x_lim1 and outputs the value Vover_x. Further, the calculator 88_y receives an input of the center-of-gravity point velocity estimation value Vb_y_s in the y axis direction and the output value Vw_y_lim1 of the limiting processor 86. Further, the calculator 88_y computes a value Vover_y by subtracting Vb_y_s from Vw_y_lim1, and outputs the value Vover_y.

In this case, when the output values Vw_x_lim1 and Vw_y_lim1 were not compulsorily limited in the limiting processor 86, the following equations hold: Vw_x_lim1=Vb_x_s, Vw_y_lim1=Vb_y_s. Therefore, the output values Vover_x and Vover_y of each of the computational units 88_x and 88_y both becomes zero.

On the other hand, when the output values Vw_x_lim1 and Vw_y_lim1 of the limiting processor 86 are generated by imposing a compulsory limitation on the input values Vb_x_s and Vb_y_s, the corrected value (=Vw_x_lim1−Vb_x_s) of Vw_x_lim1 with respect to Vb_x_s and the corrected value (=Vw_y_lim1−Vb_y_s) of Vw_y_lim1 with respect to Vb_y_s are outputted by the calculators 88_x and 88_y.

Next, the gain adjustor 78 runs the output value Vover_x of the calculator 88_x through the processors 90_x and 92_x in order. In this way, the gain adjustor 78 determines the gain adjusting parameter Kr_x. Further, the gain adjustor 78 determines the gain adjusting parameter Kr_y by running the output value Vover_y of the calculator 88_y through the processors 90_y and 92_y in order. Further, the gain adjusting parameters Kr_x and Kr_y are both values between 0 and 1.

The processor 90_x computes the absolute value of the inputted Vover_x, and outputs the absolute value. Further, the processor 92_x generates Kr_x so that the output value Kr_x increases monotonically with respect to the inputted value |Vover_x| and so that Kr_x has a saturation characteristic. According to this saturation characteristic, when the input value becomes large to a certain degree, the change in the output value with respect to the increase in the input value becomes equal to or close to zero.

In this case, when the input value |Vover_x| is less than or equal to a predetermined value, the processor 92_x outputs the value obtained by multiplying the input value |Vover_x| with a predetermined proportionality coefficient as Kr_x. Further, when the input value |Vover_x| is greater than a predetermined value, the processor 92_x outputs "1" as Kr_x. Further, the proportionality coefficient is set so that, when |Vover_x| matches with a predetermined value, the product of |Vover_x| and the proportionality coefficient equals 1.

Further, the procedure performed by the processors 90_y and 92_y is similar to the procedure performed by the processors 90_x and 92_x as described above.

According to the procedure performed by the gain adjustor 78, when a compulsory limitation is not imposed on the output values Vw_x_lim1 and Vw_y_lim1 by the limiting processor 86, the gain adjusting parameters Kr_x and Kr_y are both set to zero. In other words, when the rotational angular velocity of each of the electric motors 31R and 31L fall within the tolerable range under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the gain adjusting parameters Kr_x and Kr_y are both set to zero.

Meanwhile, when the output values Vw_x_lim1 and Vw_y_lim1 of the limiting processor 86 is generated by imposing a compulsory limitation on the input values Vb_x_s and Vb_y_s, the values of the gain adjusting parameters Kr_x and Kr_y are determined according to the absolute values of the correction amount Vover_x and Vover_y. In other words, when either one of the rotational angular velocities of the electric motors 31R and 31L falls outside of the tolerable range (i.e., when the absolute value of either one of the rotational angular velocity becomes too high) under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the values of the gain adjusting parameters Kr_x and Kr_y are determined according to the absolute values of the correction amount Vover_x and Vover_y. In this case, Kr_x is determined so that the value of Kr_x increases as the absolute value of the corrected value Vx_over increases, with "1" being the upper limit. This characteristic applies to Kr_y as well.

Returning to the description regarding FIG. 9, the control unit 50 performs the procedure of the center-of-gravity point velocity restrictor 76 after performing the procedure of the center-of-gravity velocity calculator 72 and the required center-of-gravity point velocity generator 74 as described earlier.

The center-of-gravity point velocity restrictor 76 receives an input of the center-of-gravity point velocity estimation value Vb_xy_s (Vb_x_s and Vb_y_s) computed by the center-of-gravity velocity calculator 72 and the required center-of-gravity point velocity V_xy_aim (V_x_aim and V_y_aim) determined in the required center-of-gravity point velocity generator 74. The center-of-gravity point velocity restrictor 76 uses these input values, and carries out the procedure shown in the block diagram in FIG. 12, thereby determining the target center-of-gravity point velocity for control V_xy_mdfd (V_x_mdfd and V_y_mdfd).

In particular, the center-of-gravity point velocity restrictor 76 first executes the procedure of the steady-state error calculator 94_x and 94_y.

In this case, the steady-state error calculator 94_x receives an input of the center-of-gravity point velocity estimation value Vb_x_s in the x axis direction. At the same time, the steady-state error calculator 94_x receives an input of the previous value Vb_x_mdfd_p of the target center-of-gravity point velocity for control Vb_x_mdfd in the x axis direction via the delay element 96_x. In addition, the steady-state error calculator 94_x first inputs Vb_x_s to the proportional-differential compensation element (PD compensation element) 94a_x. This proportional-differential compensation element 94a_x is a compensation element such that the transfer function is expressed by 1+Kd·S. The proportional-differential compensation element 94a_x adds the inputted Vb_x_s along with a value obtained by multiplying a predetermined coefficient Kd with the differential (temporal rate of change) of Vb_x_s, and outputs sum obtained by the addition.

Next, the steady-state error calculator 94_x computes, via the calculator 94b_x, a value obtained by subtracting the inputted Vb_x_mdfd_p from the output value of the steady-state error calculator 94_x. Then, the steady-state error calculator 94_x inputs the output value of the calculator 94b_x to the low pass filter 94c_x comprising a phase compensation feature. This low pass filter 94c_x is a filter such that the transfer function is represented by (1+Tg2·S)/(1+Tg1·S). Furthermore, the steady-state error calculator 94_x outputs the output value Vb_x_prd of the low pass filter 94c_x.

Furthermore, the center-of-gravity point velocity estimation value Vb_y_s in the y axis direction is inputted to the steady-state error calculator 94_y. At the same time, the previous value Vb_y_mdfd_p of the target center-of-gravity point velocity for control Vb_y_mdfd in the y axis direction is inputted via the delay element 96_y.

Moreover, similar to the steady-state error calculator 94_x described above, the steady-state error calculator 94_y performs, in series, the processing of the proportional-differential compensation element 94a_y, the calculator 94b_y, and the low pass filter 94c_y. In this way, the steady-state error calculator 94_y outputs the output value Vb_y_prd of the low pass filter 94c_y.

Here, the output value Vb_x_prd of the steady-state error calculator 94_x refers to a steady state differential of the to-be-converged value of the future center-of-gravity point velocity estimation value in the x axis direction with respect to the target center-of-gravity point velocity for control Vb_x_mdfd, estimated by the current condition of the movement of the vehicle system center of gravity seen from the y axis direction (i.e., the condition of the movement of the mass point 60_x of the inverted pendulum model seen from the y axis direction). At the same time, the output value Vb_y_prd of the steady-state error calculator 94_y refers to a steady state differential of the to-be-converged value of the future center-of-gravity point velocity estimation value in the y axis direction with respect to the target center-of-gravity point velocity for control Vb_y_mdfd, estimated by the current condition of the movement of the vehicle system center of gravity seen from the x axis direction (i.e., the condition of the movement of the mass point 60_y of the inverted pendulum model seen from the x axis direction). Hereinafter, the output values Vb_x_prd and Vb_y_prd of the steady-state error calculators 94_x and 94_y are called the center-of-gravity point velocity steady state deviation estimation value.

The center-of-gravity point velocity limiting unit 76 performs the process of the steady-state error calculators 94_x and 94_y as described above. Then, the center-of-gravity point velocity limiting unit 76 performs a procedure adding the required center-of-gravity point velocity Vb_x_aim to the output value Vb_x_prd of the steady-state error calculator 94_x by the calculator 98_x. The center-of-gravity point velocity limiting unit 76 performs a procedure adding the required center-of-gravity point velocity Vb_y_aim to the output value Vb_y_prd of the steady-state error calculator 94_y by the calculator 98_y.

Therefore, the output value Vb_x_t of the calculator 98_x becomes a velocity obtained by adding the required center-of-gravity point velocity Vb_x_aim in the x axis direction to the center if gravity velocity steady state deviation estimation value Vb_x_prd in the x axis direction. Similarly, the output value Vb_y_t of the calculator 98_y becomes a velocity obtained by adding the required center-of-gravity point velocity Vb_y_aim in the y axis direction to the center if gravity velocity steady state deviation estimation value Vb_y_prd in the x axis direction.

Further, when the operation mode of the vehicle 1 is in an autonomous mode and the like, and the required center-of-gravity point velocity Vb_x_aim in the x axis direction is zero, the center-of-gravity point velocity steady state deviation estimation value Vb_x_prd in the x axis direction becomes the output value Vb_x_t of the calculator 98_x. Similarly, when the required center-of-gravity point velocity Vb_y_aim in the y axis direction becomes zero, the center-of-gravity point velocity steady state deviation estimation value Vb_y_prd in the y axis direction becomes the output value Vb_y_t of the calculator 98_y.

Next, the center-of-gravity point velocity restrictor 76 enters the output values Vb_x_t and Vb_y_t of the calculators 98_x and 98_y to the limiting processor 100. The procedure executed by the limiting processor 100 is the same as the procedure executed by the limiting processor 86 of the gain adjustor 78. In this case, as indicated by the parenthesized reference numerals shown in FIG. 11, only the input value and the output value of each processors of the limiting processor 100 differs from the limiting processor 86.

In particular, according to the limiting processor 100, the processors 86a_x and 86a_y each computes the rotational angular velocities ωw_x_t and ωw_y_t of the imaginary wheels 62_x and 62_y in a case in which the velocities Vw_x and Vw_y of the imaginary wheels 62_x and 62_y are matched with Vb_x_t and Vb_y_t. In addition, the pair of rotational angular velocities ωw_x_t and ωw_y_t are converted to a pair of rotational angular velocities ω_R_t and ω_L_t of the electric motors 31R and 31L by the XY-RL converter 86b.

Further, these rotational angular velocities ω_Rt and ω_L_t are respectively limited to a value within a tolerable range for the right motor and a value within a tolerable range for the left motor, due to the limiters 86c_R and 86c_L. Further, the values ω_R_lim2 and ω_L_lim2 obtained after this limitation process are converted to the rotational angular velocities ωw_x_lim2 and ωw_y_lim2 of the imaginary wheels 62_x and 62_y by the RL-XY converter 86d. Next, the velocities Vw_x_lim2 and Vw_y_lim2 of each of the imaginary wheels 62_x and 62_y corresponding to each of the rotational angular velocities ωw_x_lim2 and ωw_y_lim2 are computed respectively by the processors 86e_x and 86e_y. These velocities Vw_x_lim2 and Vw_y_lim2 are outputted by the limiting processor 100.

Due to the procedure executed by the limiting processor 100, in a manner similar to the limiting processor 86, under the compulsory, necessary condition that each of the rotational angular velocities of the electric motors 31R and 31L corresponding to the pair of output values Vw_x_lim2 and Vw_y_lim2 is not outside of the tolerable range, the limiting processor 100 generates a pair of output values Vw_x_lim2 and Vw_y_lim2 so that each of the output values Vw_x_lim2 and Vw_y_lim2 is matched respectively with Vb_x_t and Vb_y_t to the extent possible under the above necessary condition.

Incidentally, each of the tolerable range for the right motor and the left motor regarding the limiting processor 100 need not be the same as each of the tolerable range for the right motor and the left motor regarding the limiting processor 86. Different tolerable ranges may be set for the limiting processors 86 and 100.

Figure 12:
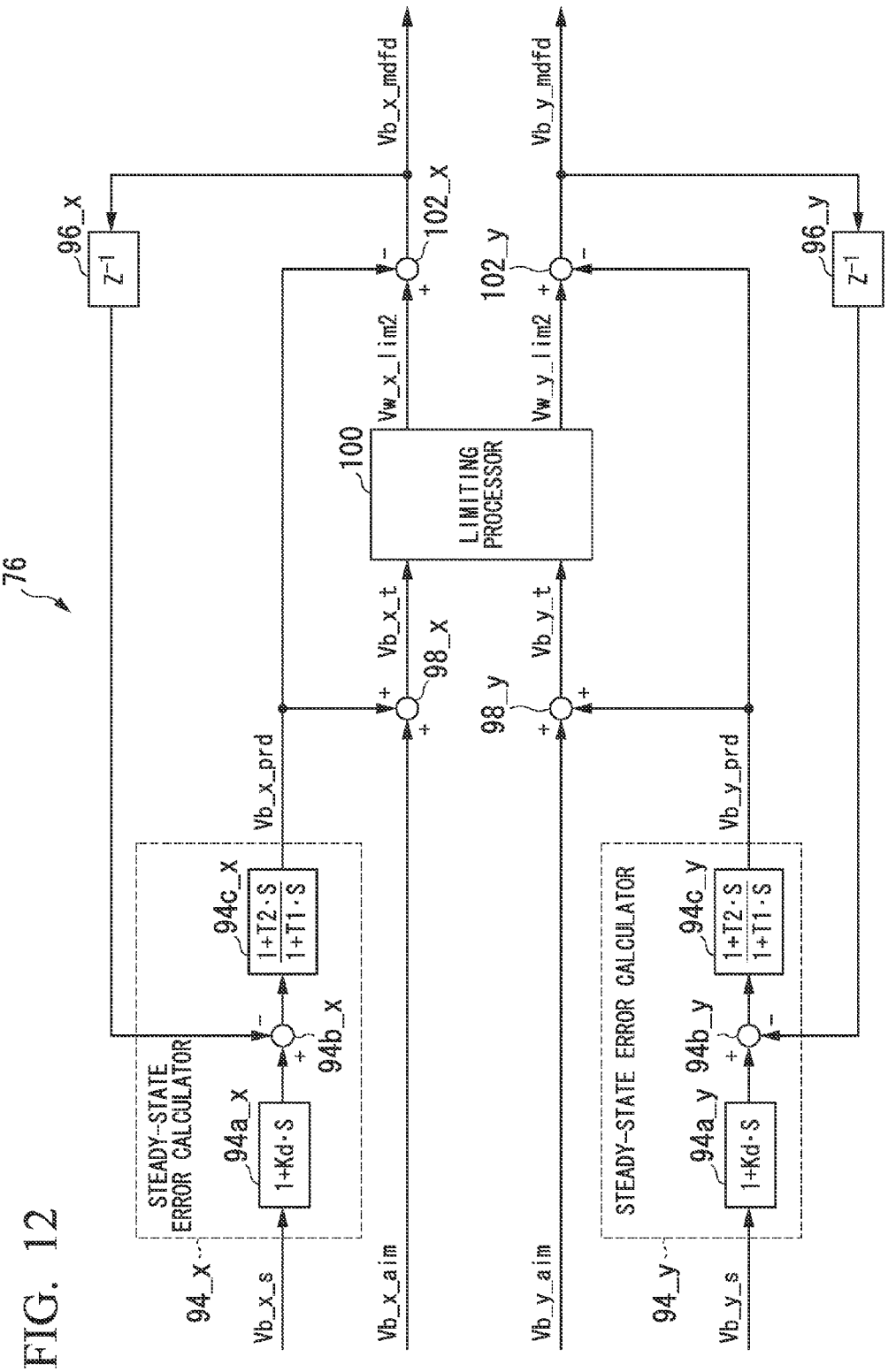
FIG. 12 is a block diagram showing a processing of a center-of-gravity point velocity restrictor 76 shown in FIG. 9.

Returning to the description of FIG. 12, the center-of-gravity point velocity restrictor 76 computes the target center-of-gravity point velocities for control Vb_x_mdfd and Vb_y_mdfd, by performing the procedure of the calculators 102_x and 102_y. In this case, the calculator 102_x computes the target center-of-gravity point velocity for control Vb_x_mdfd in the x axis direction as a value obtained by subtracting the center-of-gravity point velocity steady state deviation estimation value Vb_x_prd in the x axis direction from the output value Vw_x_lim2 of the limiting processor 100. Similarly, the calculator 102_y computes the target center-of-gravity point velocity for control Vb_y_mdfd in the y axis direction as a value obtained by subtracting the center-of-gravity point velocity steady state deviation estimation value Vb_y_prd in the y axis direction from the output value Vw_y_lim2 of the limiting processor 100.

When a compulsory limitation is not imposed on the output values V_x_lim2 and V_y_lim2 by the limiting processor 100, the target center-of-gravity point velocity for control Vb_x_mdfd and Vb_y_mdfd determined as described above is set to be equal to the required center-of-gravity point velocity Vb_x_aim and Vb_y_aim. In other words, when the rotational angular velocity of each of the electric motors 31R and 31L fall within the tolerable range under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd and Vb_y_mdfd is set to be equal to the required center-of-gravity point velocity Vb_x_aim and Vb_y_aim.

Incidentally, in this case, when the required center-of-gravity point velocity Vb_x_aim in the x axis direction equals zero, the target center-of-gravity point velocity for control Vb_x_mdfd in the x axis direction also equals zero as well. Further, when the required center-of-gravity point velocity Vb_y_aim in the y axis direction equals zero, the target center-of-gravity point velocity for control Vb_y_mdfd in the y axis direction also equals zero as well.

Meanwhile, when the output values Vw_x_lim2 and Vw_y_lim2 of the limiting processor 100 is generated by imposing a compulsory limitation on the input values Vb_x_t and Vb_y_t, the target center-of-gravity point velocity for control Vb_x_mdfd in the x axis direction is determined to be a value obtained by correcting the required center-of-gravity point velocity Vb_x_aim by a correction amount of the output value Vw_x_lim2 of the limiting processor 100 with respect to the input value Vb_x_t (=Vw_x_lim2−Vb_x_t). Thus, the value is obtained by adding the correction amount to Vb_x_aim. In other words, when either one of the rotational angular velocities of the electric motors 31R and 31L falls outside of the tolerable range (i.e., when the absolute value of either one of the rotational angular velocity becomes too high) under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd in the x axis direction is determined to be a value obtained by correcting the required center-of-gravity point velocity Vb_x_aim by the correction amount described above.

Further, regarding the y axis direction, the target center-of-gravity point velocity for control Vb_y_mdfd in the y axis direction is determined to be a value obtained by correcting the required center-of-gravity point velocity Vb_y_aim by a correction amount of the output value Vw_y_lim2 of the limiting processor 100 with respect to the input value Vb_y_t (=Vw_y_lim2−Vb_y_t). Thus, the value is obtained by adding the correction amount to Vb_y_aim.

In this case, regarding the velocity in the x axis direction for example, when the required center-of-gravity point velocity Vb_x_aim is not zero, the target center-of-gravity point velocity for control Vb_x_mdfd either approaches zero to a greater extent compared to the required center-of-gravity point velocity Vb_x_aim, or becomes a velocity facing the opposite direction with respect to the required center-of-gravity point velocity Vb_x_aim. Further, when the required center-of-gravity point velocity Vb_x_aim equals zero, the target center-of-gravity point velocity for control Vb_x_mdfd becomes a velocity facing the opposite direction with respect to the center-of-gravity point velocity steady state deviation estimation value Vb_x_prd in the x axis direction outputted by the steady-state error calculator 94_x. These characteristics apply to the velocity in the y axis direction.

The center-of-gravity point velocity limiting unit 76 executes the procedure as described above.

Returning to the description regarding FIG. 9, the control unit 50 performs the procedure of the posture control calculator 80 after performing the procedure of the center-of-gravity velocity calculator 72, the center-of-gravity point velocity restrictor 76, the gain adjustor 78, and the error calculator 70 as described earlier.

The procedure of the posture control calculator 80 is described below with reference to FIG. 13. Incidentally, in FIG. 13, the reference numeral without a parenthesis relates to a procedure determining the imaginary wheel rotational angular velocity command ωw_x_cmd, which is a target value of the rotational angular velocity of the imaginary wheel 62_x rolling in the x axis direction. The parenthesized reference numeral relates to a procedure determining the imaginary wheel rotational angular velocity command ωw_y_cmd, which is a target value of a rotational angular velocity of the imaginary wheel 62_y rolling in the y axis direction.

The posture control calculator 80 receives an input of the base body tilt angle deviation observed value θbe_xy_s computed by the deviation calculator 70, the base body tilting angular velocity observed value θbdot_xy_s computed in step S2, a center-of-gravity point velocity estimation value Vb_xy_s computed by the center-of-gravity velocity calculator 72, the target center-of-gravity point velocity Vb_xy_cmd computed by the center-of-gravity point velocity restrictor 76, and the gain adjusting parameter Kr_xy computed by the gain adjustor 78. The posture control calculator 80 first uses these input values to compute the imaginary wheel rotational angular acceleration command ωwdot_xy_cmd based on the following equations 07x and 07y.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{(Equation 07x)}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{(Equation 07y)}$$

Therefore, the imaginary wheel rotational angular acceleration command ωwdot_x_cmd and the imaginary wheel rotational angular acceleration command ωwdot_y_cmd are both determined by adding up three elements of a motor manipulated variable (the three terms in the right side of the equations 07x and 07y). The imaginary wheel rotational angular acceleration command ωwdot_x_cmd is a motor manipulated variable (control input) for controlling the movement of the mass point 60_x of the inverted pendulum type model seen from the y axis direction (i.e., the movement of the vehicle system center of gravity seen from the y axis direction). The imaginary wheel rotational angular acceleration command ωwdot_y_cmd is a motor manipulated variable (control input) for controlling the movement of the mass point 60_y of the inverted pendulum type model seen from the x axis direction (i.e., the movement of the vehicle system center of gravity seen from the x axis direction).

In this case, the gain coefficients K1_x, K2_x, and K3_x relating to each element of the motor manipulated variable in the equation 07x is set variably according to the gain adjustment parameter Kr_x. The gain coefficients K1_y, K2_y, and K3_y relating to each element of the motor manipulated variable in equation 07y are set variably according to the gain adjustment parameter Kr_y. Hereinafter, each of the gain coefficients K1_x, K2_x, and K3_x in equation 07x may be referred to as the first gain coefficient K1_x, the second gain coefficient K2_x, and the third gain coefficient K3_x. This characteristic applies to the gain coefficients K1_y, K2_y, and K3_y in equation 07y as well.

Figure 13:
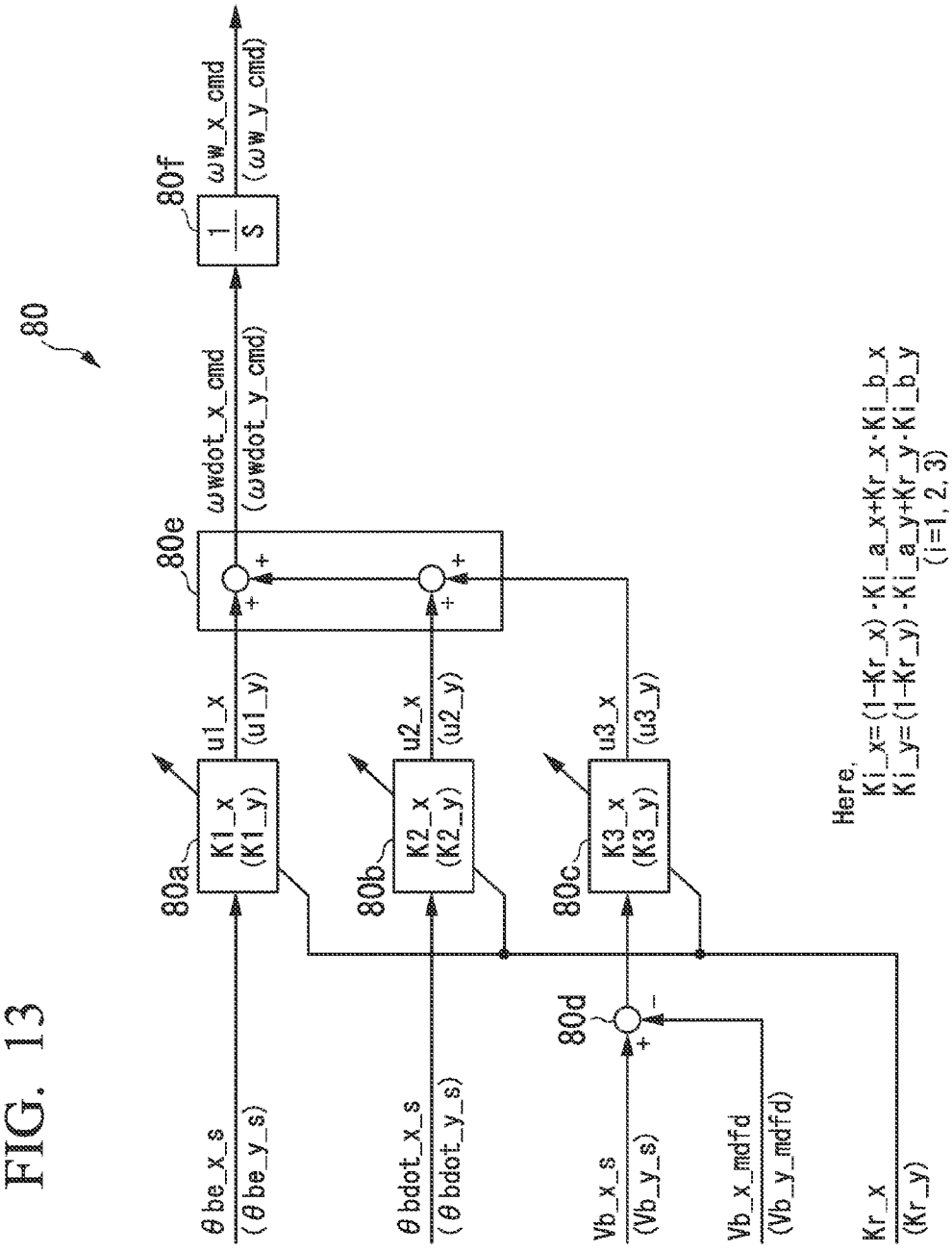
FIG. 13 is a block diagram showing a processing of a posture control calculator 80 shown in FIG. 9.

The i-th gain coefficient Ki_x (i=1, 2, 3) in equation 07x and the i-th gain coefficient Ki_y (i=1, 2, 3) in equation 07y are determined, as indicated in the comments shown in FIG. 13, according to the gain adjustment parameters Kr_x and Kr_y based on the following equations 09x and 09y.

$$Ki\_x = (1 - Kr\_x) \cdot Ki\_a\_x + Kr\_x \cdot Ki\_b\_x \quad \text{(Equation 09x)}$$

$$Ki\_y = (1 - Kr\_y) \cdot Ki\_a\_y + Kr\_y \cdot Ki\_b\_y \quad \text{(Equation 09y)}$$

(i=1, 2, 3)

Here, Ki_a_x and Ki_b_x in equation 09x are constant values predetermined as a gain coefficient value at the side of the minimum value of the i-th gain coefficient Ki_x (closer to the "0" side) and a gain coefficient value at the side of the maximum value of the i-th gain coefficient Ki_x (toward the side moving away from "0"). This characteristic applies to Ki_a_y and Ki_b_y in equation 09y.

Therefore, each of the i-th gain coefficient Ki_x (i=1, 2, 3) used in the equation 07x is determined as a weighted average of the constants Ki_a_x and Ki_b_x corresponding to each of the i-th gain coefficient Ki_x. Further, in this case, the weight on each of Ki_a_x and Ki_b_x is varied according to the gain adjustment parameter Kr_x. Therefore, in the case of Kr_x=0, Ki_x becomes equal to Ki_a_x. In the case of Kr_x=1, Ki_x becomes equal to Ki_b_x. Further, as Kr_x becomes closer to "1" from "0," the i-th gain coefficient Ki_x becomes closer to Ki_b_x from Ki_a_x.

Similarly, each of the i-th gain coefficient Ki_y (i=1, 2, 3) used in the equation 07y is determined as a weighted average of the constants Ki_a_y and Ki_b_y corresponding to each of the i-th gain coefficient Ki_y. Further, in this case, the weight on each of Ki_a_y and Ki_b_y is varied according to the gain adjustment parameter Kr_y. Therefore, in a case similar to Ki_x, as the value of Kr_y varies between "0" and "1," the value of the i-th gain coefficient Ki_y varies between Ki_a_y and Ki_b_y.

To supplement, the constant values Ki_a_x, Ki_b_x, Ki_a_y, and Ki_b_y (i=1, 2, 3) are included in the constant parameters whose values are determined in step S6 or S8.

The posture control calculator 80 performs the computation in the equation 07x using the first to third gain coefficients K1_x, K2_x, and K3_x determined as described above. In this way, the posture control calculator 80 computes the imaginary wheel rotational angular acceleration command ωwdot_x_cmd relating to the imaginary wheel 62_x rotating in the x axis direction.

In further detail, in reference to FIG. 13, the posture control calculator 80 computes a motor manipulated variable component u1_x and a motor manipulated variable component u2_x respectively in the processors 80a and 80b. The motor manipulated variable component u1_x is obtained by multiplying the first gain coefficient K1_x with the base body tilt angle deviation observed value θbe_x_s. The motor manipulated variable component u2_x is obtained by multiplying the base body tilting angular velocity observed value θbdot_x_s with the second gain coefficient K2_x. Furthermore, the posture control calculator 80 computes the deviation between the center-of-gravity point velocity estimation value Vb_x_s and the target center-of-gravity point velocity for control Vb_x_mdfd (=Vb_x_s−Vb_x_mdfd) at the calculator 80d. The posture control calculator 80 then computes a motor manipulated variable component u3_x at the processor 80c obtained by multiplying the deviation with the third gain coefficient K3_x. Further, the posture control calculator 80 computes the imaginary wheel rotational angular acceleration command ωwdot_x_cmd by adding up these motor manipulated variable components u1_x, u2_x, and u3_x at the calculator 80e.

Similarly, the posture control calculator 80 performs the computation of the equation 07y by using the first to third gain coefficients K1_y, K2_y, and K3_y determined as described above. In this way, the posture control calculator 80 computes the imaginary wheel rotational angular acceleration command ωwdot_y_cmd concerning the imaginary wheel 62_y rolling in the y axis direction.

In this case, the posture control calculator 80 computes the motor manipulated variable component u1_y and the motor manipulated variable component u2_y respectively in the processors 80a and 80b. The motor manipulated variable component u1_y is obtained by multiplying the first gain coefficient K1_y with the base body tilt angle deviation observed value θbe_y_s. The motor manipulated variable component u2_y is obtained by multiplying the base body tilting angular velocity observed value θbdot_y_s with the second gain coefficient K2_y. Furthermore, the posture control calculator 80 computes the deviation between the center-of-gravity point velocity estimation value Vb_y_s and the target center-of-gravity point velocity for control Vb_y_mdfd (=Vb_y_s−Vb_y_mdfd) at the calculator 80d. The posture control calculator 80 then computes the motor manipulated variable component u3_y at the processor 80c obtained by multiplying the deviation with the third gain coefficient K3_y. Further, the posture control calculator 80 computes the imaginary wheel rotational angular acceleration command ωwdot_x_cmd by adding up these motor manipulated variable components u1_y, u2_y, and u3_y at the calculator 80e.

Here, the first element (=the first motor manipulated variable component u1_x) and the second element (=the second motor manipulated variable component u2_x) of the right side of the equation 07x is a feedback motor manipulated variable component for converging the base body tilting angular deviation observed value θbe_x_s around the y axis direction to zero according to the PD law (proportional-differential law), being the feedback control law. In other words, the base body tilt angle observed value θb_x_s is converged to the target value θb_x_obj.

Further, the third element (=the third motor manipulated variable component u3_x) of the right side of the equation 07x is a feedback motor manipulated variable component for converging the deviation between the center-of-gravity point velocity estimation value Vb_x_s and the target center-of-gravity point velocity Vb_x_mdfd to zero according to the proportionality law being the feedback control law. In other words, Vb_x_s is converged to Vb_x_mdfd.

These characteristics apply to the first to third elements (the first to third motor manipulated variable components u1_y, u2_y, and u3_y) of the right side of the equation 07y as well.

As described above, the posture control calculator 80 computes the imaginary wheel rotational velocity commands ωw_x_cmd and ωw_y_cmd by first computing the imaginary wheel rotational angular acceleration commands ωwdot_x_cmd and ωwdot_y_cmd, then integrating ωwdot_x_cmd and ωwdot_y_cmd by the integrator 80f.

Above is a detailed description of the processing by the posture control calculator 80.

In particular, the imaginary wheel rotational angular acceleration command ωwdot_x_cmd may be computed based on an equation obtained by separating the third element of the right side of the equation 07x into the motor manipulated variable component according to Vb_x_s (=K3_x ·Vb_x_s) and the motor manipulated variable component according to Vb_x_mdfd (=−K3_x ·Vb_x_mdfd). Similarly, the imaginary wheel rotational angular acceleration command ωwdot_x_cmd may be computed by the equation obtained by separating the third element of the right side of the equation 07x into the motor manipulated variable component according to Vb_y_s (=K3_y ·Vb_y_s) and the motor manipulated variable component according to Vb_y_mdfd (=−K3_y·Vb_y_mdfd).

Further, according to the vehicle 1, the rotational angular acceleration commands ωw_x_cmd and ωw_y_cmd of the imaginary wheel 62_x and 62_y was used as the motor manipulated variable (control input) for controlling the behavior of the vehicle system center of gravity. However, it is possible to use the driving torque of the imaginary wheels 62_x and 62_y or a translational force obtained by multiplying the driving torque with the radius Rw_x and Rw_y of the imaginary wheels 62_x and 62_y. Here, the translational force is the frictional force between the floor surface and the imaginary wheels 62_x and 62_y.

Returning to the description of FIG. 9, the control unit 50 next inputs the imaginary wheel rotational velocity commands ωw_x_cmd and ωw_y_cmd, determined at the posture control calculator 80 as described above, into the motor command calculator 82, and then executes the processing of this motor command calculator 82. In this way, the velocity command ω_R_cmd of the electric motor 31R and the velocity command ω_L_cmd of the electric motor 31L are determined The processing of this motor command calculator 82 is the same as the processing of the XY-RL converter 86b of the limiting processor 86 (see FIG. 11).

In particular, the motor command calculator 82 determines the velocity commands ω_R_cmd and ω_L_cmd of the electric motors 31R and 31L by solving the simultaneous equation of the unknowns ω_R_cmd and ω_L_cmd obtained by replacing the variables ωw_x, ωw_y, ω_R, and ω_L in the equations 01a and 01b into ωw_x_cmd, w_y_cmd, ω_R_cmd, and ω_L_cmd.

In this way, the computational processing for controlling the vehicle in step S9 is completed.

By executing the control computational process by the control unit 50 as described above, the imaginary wheel rotational angular acceleration command ωwdot_xy_cmd is determined as the motor manipulated variable (control input), so that, in both the boarding mode and the autonomous mode, the posture of the base body 9 is generally maintained so that both of the base body tilt angle deviation observed value θbe_x_s and θbe_y_s are equal to zero (this posture is hereinafter referred to as the basic posture). In other words, ωwdot_xy_cmd is maintained so that the position of the vehicle system center of gravity (the vehicle/occupant integrated center-of-gravity point or the singular vehicle body center-of-gravity point) is placed approximately right above the surface at which the wheel assembly 5 contacts the ground surface. In more detail, the imaginary wheel rotational angular acceleration command ωwdot_xy_cmd is determined so that the posture of the base body 9 is maintained at the basic posture while the center-of-gravity point velocity estimation value Vb_xy_s as the velocity of the vehicle system center of gravity is converged to the target center-of-gravity point velocity for control Vb_xy_mdfd. Incidentally, the target center-of-gravity point velocity for control Vb_xy_mdfd is normally zero (as long as the occupant, etc. does not apply an additional impellent force on the vehicle 1 in the boarding mode). In this case, the imaginary wheel rotational angular acceleration command ωwdot_xy_cmd is determined so that the posture of the base body 9 is maintained at the basic posture, and that the vehicle system center of gravity is generally static.

Further, the rotational angular velocity of the electric motors 31R and 31L, obtained by converting the imaginary wheel rotational angular velocity command ωw_xy_cmd obtained by integrating each element of ωwdot_xy_cmd, is determined as the velocity commands ω_R_cmd and ω_L_cmd of the electric motors 31R and 31L. Further, according to this velocity commands ω_R_cmd and ω_L_cmd, the rotational velocity of each of the electric motors 31R and 31L is controlled. Furthermore, the velocity of the wheel assembly 5 in the x axis direction and the y axis direction is controlled so as to match respectively the moving velocity of the imaginary wheel 62_x corresponding to ωw_x_cmd, and the moving velocity of the imaginary wheel 62_y corresponding to ωw_y_cmd.

Therefore, for example, around the y axis direction, when the actual base tilt angle θb_x deviates so as to tilt forward with respect to the target value θb_x_obj, the wheel assembly 5 moves forward so as to cancel out the deviation (i.e., so as to converge θbe_x_s to zero). Similarly, when the actual θb_x deviates so as to tilt backward with respect to the target value θb_x_obj, the wheel assembly 5 moves backward so as to cancel out the deviation (i.e., so as to converge θbe_x_s to zero).

In addition, for example, around the x axis direction, when the actual base body tilt angle θb_y deviates so as to tilt toward the right with respect to the target value θb_y_obj, the wheel assembly 5 moves toward the right so as to cancel out the deviation (i.e., so as to converge θbe_y_s to zero). Similarly, when the actual θb_y deviates so as to tilt toward the left with respect to the target value θb_y_obj, the wheel assembly 5 moves toward the left so as to cancel out the deviation (i.e., so as to converge θbe_y_s to zero).

Further, when both of the base body tilt angles θ4b_x and θb_y deviates respectively from the target values θb_x_obj and θb_y_obj, the movement of the wheel assembly 5 in the front and back directions for canceling out the deviation in θb_x and the movement of the wheel assembly 5 in the left and right directions for cancelling out the deviation in θb_y are combined. The wheel assembly 5 moves in the synthetic direction of the x axis direction and the y axis direction. This synthetic direction refers to a direction tilting with respect to both the x axis direction and the y axis direction.

In this way, when the base body 9 tilts with respect to the base body, the wheel assembly 5 moves in a direction towards which the base body 9 is tilting. Therefore, when, in a boarding mode for example, the occupant tilts his or her upper body intentionally, the wheel assembly 5 moves in a direction in which the tilting occurs.

Incidentally, when the target center-of-gravity point velocity for control Vb_x_mdfd and Vb_y_mdfd equals zero, and when the posture of the base body 9 converges to the basic posture, the movement of the wheel assembly 5 also halts. In addition, for example, when the tilt angle θb_x of the base body 9 in a direction around the y axis is maintained at a constant angle tilting from the basic posture, the velocity of the wheel assembly 5 in the x axis direction converges to the constant velocity corresponding to the angle. This velocity comprises a certain steady state deviation with respect to the target center-of-gravity point velocity for control Vb_x_mdfd. This characteristic applies when the tilt angle θb_y of the base body 9 around the x axis direction is maintained at a certain angle tilting from the basic posture.

In addition, for instance, when both of the required center-of-gravity point velocities Vb_x_aim and Vb_y_aim generated by the required center-of-gravity point velocity generator 74 are zero, when the amount of tilting of the base body 9 from the basic posture 9 (the base body tilt angle deviation observed value θbe_x_s and θbe_y_s) becomes relatively large, and when one or both velocities of the wheel assembly 5 in the x axis direction or the y axis direction necessary to cancel out the tilting or to maintain that amount of tilting (these velocities respectively correspond to the center-of-gravity point velocity steady state deviation estimation value Vb_x_prd and Vb_y_prd shown in FIG. 12) becomes too large so that one or both of the rotational angular velocities of the electric motors 31R, 31L will exceed the tolerable range, a velocity (in particular, Vw_x_lim2−Vb_x_prd and Vw_y_lim2−Vb_y_prd) in a direction opposite to the velocity of the wheel assembly 5 will be determined as a target center-of-gravity point velocity for control Vb_x_mdfd and Vb_y_mdfd. Furthermore, the motor manipulated variable components u3_x and u3_y amount the motor manipulated variable components comprised in the control input are determined so that the center-of-gravity point velocity estimation value Vb_x_s and Vb_y_s are respectively converged to the target center-of-gravity point velocity for control Vb_x_mdfd and Vb_y_mdfd. As a result, the base body 9 is prevented from tilting too far from the basic posture. In addition, one or both of the rotational angular velocities of the electric motors 31R, 31L is prevented from being too large.

In addition, at the gain adjustor 78, when one or both of the center-of-gravity point velocity estimation values Vb_x_s and Vb_y_s become large, and when one or both velocities of the wheel assembly 5 in the x axis direction and the y axis direction necessary to cancel out the tilting of the base body 9 from the basic posture or to maintain that amount of tilting becomes too large so that one or both of the rotational angular velocities of the electric motors 31R, 31L will exceed the tolerable range, one or both of the gain adjustment parameters Kr_x and Kr_y come closer to 1 from 0 as the amount of the rotational angular velocity exceeding the tolerable range becomes strikingly large (in particular, as the absolute value of the Vover_x and Vover_y shown in FIG. 10 becomes large).

In this case, each of the i-th gain coefficient Ki_x (i=1, 2, 3) computed by the equation 09x becomes closer to the constant Ki_b_x at the maximum side from the constant Ki_a_x at the minimum side, as Kr_x approaches 1. This characteristic applies to each of the i-th gain coefficients Ki_y (i=1, 2, 3) computed by the equation 09y.

Further, because the absolute value of the gain coefficient becomes large, the sensitivity of the motor manipulated variable (the imaginary wheel rotational angular acceleration commands ωwdot_x_cmd and ωwdot_y_cmd) with respect to the change in the tilting of the base body 9 becomes high. Therefore, when the amount of tilting from the basic posture of the base body 9 becomes large, the velocity of the wheel assembly 5 will be controlled in order to swiftly resolve the large tilting. Therefore, the large tilting of the base body 9 from the basic posture is strongly restrained. Further, one or both of the velocities of the wheel assembly 5 in the x axis direction or the y axis direction is prevented from becoming too large so as to make one or both of the rotational angular velocities of the electric motors 31R, 31L deviate from the tolerant range.

Further, in the boarding mode, when the required center-of-gravity point velocity generator 74 generates a required center-of-gravity point velocity Vb_x_aim, Vb_y_aim (a required center-of-gravity point velocity such that one or both of the gravity velocities Vb_x_aim and Vb_y_aim is not "0") according to a request based on the driving operation of the occupant, the required center-of-gravity point velocities Vb_x_aim, Vb_y_aim are determined respectively as the target center-of-gravity point velocity for control Vb_x_mdfd and Vb_y_mdfd, as long as one or both of the rotational angular velocities of the electric motors 31R, 31L does not become a large rotational angular velocity so as to exceed the tolerant range (in particular, as long as Vw_x_lim2 and Vw_y_lim2 indicated in FIG. 12 respectively matches Vb_x_t and Vb_y_t). Therefore, the velocity of the wheel assembly 5 is controlled so as to attain the required center-of-gravity point velocity Vb_x_aim and Vb_y_aim (i.e., so that the actual center-of-gravity point velocity approaches the required center-of-gravity point velocities Vb_x_aim and Vb_y_aim).

Next, the processing by the required center-of-gravity point velocity generator 74 is described, which was briefly mentioned earlier.

According to the present embodiment, the required center-of-gravity point velocity generator 74 sets the required center-of-gravity point velocity Vb_x_aim and Vb_y_aim to zero as described above.

Meanwhile, when the operation mode of the vehicle 1 is in a boarding mode, the required center-of-gravity point velocity generator 74 determines the required center-of-gravity point velocity Vb_x_aim and Vb_y_aim, according to the driving operation of the vehicle 1 by the occupant and the like (i.e., an operation applying an impellent force to the vehicle 1), which is estimated to be necessary by the driving operation.

Here, for example, when the vehicle 1 is starting, and when the occupant of vehicle 1 tries to actively increase the velocity of the vehicle 1 (the velocity of the vehicle system center of gravity), an impellent force is provided by the occupant kicking the floor with his or her foot in order to increase the velocity at which the vehicle 1 moves. This impellent force is due to the frictional force between the back side of the occupant's foot and the floor. Alternatively, for example, according to the request by the occupant of vehicle 1, an outside supporter and the like may add an impellent force to the vehicle 1 in order to increase the velocity of the vehicle 1.

In this case, the required center-of-gravity point velocity generator 74 determines whether or not a request for an acceleration has been made as a request to increase the velocity of vehicle 1 based on the temporal rate of change of the magnitude (absolute value) of the actual velocity vector of the vehicle system center of gravity (hereinafter referred to as the center-of-gravity point velocity vector ↑Vb). Accordingly, the required center-of-gravity point velocity generator 74 sequentially determines the required center-of-gravity point velocity vector ↑Vb_aim as a target value of ↑Vb. Here, the required center-of-gravity point velocity vector ↑Vb_aim is a velocity vector having two elements of the required center-of-gravity point velocity Vb_x_aim and Vb_y_aim.

Describing the procedure in general terms, when the request for acceleration occurs, the required center-of-gravity point velocity vector ↑Vb_aim is determined so as to increase the magnitude of the required center-of-gravity point velocity vector ↑Vb_aim until the acceleration request is met. Further, when the acceleration request is met, the required center-of-gravity point velocity vector ↑Vb_aim is determined so that the magnitude of the required center-of-gravity point velocity vector ↑Vb_aim is reduced in series. In this case, according to the present embodiment, the magnitude of the required center-of-gravity point velocity vector ↑Vb_aim is basically held constant for a predetermined amount of time after the request for acceleration is met. Then, the magnitude of the required center-of-gravity point velocity vector ↑Vb_aim is thereafter diminished continuously to zero. Incidentally, during this diminishing phase, the direction of the required center-of-gravity point velocity vector ↑Vb_aim approaches the x axis direction where appropriate.

The required center-of-gravity point velocity generator 74, performing the procedures described above, is described in detail below with reference to the flow chart FIG. 14-20.

Figure 14:
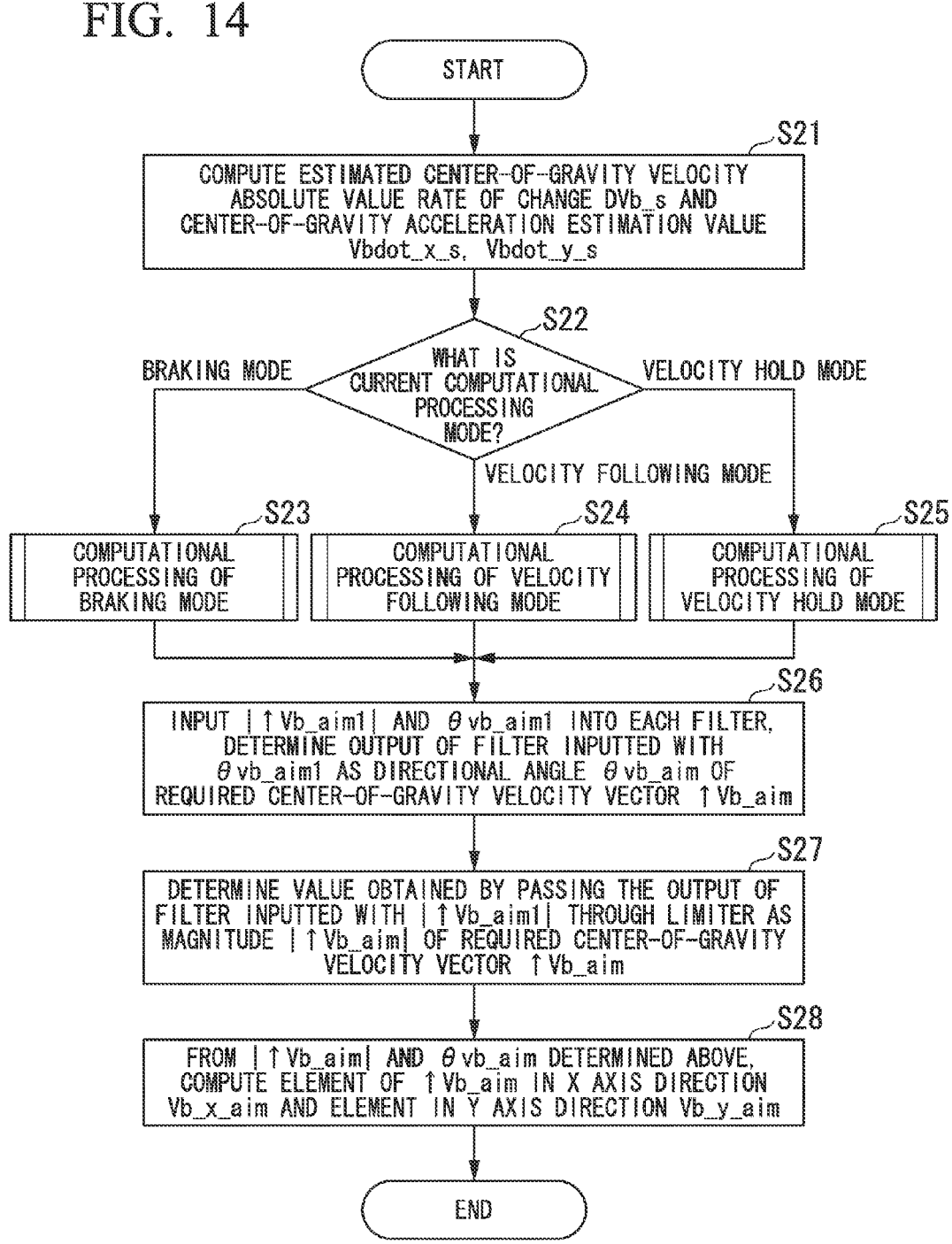
FIG. 14 is a flowchart showing a processing of a required center-of-gravity point velocity generator 74 shown in FIG. 9.

Referring to FIG. 14, the required center-of-gravity point velocity generator 74 first executes the procedure in step S21. According to this procedure, the required center-of-gravity point velocity generator 74 computes a temporal rate of change (differential value) DVb_s of the magnitude |↑Vb_s| (=sqrt (Vb_x_s$^2$+Vb_y_s$^2$)) of the estimated center-of-gravity point velocity vector ↑Vb_s, which is a velocity vector having the inputted center-of-gravity point velocity estimation values Vb_x_s and Vb_y_s as two components (the observed value of the actual center-of-gravity point velocity vector ↑Vb). This DVb_s refers to the observed value of the temporal rate of change of the magnitude of the actual center-of-gravity point velocity vector ↑Vb (estimation value). Hereafter, DVb_s is referred to as the estimated center-of-gravity point velocity absolute value rate of change DVb_s. Incidentally, the notation sqrt( ) refers to a square root function.

Further, in step S21, the required center-of-gravity point velocity generator 74 computes a center-of-gravity point acceleration estimation value Vbdot_x_s and Vvdot_y_s, which is a temporal rate of change (differential value) of each of the center-of-gravity point velocity estimation values Vb_x_s and Vb_y_s which is inputted. Incidentally, the vector comprising the two elements Vbdot_x_s and Vbdot_y_s refers to an actual observed value of the acceleration vector of the center-of-gravity point of the vehicle system.

Next, moving on to step S22, the required center-of-gravity point velocity generator 74 determines which mode the current computational processing mode is for computing the required center-of-gravity point velocity Vb_x_aim.

Here, according to the present embodiment, the required center-of-gravity point velocity generator 74 determines the required center-of-gravity point velocity vector ↑Vb_aim, after determining the base value of the required center-of-gravity point velocity vector ↑Vb_aim (hereinafter may be referred to as the base body required center-of-gravity point velocity vector ↑Vb_aim1), so that the required center-ofgravity point velocity vector ↑Vb_aim follows the base required center-of-gravity point velocity vector ↑Vb_aim1 (i.e., so that the required center-of-gravity point velocity vector ↑Vb_aim steadily matches with the base required center-of-gravity point velocity vector ↑Vb_aim1).

The computational processing mode represents a type of procedure for determining the base required center-of-gravity point velocity vector ↑Vb_aim1. Further, according to the present embodiment, the computational processing mode includes three kinds of modes: the braking mode, the velocity following mode, and the velocity hold mode.

The braking mode is a mode such that the magnitude of the base required center-of-gravity point velocity vector ↑Vb_aim1 is diminished to "0," or the ↑Vb_aim1 is determined so as to keep the magnitude to zero. Further, the velocity following mode is a mode such that the base required center-of-gravity point velocity vector ↑Vb_aim1 is determined to follow the estimated center-of-gravity point velocity vector ↑Vb_s. Further, the velocity hold mode is a mode such that ↑Vb_aim1 is determined so as to keep the magnitude of the base required center-of-gravity point velocity vector ↑Vb_aim1.

Incidentally, the computational processing mode (initial computational processing mode) when the control unit 50 is initialized during a start up of the control unit 50 is the braking mode.

In the step S22 above, the required center-of-gravity point velocity generator 74 next performs the computational processing of step S23, the computational processing of step S24, and the computational processing of step S25 in respectively the cases in which the current computational processing mode is a braking mode, velocity following mode, and a velocity hold mode. In this way, the required center-of-gravity point velocity generator 74 determines the base required center-of-gravity point velocity vector ↑Vb_aim1.

The computational process corresponding to each mode is executed as follows.

Figure 15:
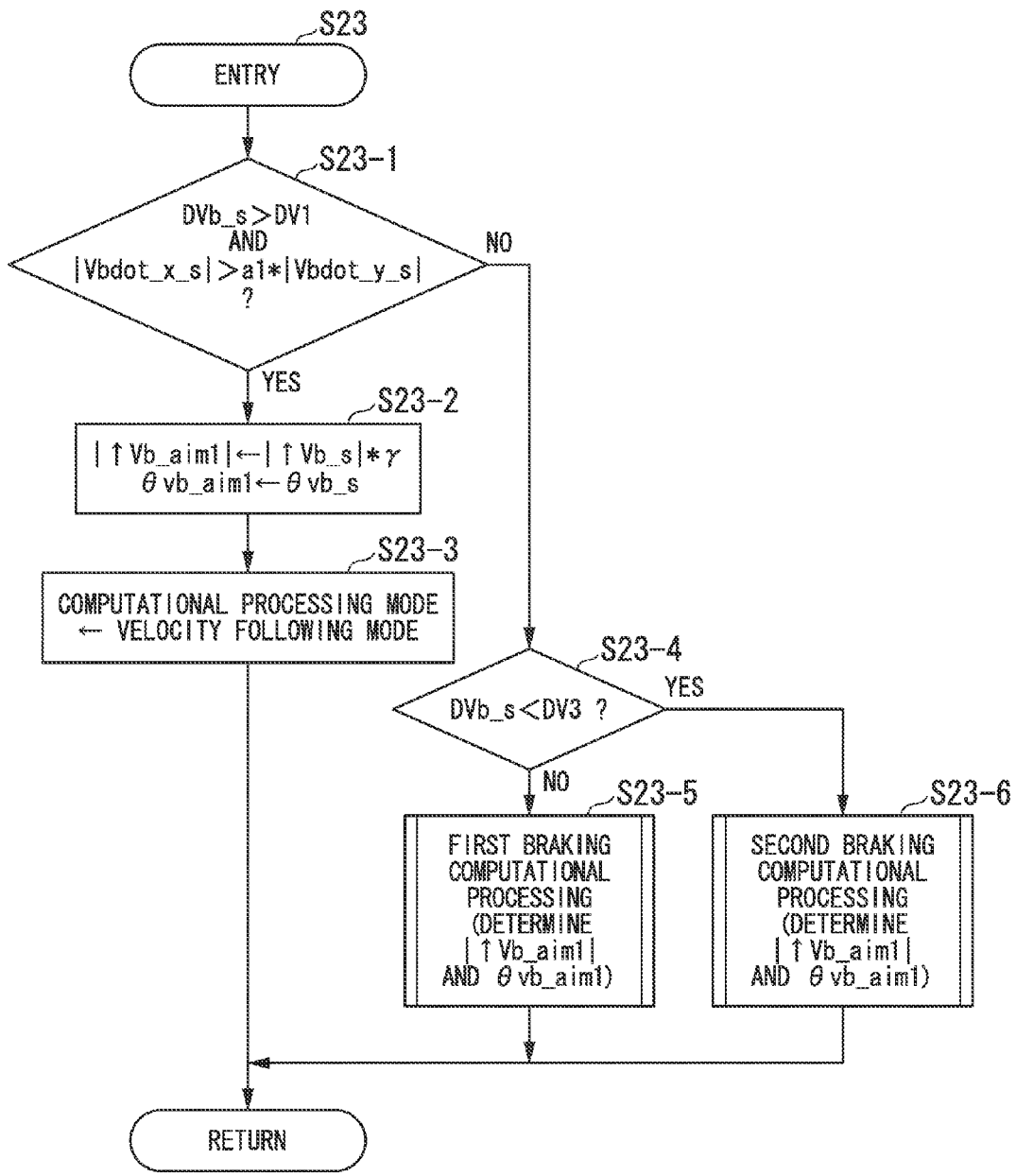
FIG. 15 is a flowchart showing a subroutine of a processing in step S23 shown in FIG. 14.

The computational process of the braking mode in the step S23 is executed as indicated in the flowchart of FIG. 15. In particular, regarding the center-of-gravity point acceleration estimation value Vbdot_x_s, Vbdot_y_s and the estimated center-of-gravity point velocity absolute value rate of change DVb_s computed in the step S21, the required center-of-gravity point velocity generator 74 first determines in the step 23-1 whether or not the conditions DVb_s>DV1 and |Vbdot_x_s|>a1*|Vbdot_y_s|. This decision process is a procedure determining whether or not there is an acceleration request to increase the velocity of the vehicle 1 in the approximately fore-and-aft direction of the vehicle.

Here, DV1 is a first threshold value DV1 (>0) of the predetermined positive value. Further, DVb_s>DV1 indicates that the actual magnitude |↑Vb| of the center-of-gravity point velocity vector ↑Vb is increasing at a greater temporal rate of change compared to the first threshold value.

In addition, a1 is a predetermined positive coefficient. Further, |Vbdot_x_s|>a1*|Vbdot_y_s| indicates that the actual acceleration vector of the vehicle system center of gravity comprises an element in the x axis direction which is not zero, and that the angle (=tan$^{-1}$(|Vbdot_y_s|/|Vbdot_x_s|) at the acute angle side with respect to the x axis direction of the acceleration vector is closer to "0" compared to a predetermined angle (=tan$^{-1}$(1/a1)). In this example, a1 is set to be, for instance, equal to "1" or a value close to "1."

Therefore, in a condition in which the determination result of the step S23-1 becomes positive, an occupant or an external supporter is performing a controlling action to increase the magnitude of the center-of-gravity point velocity vector ↑Vb in generally the fore-and-aft direction. This controlling action adds an impellent force to the vehicle 1 in generally the fore-and-aft direction.

When the determination result of the step S23-1 is negative, i.e., when there is no request to accelerate the vehicle 1 (i.e., the request to accelerate the vehicle 1 in generally the fore-and-aft direction), the required center-of-gravity point velocity generator 74 next executes the determination procedure in step S23-4.

In the determination procedure in step S23-4, the required center-of-gravity point velocity generator 74 determines whether or not the estimated center-of-gravity point velocity absolute value rate of change DVb_s computed in step S21 is less than a predetermined negative third threshold value DV3 (<0). According to this determination process, it is determined whether or not a request for deceleration has been made, i.e., whether the occupant of the vehicle 1 has actively tried to reduce the magnitude of the center-of-gravity point velocity vector ↑Vb. In this case, the determination result of step S23-4 becomes positive when the occupant of the vehicle 1 has intentionally placed his or her foot on the ground, thereby creating a frictional force in the braking direction of the vehicle 1 between the occupant's foot and the floor.

Further, when the determination result of step S23-4 is negative (i.e., when the request for deceleration has not occurred), the required center-of-gravity point velocity generator 74 executes a first braking computational process in step S23-5, thereby determining the magnitude |↑Vb_aim1| of the base required center-of-gravity point velocity vector ↑Vb_aim1 (hereinafter, referred to as the base required center-of-gravity point velocity vector absolute value |↑Vb_aim1|) and the directional angle θvb_aim1 (hereinafter referred to as the base required center-of-gravity point velocity vector directional angle θvb_aim1), thereby completing the processing shown in FIG. 15. In addition, when the determination result of the step S23-4 is positive (i.e., when a request for deceleration has occurred), the required center-of-gravity point velocity generator 74 executes a second braking computational processing in step S23-6, determines a base required center-of-gravity point velocity vector absolute value |↑Vb_aim1| and the base required center-of-gravity point velocity vector directional angle θvb_aim1, thereby completing the processing shown in FIG. 15.

Incidentally, according to the present embedment, the base required center-of-gravity point velocity vector directional angle θvb_aim1 is defined as an angle (−180°<θvb_aim≦180°) satisfying sin(θvb_aim1)=Vb_x_aim1/|↑Vb_aim1|, cos(θvb_aim1)=Vb_y_aim1/|↑Vb_aim1|. When |↑Vb_aim1|=0, it is assumed that θVb_aim=0°.

Figure 16:
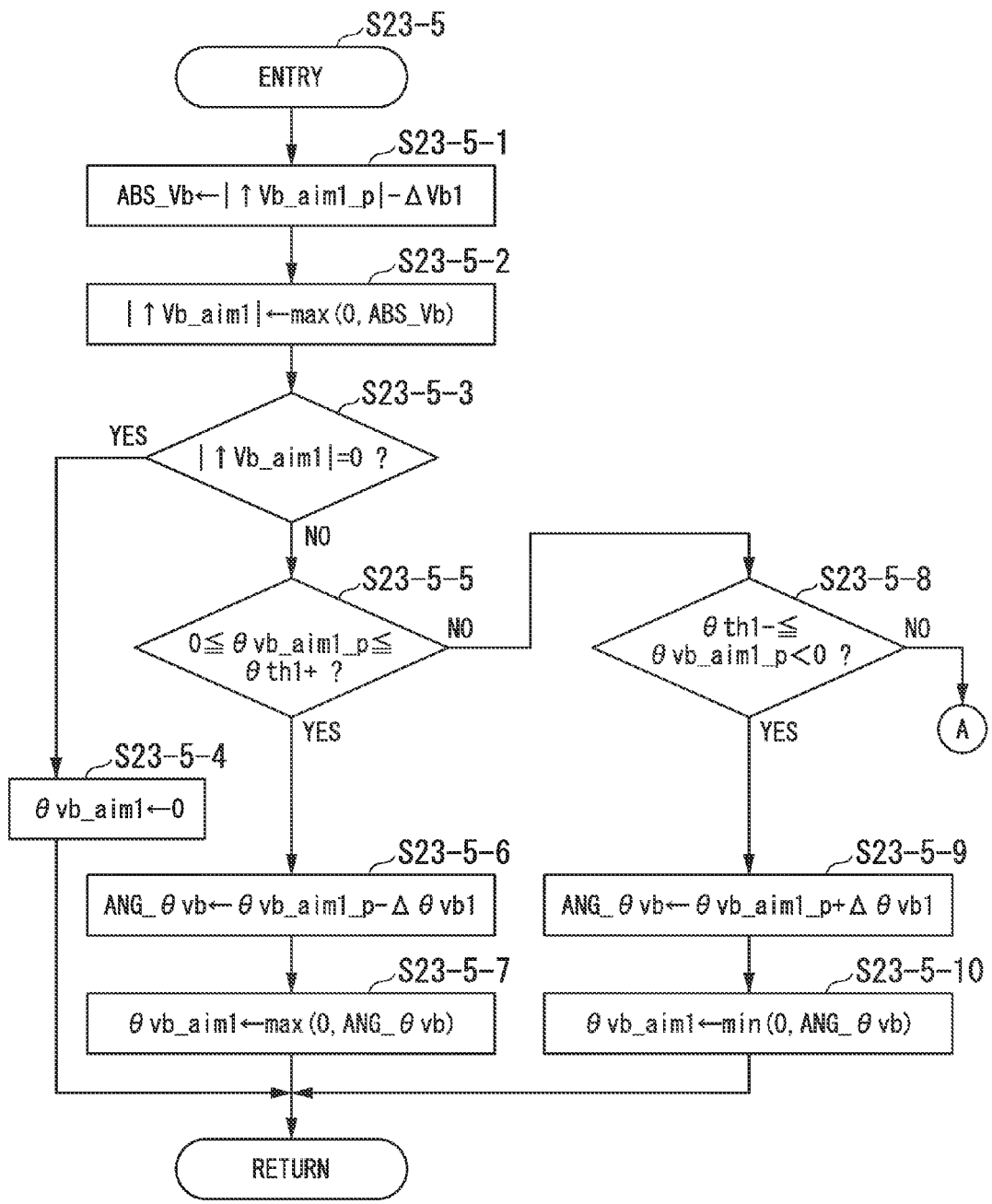
FIG. 16 is a flowchart showing a subroutine of a processing in step S23-5 shown in FIG. 15.
Figure 17:
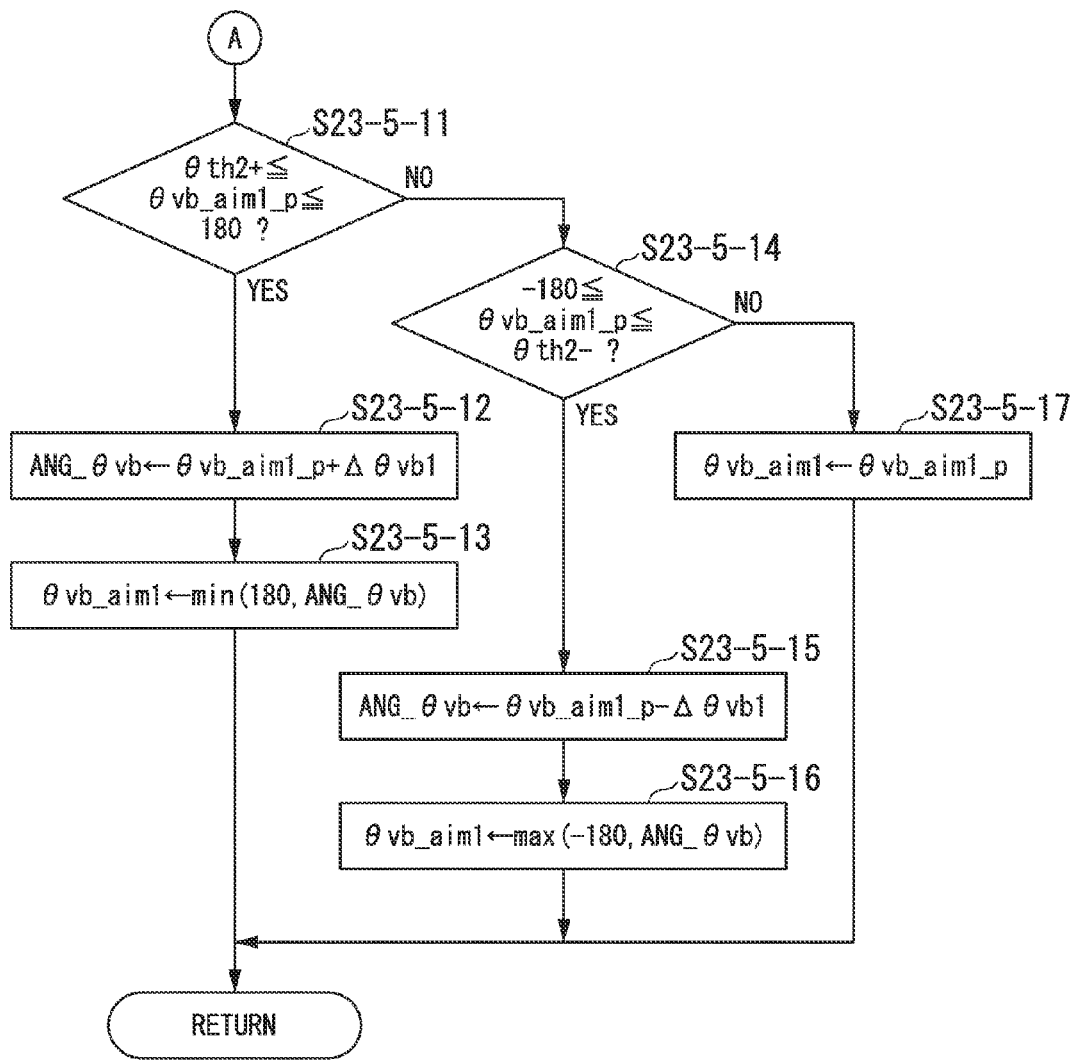
FIG. 17 is a flowchart showing a subroutine of a processing in step S23-5 shown in FIG. 15.

The first braking computational process of the step S23-5 is executed as shown in the flowcharts in FIG. 16 and FIG. 17.

According to this first braking computational process the required center-of-gravity point generator 74 outputs a value obtained by subtracting a predetermined positive value ΔVb1 from the previous value |↑Vb_aim_p| of the base required center-of-gravity point velocity vector absolute value |↑Vb_aim1| in step S23-5-1 as the candidate value ABS_Vb of |↑Vb_aim1|. ΔVb1 is a predetermined value prescribing the amount of decrease (and the temporal rate of change of |↑Vb_aim1|) of |↑Vb_aim1| for each control processing period.

Next, in the step S23-5-2, the required center-of-gravity point velocity generator 74 determines the greater value max (0, ABS_Vb) of the candidate value ABS_Vb and 0 as the current value of |↑Vb_aim1|. Therefore, when ABS_Vb≧0, ABS_Vb is determined as the current value of |↑Vb_aim1↑|. When ABS_Vb<0, the current value of |↑Vb_aim1| is set to be zero.

Next, in step S23-5-3, the required center-of-gravity point velocity generator 74 determines whether or not the |↑Vb_aim1| determined as described above is zero. When this determination result is positive, the required center-of-gravity point velocity generator 74 next sets the current value of θvb_aim1 to 0° in step S23-5-4, thereby completing the procedure in FIG. 16.

When the determination result of step S23-5-3 is negative, the required center-of-gravity point velocity generator 74 determines the current value of θvb_aim1 by the processing by step S23-5-5 according to whether or not the previous value θvb_aim1_p of θvb_aim1 is within either of the ranges of 0°≦θvb_aim1_p≦θth1+, θth1-≦θvb_aim1_p<0°, θth2+≦θvb_aim1_p>180°, −180°≦θvb_aim1_p≦θth2−, θth1+<θvb_aim1_p<θth2+, θth2−<θvb_aim1_p<θth1−.

Here, θth1+ is a predetermined positive directional angle threshold value between 0° and 90°. θth1− is a predetermined negative directional angle threshold value between 0° and −90°. θth2+ is a predetermined positive directional angle threshold value between 90° and 180°. θth2− is a predetermined positive directional angle threshold value between −90° and −180°. According to this example, θth1+ and 0*th*1− are set so that the absolute values of 0*th*1+ and 0*th*1− are equal to, for example, 45° or an angle close to 45°. Further, θth2+ and θth2− are set so that the absolute values of θth2+ and θth2− are equal to, for example, 135° or an angle close to 135°. Incidentally, the difference between θth1+ and θth1− (=(θth1+)−(θth1−)) and the difference between θth2+ and θth2− (=(θth2+)−(θth2−)) need not be equal.

The procedure from step S23-5-5 is executed as described below. In other words, in step S23-5-5, the required center-of-gravity point velocity generator 74 determines whether or not the inequality 0°≦θvb_aim1_p≦θth1+ holds. When this determination result is positive, the required center-of-gravity point velocity generator 74 computes in step S23-5-6, a value obtained by subtracting a predetermined positive value Δθvb1 from the previous value θvb_aim1_p of θvb_aim1 as the candidate value ANG_Vb of θvb_aim1. Δθvb1 is a predetermined value prescribing the variation of θvb_aim1 (and the temporal rate of change of θvb_aim1) for each control processing period.

Further, in step S23-5-7, the required center-of-gravity point velocity generator 74 determines the greater angular value max (0, ANG_Vb) of the candidate value ANG_Vb and 0° as the current value of θvb_aim1, and thereby completes the processing shown in FIG. 16. Therefore, when ANG_Vb≧0°, ANG_Vb is determined as the current value of θvb_aim1. Furthermore, when ANG_Vb<0°, the current value of 0*vb*_aim1 becomes 0°.

When the determination result of step S23-5-5 is negative, the required center-of-gravity point velocity generator 74 determines in step S23-5-8 whether or not the inequality θth1−<θvb_aim1_p<0° holds. When this determination result is positive, the required center-of-gravity point velocity generator 74 computes in step S23-5-9 computes a value obtained by increasing the previous value θvb_aim1_p of θvb_aim1 by the predetermined value Δθvb1 as the candidate value ANG_Vb of θvb_aim1.

Further, in step S23-5-10, the required center-of-gravity point velocity generator 74 determines the smaller angular value min (0, ANG_Vb) of the candidate value ANG_Vb and 0° as the current value of θvb_aim1, thereby completing the procedure shown in FIG. 16. Therefore, when ANG_Vb≦0°, ANG_Vb is determined as the current value of θvb_aim1. When ANG_Vb>0°, the current value of θvb_aim1 is 0°.

When the determination result of step S23-5-8 is negative, the requesting center-of-gravity point velocity generator 74 determines in step S23-5-11 in FIG. 17 whether or not the inequality θth2+≦θvb_aim1_p≦180° holds. When the determination result is positive, the required center-of-gravity point velocity generator 74 computes in step S23-5-12 a value obtained by increasing the previous value θvb_aim1_p of θvb_aim1 by the predetermined value Δθvb1 as the candidate value ANG_Vb of θvb_aim1.

Further, in step S23-5-13, the required center-of-gravity point velocity generator 74 determines the smaller angular value min (180, ANG_Vb) of the candidate value ANG_Vb and 180° as the current value of θvb_aim1, thereby completing the procedure shown in FIG. 17. Therefore, when ANG_Vb≦180°, ANG_Vb is determined as the current value of θvb_aim1. When ANG_Vb>180°, the current value of θvb_aim1 is 180°.

When the determination result of step S23-5-11 is negative, the requesting center-of-gravity point velocity generator 74 next determines in step S23-5-14 whether or not the inequality −180°≦θvb_aim1_p≦θth2− holds. When the determination result is positive, the required center-of-gravity point velocity generator 74 computes in step S23-5-15 a value obtained by decreasing the previous value 0vb_aim1_p of 0vb_aim1 by the predetermined value Δ0vb1 as the candidate value ANG_Vb of θvb_aim1.

Further, in step S23-5-16, the required center-of-gravity point velocity generator 74 determines the greater angular value max (180, ANG_Vb) of the candidate value ANG_Vb and −180° as the current value of θvb_aim1, and thereby completes the processing shown in FIG. 17. Therefore, when ANG_Vb≧−180°, ANG_Vb is determined as the current value of θvb_aim1. Meanwhile, when ANG_Vb<−180°, the current value of θvb_aim1 becomes −180°.

When the determination result of step S23-5-14 is negative, i.e., when the inequality θth1+<θvb_aim1_p<θth2+ or θth2−<θvb_aim1_p<θth1− holds, the required center-of-gravity point velocity generator 74 determines in step S23-5-17 the current value of θvb_aim1 as the same value as the previous value θvb_aim1_p, and thereby completes the processing shown in FIG. 17.

Above are the details of the first braking computational processing in step S23-5.

Figure 18:
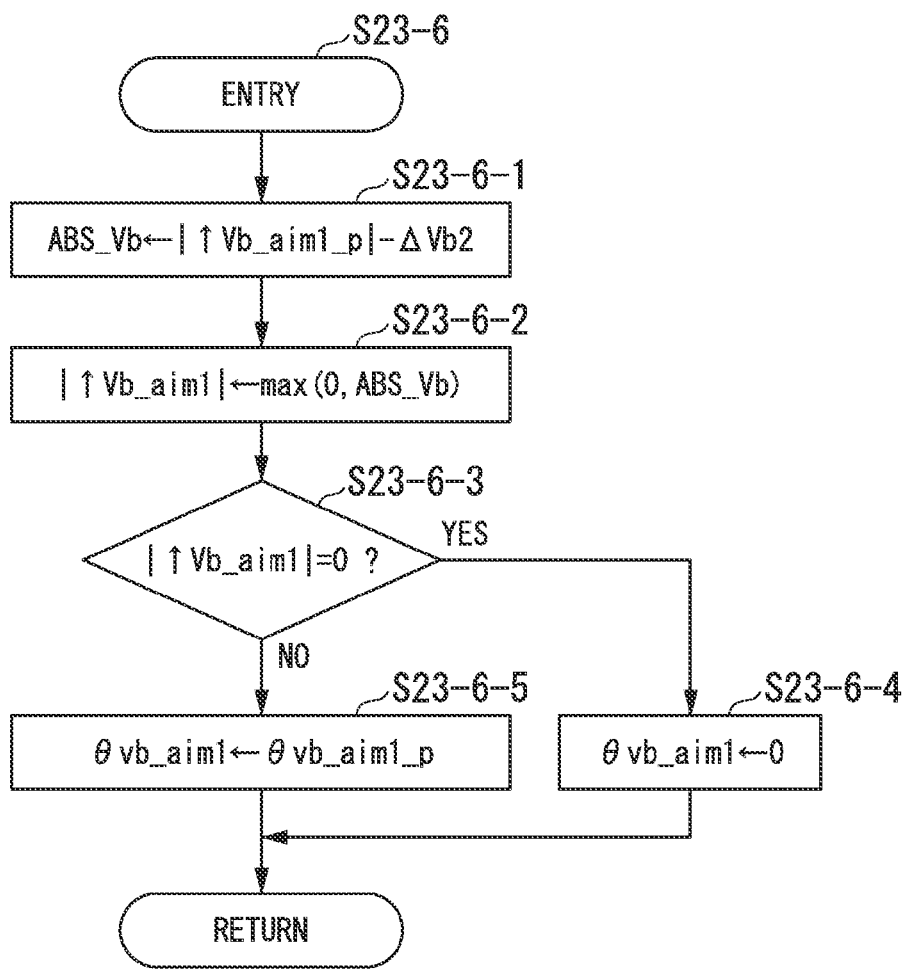
FIG. 18 is a flowchart showing a subroutine processing in step S23-6 shown in FIG. 15.

Meanwhile, the second braking computational processing in step S23-6 is executed as indicated in the flowchart shown in FIG. 18.

According to this second braking computational processing, the required center-of-gravity point velocity generator 74 first computes in step S23-6-1 a value obtained by subtracting a predetermined positive value ΔVb2 from the previous value |↑Vb_aim_p| of the base required center-of-gravity point velocity vector absolute value |↑Vb_aim1| as the candidate value ABS_Vb of |↑Vb_aim1|. ΔVb2 is a predetermined value prescribing the decrease amount of |↑Vb_aim1| (i.e., the temporal rate of change of |↑Vb_aim1|) for each control processing period in the second braking computational processing. In this case, ΔVb2 is set to be a value larger than the predetermined value ΔVb1 used in the first braking computational process.

Next, in step S23-6-2, the required center-of-gravity point velocity generator 74 executes the same processing as in step S23-5-2, and determines the greater value max (0, ABS_Vb) of the candidate value ABS_Vb and 0 computed in step S23-6-1 as the current value of |↑Vb_aim1|.

Next, the required center-of-gravity point velocity generator 74 determines in step S23-6-3 whether or not |↑Vb_aim1| determined as described above is zero. When this determination result is positive, the required center-of-gravity point velocity generator 74 next sets the current value of θvb_aim1 to zero in step S23-6-4, thereby completing the processing of FIG. 18.

Further, when the determination result of step S23-6-3 is negative, the required center-of-gravity point velocity generator 74 next sets the current value of θvb_aim1 to the same value as the previous value θvb_aim1_p in step S23-6-5, and thereby completes the processing in FIG. 18.

Above are details of the second braking computational processing in step S23-6.

Returning to the description in FIG. 15, when the determination result of the step S23-1 is positive, i.e., when there is an acceleration request of the vehicle 1 in generally the fore-and-aft direction, the required center-of-gravity point velocity generator 74 determines in step S23-2, the base required center-of-gravity point velocity vector absolute value |↑Vb_aim1| and the base required center-of-gravity point velocity vector directional angle θvb_aim1. The required center-of-gravity point velocity generator 74 alters the computational processing mode in step S23-3 from the braking mode to the velocity following mode, thereby completing the processing of FIG. 15.

In step S23-2, in particular, the value obtained by multiplying the predetermined ratio γ to the magnitude |↑Vb_s| (=sqrt(Vb_x_s$^2$+Vb_y_s$^2$)) of the estimated center-of-gravity point velocity vector ↑Vb_s (current value) is determined as the base required center-of-gravity point velocity vector absolute value |↑Vb_aim1|. The ratio γ is set to be a positive value which is slightly smaller than "1" such as 0.8.

Further, in step S23-2, the directional angle θvb_s (=sin$^{-1}$(Vb_x_s/|↑Vb_s|)) of the estimated center-of-gravity point velocity vector ↑Vb_s is determined to be the base required center-of-gravity point velocity vector directional angle θvb_aim1. Therefore, in step S23-2, consequently, a vector obtained by multiplying the ratio γ with the estimated center-of-gravity point velocity vector ↑Vb_s is determined as the base required center-of-gravity point velocity vector ↑Vb_aim1.

Such a processing in step S23-2 matches the way in which |↑Vb_x_aim1| and θvb_aim1 is determined with the velocity following mode which starts from the next controlling processing cycle.

Incidentally, it is not necessary that the ratio y be slightly smaller than "1". For example, the ratio γ may be set to "1" or to a value slightly larger than "1". In this example, the value of the ratio y is set to be a value slightly smaller than "1" in order to prevent the velocity of the vehicle 1 that the occupant physically feels (in a sensory aspect) is recognized as if it is larger than the actual velocity.

Above is the computational processing of the braking mode in step S23.

Incidentally, when the determination result of step S23-1 is negative, the computational processing mode is not altered. Therefore, in the next control processing cycle, the computational processing mode is maintained to be the braking mode.

Figure 19:
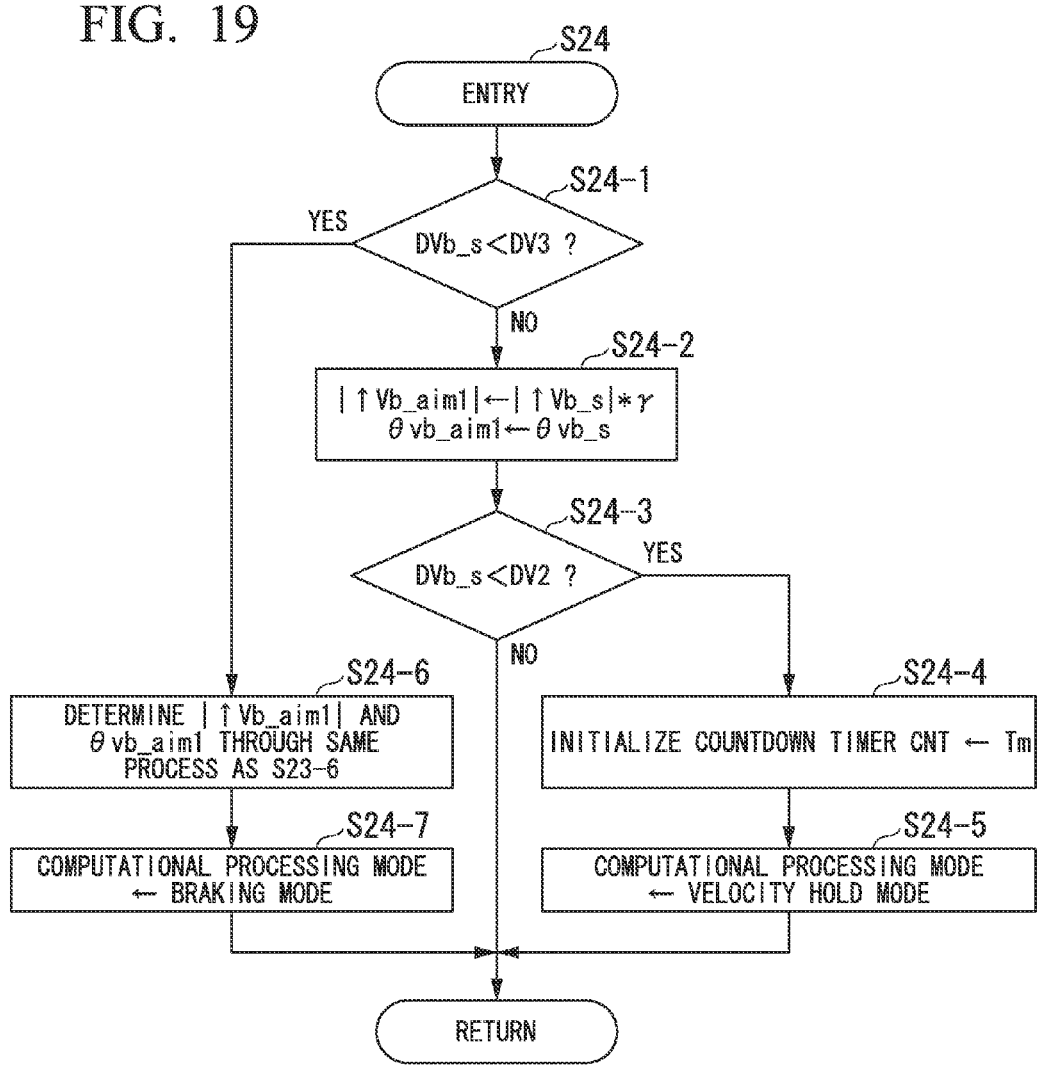
FIG. 19 is a flowchart showing a subroutine processing in step S24 shown in FIG. 14.

Next, the computational processing of the velocity following mode in step S24 is executed as indicated in the flowchart in FIG. 19. In particular, the required center-of-gravity point velocity generator 74 first performs in step S24-1, the same determination processing as step S23-4. In other words, the required center-of-gravity point velocity generator 74 executes a process determining whether or not a deceleration request of the vehicle 1 has been made.

When this determination result is positive, the required center-of-gravity point velocity generator 74 next executes in step S24-6, the same processing as step S23-6 (i.e., the processing shown in the flowchart in FIG. 18), thereby determining the base required center-of-gravity point velocity vector absolute value |↑Vb_aim1| and the base required center-of-gravity point velocity vector directional angle θvb_aim1. Further, the required center-of-gravity point velocity generator 74 changes, in step S24-7, the computational processing mode from the velocity following mode to the braking mode, thereby completing the processing in FIG. 19.

Meanwhile, when the determination result of the step S24-1 is negative, i.e., when the deceleration request of the vehicle 1 has not occurred, the required center-of-gravity point velocity generator 74 next executes the processing in step S24-2. In step S24-2, the required center-of-gravity point velocity generator 74 executes the same procedure as the step S23-2, and thereby determines the base required center-of-gravity point velocity vector absolute value |↑Vb_aim1| and the base required center-of-gravity point velocity vector directional angle θvb_aim1. In other words, |↑Vb_x_s|*y is determined as |↑Vb_aim1|, and θvb_s is determined as θvb_aim1.

Next, in step S24-3, the required center-of-gravity point velocity generator 74 determines whether or not the estimated center-of-gravity point velocity absolute value rate of change DVb_s (the value computed in step S21) is smaller than the second threshold value DV2, which is predetermined This second predetermined value DV2 is set to be a negative predetermined value which is larger than the third threshold value DV3 (i.e., being closer to 0 compared to DV3). Incidentally, the second threshold value DV2 may be set to be "0" or to a positive value slightly larger than "0". At the same time, however, DV2 is a value smaller than the first threshold value DV1.

The processing in step S24-3 determines the timing with which the velocity following mode is transferred to the velocity hold mode. Further, when the determination result of step S24-3 is negative, the required center-of-gravity point velocity generator 74 terminates the process shown in FIG. 19. In this case, the computational processing mode is not altered. Therefore, in the next control processing period, the computational processing mode is maintained to be the velocity following mode.

Further, when the determination result of step S24-3 is positive, the required center-of-gravity point velocity generator 74 regards the acceleration request of vehicle 1 to be met. Thus, the required center-of-gravity point velocity generator 74 initiates the countdown timer in step S24-4. Further, in step S24-5, the required center-of-gravity point velocity generator 74 changes the computational processing mode from the velocity following mode to the velocity hold mode, thereby completes the processing in FIG. 19.

The countdown timer is a timer measuring the amount of time that has passed since the start of the velocity hold mode beginning from the next control processing period. Further, in step S24-4, a predetermined initial value Tm is set to the measured time value CNT of this timer. The initial value Tm_x refers to a set value of time during which the velocity hold mode is to be continued.

Above is the computational processing of the velocity following mode in step S24.

Figure 20:
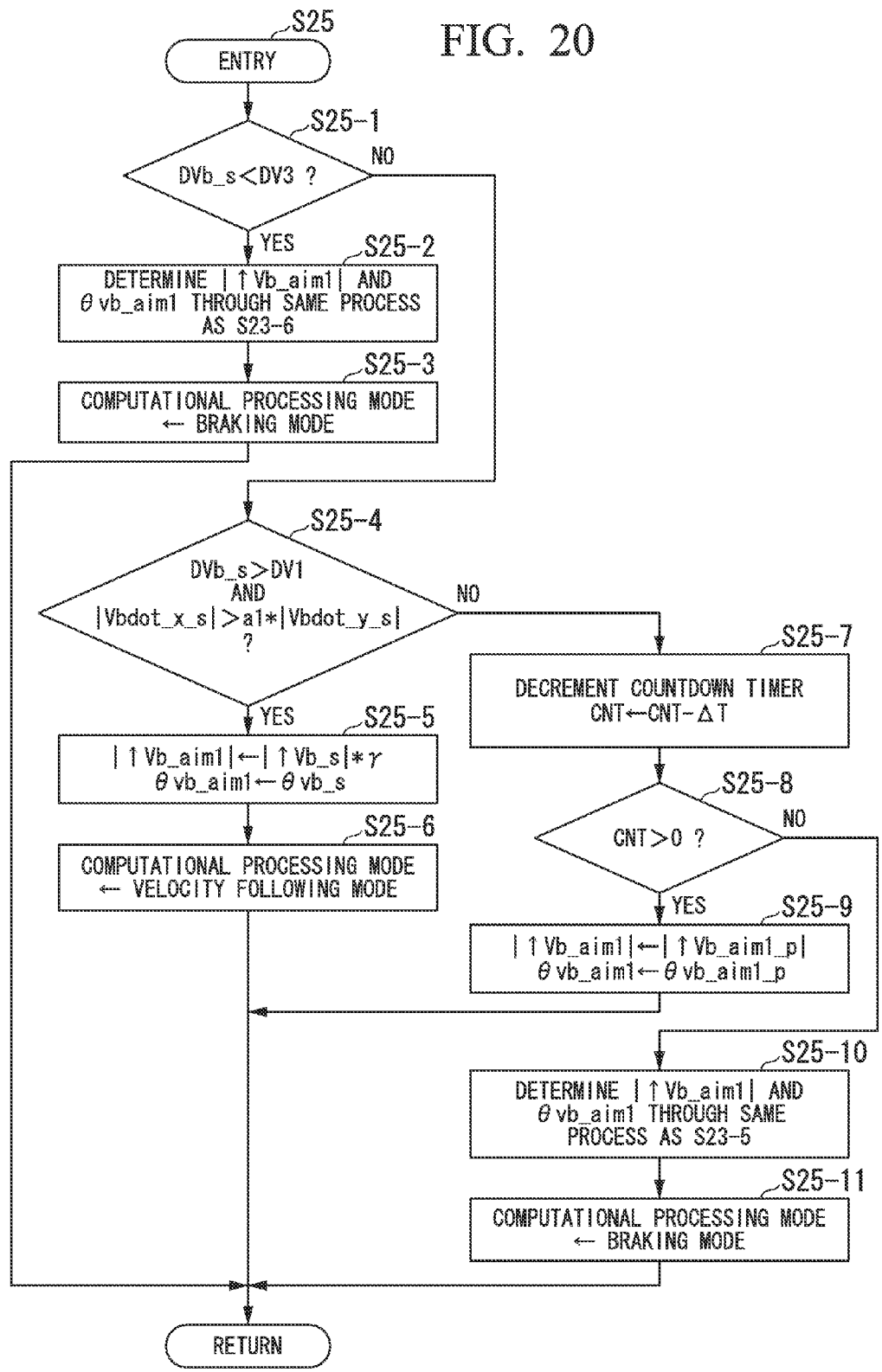
FIG. 20 is a flowchart showing a subroutine processing in step S25 shown in FIG. 14.

Next, the computational processing of the velocity hold mode in step S25 is executed as indicated in the flowchart shown in FIG. 20. In particular, in step S25-1, the required center-of-gravity point velocity generator 74 first performs the same decision process as in step S23-4. In other words, the required center-of-gravity point velocity generator 74 executes a process determining whether or not a deceleration request of the vehicle 1 has been made.

When the determination result of the step S25-1 is positive (i.e., when a deceleration request of the vehicle 1 has occurred), the required center-of-gravity point velocity generator 74 next executes, in step S25-2, the same procedure as in step S23-6 (i.e., the procedure shown in the flowchart in FIG. 18). As a result, the required center-of-gravity point velocity generator 74 determines the base required center-of-gravity point velocity vector absolute value |↑Vb_aim1| and the base required center-of-gravity point velocity vector directional angle θvb_aim1. Furthermore, the required center-of-gravity point velocity generator 74 changes, in step S25-3, the computational processing mode from the velocity hold mode to the braking mode, thereby completing the processing of FIG. 20.

Meanwhile, when the determination result of step S25-1 is negative (i.e., when a deceleration request of the vehicle 1 has not occurred), the required center-of-gravity point velocity generator 74 executes in step S25-4, the same determination process as step S23-1, determining whether or not there is an acceleration request of the vehicle 1 in roughly the fore-and-aft direction.

When the determination result of the step S25-4 is positive (i.e., when an acceleration request of the vehicle 1 has occurred again in generally the fore-and-aft direction), the required center-of-gravity point velocity generator 74 executes, in step S25-5, the same procedure as in step S23-2. As a result, the required center-of-gravity point velocity generator 74 determines the base required center-of-gravity point velocity vector absolute value |↑Vb_aim1| and the base required center-of-gravity point velocity vector directional angle θvb_aim1. Thus, |↑Vb_x_s|*y is determined as |↑Vb_aim1|, and θvb_s is determined as θvb_aim1.

Further, the required center-of-gravity point velocity generator 74 changes in step S25-6, the computational processing mode from the velocity hold mode to the velocity following mode, thereby completing the procedure shown in FIG. 20.

When the determination result of step S25-4 is negative (i.e., when there remains to be no acceleration request in generally the fore-and-aft direction), the required center-of-gravity point velocity generator 74 decrements in step S25-7, the measured time value CNT of the countdown timer. In other words, the required center-of-gravity point velocity generator 74 updates the measured time value CNT by subtracting a predetermined value ΔT (the time of the control processing period) from the present value of the measured time value CNT.

Next, the required center-of-gravity point velocity generator 74 determines in step S25-8 whether or not the measured time value CNT of the countdown timer is greater than zero, i.e., whether or not the time measurement by the countdown timer has completed.

When the determination result of step S25-8 is positive, the amount of time represented by the initial value Tm of the countdown timer has not yet passed since the velocity hold mode has started. In this case, the required center-of-gravity point velocity generator 74 maintains the computational processing mode to the velocity hold mode by determining the base required center-of-gravity point velocity vector absolute value |↑Vb_aim1| and the base required center-of-gravity point velocity directional angle θvb_aim1 in step S25-9, thereby completing the processing of FIG. 20.

In this case, in step S25-9, the current value of |↑Vb_aim1| is determined to be the same value as the previous value |↑Vb_aim1_p|. Further, the current value of 0vb_aim1 is determined to be the same value as the previous value 0vb_aim1_p. Therefore, the previous value of the base required center-of-gravity point vector ↑Vb_aim1_p is determined as the velocity vector of the current value of ↑Vb_aim1.

Incidentally, when the determination result of step S25-8 is positive, the computational processing mode is not renewed. Therefore, in the next control processing period, the computational processing mode is maintained to be the velocity hold mode.

When the determination result of the step S25-8 is negative, i.e., when a predetermined amount of time represented by the initial value Tm of the countdown timer has passed since the velocity hold mode has started, the required center-of-gravity point velocity generator 74 performs in step S25-10 the same processing as in step S23-5 (i.e., the processing shown in the flowchart of FIGS. 16 and 17), thereby determining the base required center-of-gravity point velocity vector absolute value |↑Vb_aim1| and the base required center-of-gravity point velocity directional angle θvb_aim1.

Further, the required center-of-gravity point velocity generator 74 changes in step S25, the computational processing mode from the velocity hold mode to the braking mode, thereby completing the processing shown in FIG. 20.

Above is the computational processing of the velocity hold mode in step S25.

Returning to the description in FIG. 14, the required center-of-gravity point velocity generator 74 executes one of the computational processes steps S23-25 as described above, and thereafter executes a process in step S26 (i.e., a filtering process) inputting each of the |↑Vb_aim1| and θvb_aim1 determined in the computational process.

Here, the filter inputting |↑Vb_aim1| and θvb_aim1 is a first delay characteristic low pass filter in order to prevent the magnitude |↑Vb_aim| of the required center-of-gravity point velocity vector ↑Vb_aim and the directional angle θvb_aim suddenly changes to a step form immediately after the computational processing mode is changed from the braking mode to the velocity following mode. In this case, the time constant of the filter inputting |↑Vb_aim| is set to a relatively short time constant. In a condition other than a sudden change in |↑Vb_aim1|, the output value of the filter matches or approximately coincides with |↑Vb_aim1|. This characteristic applies to a filter inputting θvb_aim1 as well.

Further, in step S26, the output value of the filter inputting θvb_aim1 is determined as the directional angle θvb_aim of the required center-of-gravity point velocity vector ↑Vb_aim (hereinafter, the required center-of-gravity point velocity vector directional angle θvb_aim).

Next, the procedure moves on to step S27. The required center-of-gravity point velocity generator 74 finally determines the value obtained by passing the output value of the filter inputted with |↑Vb_aim1| through the limiter as the magnitude |↑Vb_aim| (hereinafter referred to as the required center-of-gravity point velocity vector absolute value |↑Vb_aim|) of the required center-of-gravity point velocity vector ↑Vb_aim. In this case, the limiter prevents |↑Vb_aim| from being too large. When the output value of the filter inputted with |↑Vb_aim| is less than or equal to a predetermined upper limit value, the output value of this filter is outputted as |↑Vb_aim|. In addition, when the output value of the filter exceeds the upper limit value, the limiter outputs the upper limit value as |↑Vb_aim|. In other words, the limiter outputs the smaller value of the output value of the filter and the upper limit value as |↑Vb_aim|.

Next, the procedure moves on to step S28. From |↑Vb_aim| and θvb_aim determined as described above, the required center-of-gravity point velocity generator 74 computes the element of the required center-of-gravity point velocity vector ↑Vb_aim in the x axis direction Vb_x_aim (i.e. the required center-of-gravity point velocity in the x axis direction) and the element in the y axis direction Vb_y_aim (the required center-of-gravity point velocity in the y axis direction). In further detail, |↑Vb_aim|*sin(θvb_aim) is computed as Vb_x_aim, and |↑Vb_aim|*cos(θvb_aim) is computed as Vb_y_aim.

Above are the details of the processing of the required center-of-gravity point velocity generator 74.

Due to the processing by the required center-of-gravity point velocity generator 74 described above, the required center-of-gravity point velocity vector ↑Vb_aim (thus, the required center-of-gravity point velocity Vb_x_aim, Vb_y_aim) is determined according to an embodiment described below.

In other words, for example, in order to increase the velocity of the vehicle 1, suppose an impellent force in the x axis direction (in particular, an impellent force such that the determination result of step S23-1 becomes positive) is applied to the vehicle 1 by the occupant kicking the floor with the back side of his or her foot or by a supporter and the like pushing the vehicle 1.

Incidentally, the computational processing mode before applying the impellent force is assumed to be the braking mode. In addition, to facilitate the reader's understanding in this case, the output value of the filter inputting |↑Vb_aim1| in step S26 in FIG. 14 is assumed to be a value contained within a range so that a compulsory limitation by the limiter in step S27 is not applied. In other words, the output value is assumed to be a value less than or equal to the upper limit of the limiter. As the same time, the center-of-gravity point velocity estimation values Vb_x_s and Vb_y_s are contained within a range such that a compulsory limitation is not applied to the output values V_x_lim2 and V_y_lim2 in the limiting processor 100.

In this case, when the determination result of step S23-1 becomes positive by applying an impellent force to the vehicle 1, the processing in step S23-3 shown in FIG. 15 changes the computational processing mode from the braking mode to the velocity following mode.

In the velocity following mode, in a condition such that a deceleration request does not occur (i.e., in a condition in which the determination result of step S24-1 is negative), a vector obtained by multiplying a predetermined ratio y to the current value (i.e., present value) of the estimated center-of-gravity point velocity vector ↑Vb_s is determined as the base required center-of-gravity point velocity vector ↑Vb_aim1. This vector obtained by multiplying a predetermined ratio y to the current value (i.e., present value) of the estimated center-of-gravity point velocity vector ↑Vb_s is a velocity vector such that the magnitude is slightly smaller than the magnitude of ↑Vb_s and the direction is the same as ↑Vb_s.

Therefore, the required center-of-gravity point velocity vector ↑Vb_aim determined successively by the required center-of-gravity point velocity generator 74 is determined so as to follow the velocity vector ↑Vb_aim1 (=γ*↑Vb_s) which matches approximately the actual center-of-gravity point velocity vector ↑Vb which increases in size due to the impellent force applied to the vehicle 1.

The element in the x axis direction and the element in the y axis direction of the required center-of-gravity point velocity vector ↑Vb_aim determined as described above is determined to be the target center-of-gravity point velocity for control Vb_x_mdfd and Vb_y_mdfd. Further, the motor manipulated variable components u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, the velocity of the wheel assembly 5 is controlled so that the increase in the actual velocity of the vehicle system center of gravity due to the impellent force applied to the vehicle 1 by the occupant (i.e., the increase in velocity in generally the fore-and-aft direction) is swiftly executed in response to the request based on the impellent force. Therefore, the vehicle 1 accelerates smoothly due to the applied impellent force.

Further, in the velocity following mode, when the determination result of step S24-1 in FIG. 19 becomes positive (i.e., a deceleration request occurs) due to the application of the braking force to the vehicle 1, the computational processing mode changes to the braking mode. As a result, the velocity of the vehicle 1 decreases. In this case, while the deceleration request is occurring, |↑Vb_aim1| and θvb_aim1 are determined by the second braking computational processing (the processing in FIG. 18) of step S23-6. As a result, the base required center-of-gravity point velocity vector ↑Vb_aim1, or a required center-of-gravity point velocity vector ↑Vb_aim following ↑Vb_aim1 are determined so that the directions of ↑Vb_aim1 and ↑Vb_aim are held constant, and that the magnitude decreases at a constant temporal rate of change (the temporal rate of change prescribed by the predetermined value ΔVb2).

Next, in the velocity following mode, when the application of the impellent force on the vehicle 1 stops, and the estimated center-of-gravity point velocity absolute value rate of change DVb_s becomes smaller than the second threshold value DV2 (i.e., when the determination result of step S24-3 of FIG. 19 becomes positive), the computational processing mode changes from the velocity following mode to the velocity hold mode based on the processing in step S24-5 in FIG. 19.

According to this velocity hold mode, in a condition in which the acceleration request and the deceleration request are not made (i.e., in a condition in which the determination results of the steps S25-1 and 25-4 in FIG. 20 are both negative), the base required center-of-gravity point velocity vector ↑Vb_aim1 is set to be the same velocity vector as the velocity vector ↑Vb_aim1_p of the previous value until the time measurement of the countdown timer is completed.

Therefore, after the velocity hold mode starts, within a period of time until the time measurement of the countdown timer is completed (during the time of the initial value Tm of the countdown timer), the base required center-of-gravity point velocity vector ↑Vb_aim1 is maintained to be the same constant velocity vector as the velocity vector determined before the velocity hold mode starts.

Therefore, the required center-of-gravity point velocity vector ↑Vb_aim determined to follow ↑Vb_aim1 is determined to be maintained at a constant velocity vector (i.e., a velocity vector which matches or approximately matches with ↑Vb_aim which was determined immediately before the velocity hold mode started).

Further, the element in the x axis direction and the element in the y axis direction of the required center-of-gravity point velocity vector ↑Vb_aim determined as described above is determined to be the target center-of-gravity point velocity for control Vb_x_mdfd and Vb_y_mdfd. Moreover, the motor manipulated variable components u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, after the vehicle 1 increases its velocity, during a period of time in which the time measurement by the countdown timer is completed (the period of time represented by the initial value Tm), the velocity of the wheel assembly 5 is controlled so that the magnitude and the direction of the actual velocity vector ↑Vb of the vehicle system center of gravity is maintained to be constant without requiring the posture of the upper body of the occupant to be adjusted frequently. Therefore, the actual driving condition of this vehicle under this situation is such that the vehicle 1 runs at an approximately constant velocity vector even if the occupant does not perform a maneuvering operation by actively moving his or her upper body.

Incidentally, in the velocity hold mode, when an impellent force in approximately the fore-and-aft direction is applied to the vehicle 1 again, thereby making the determination result of step S25-4 of FIG. 20 positive (i.e., an acceleration request occurring), the computational processing mode returns to the velocity following mode. Therefore, the vehicle 1 accelerates again in approximately the fore-and-aft direction.

In the velocity hold mode, when the determination result of step S25-1 of FIG. 20 becomes positive by adding a braking force to the vehicle 1 (i.e., when a deceleration request occurs), the computational processing mode changes to the braking mode. As a result, the velocity of the vehicle 1 decreases. In this case, similar to the case in which a deceleration request occurs in the velocity following mode, while the deceleration request is occurring, the |↑Vb_aim1| and θvb_aim1 is determined based on the second braking computational processing (i.e., the processing in FIG. 18) of step S23-6.

Next, in the velocity hold mode, when the condition in which neither the acceleration request nor the deceleration request occurs is maintained (i.e., the condition in which the determination results of the steps S25-1 and 25-4 in FIG. 20 are both negative), and the time measurement of the countdown timer is completed, the computational processing mode is altered from the velocity hold mode to the braking mode due to the processing of step S25-11 in FIG. 20.

In this braking mode, under a condition in which neither the acceleration request nor the deceleration request occurs (i.e., a condition in which the determination results of steps S23-1 and 23-4 in FIG. 15 are both negative), the processing of steps S23-5-1 and 23-5-2 in FIG. 16 are performed in each control processing period. As a result, the base required center-of-gravity point velocity vector absolute value |↑Vb_aim1| decreases continuously to zero at a constant temporal rate of change (a temporal rate of change prescribed by ΔVb1 mentioned above). Further, after |↑Vb_aim1| decreases to zero, |↑Vb_aim1| is maintained to be zero.

Further, in the braking mode, in a condition in which neither the acceleration request nor the deceleration request has occurred, the processing after step S23-5-3 in FIG. 16 is executed in each control processing period. In this case, when the direction of the base required center-of-gravity point velocity vector |↑Vb_aim1 determined immediately before the transition from the velocity hold mode to the braking mode (i.e., the direction of ↑Vb_aim1 determined in a control processing period immediately preceding the control processing period in which the determination result of step S25-8 of FIG. 20 is negative) is different from the x axis direction and is relatively close to the x axis direction (in more precise terms, when the directional angle θvb_aim1 of ↑Vb_aim1 determined immediately before the transition is an angular value in either one of the ranges 0°<θvb_aim1_p≦θth1+, θth1−≦θvb_aim1_p<0°, θth2+≦θvb_aim1_p<180°, −180°<θvb_aim1_p≦θth2−), during a period of time in which |↑Vb_aim1| decreases to zero, θvb_aim1 approaches the convergent target angle 0° or 180° or −180° at a constant temporal rate of change, and is finally maintained at the convergent target angle. Therefore, after the braking mode begins, and during the period of time in which the |↑Vb_aim1| decreases to zero, the direction of the base required center-of-gravity point velocity vector ↑Vb_aim continuously approaches the x axis. In other words, during this period of time, the ratio of the absolute value of the element Vb_y_aim1 in the y axis direction with respect to the absolute value of the element Vb_x_aim1 in the x axis direction of the base required center-of-gravity point velocity vector ↑Vb_aim approach zero. Further, when the direction of ↑Vb_aim1 reaches the same direction as the x axis direction (i.e., Vb_y_aim1=0) before |↑Vb_aim1| diminishes to zero, the direction of ↑Vb_aim1 is maintained to be equal to the direction of the x axis.

Therefore, ↑Vb_aim1 is determined so that its magnitude diminishes and that its direction approaches (converges) the direction of the x axis. When ↑Vb_aim1 is determined in this way, the required center-of-gravity point velocity vector ↑Vb_aim, determined to follow ↑Vb_aim1, also behaves so that its magnitude diminishes and that its direction approaches the direction of the x axis.

Further, when the direction of the base required center-of-gravity point velocity vector ↑Vb_aim1, determined immediately before the transition from the velocity hold mode to the braking mode, is different from the direction of the x axis, and is facing a direction relatively far apart from the direction of the x axis (in more precise terms, when the directional angle θvb_aim1 of ↑Vb_aim1 determined immediately before the transition is an angular value within either of the ranges of θth1+<θvb_aim1_p<θth2+ and θth2−<θvb_aim1_p<θth1−), θvb_aim1 is held constant held constant at the same angular value as the directional angle θvb_aim1 of ↑Vb_aim1 determined immediate before the transition, during the period in which |↑Vb_aim1| diminishes to zero.

Therefore, ↑Vb_aim1 is determined so that its magnitude diminishes and so that its direction is maintained to be constant. When ↑Vb_aim1 is determined in this manner, the required center-of-gravity point velocity vector ↑Vb_aim, which is determined to follow ↑Vb_aim1, is also determined so that its magnitude diminishes and so that its direction is maintained to be equal.

Further, in the velocity holding mode, the magnitude and the direction of ↑Vb_aim1 is maintained to be constant. As a result, the base required center-of-gravity point velocity vector ↑Vb_aim1, determined immediately before the transition from the velocity hold mode to the braking mode, consequently matches with ↑Vb_aim1 which was determined immediately before the transition from the velocity following mode to the velocity hold mode (i.e., ↑Vb_aim1 determined in the control processing period in which the determination result of step S24-3 of FIG. 19 is positive).

The element in the x axis direction and the element in the y axis direction of the required center-of-gravity point velocity vector ↑Vb_aim determined as described above in the braking mode is determined to be the target center-of-gravity point velocity for control Vb_x_mdfd and Vb_y_mdfd. Further, the motor manipulated variable components u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, when the computational processing mode before the braking mode is a velocity hold mode, the velocity of the wheel assembly 5 is controlled so that the actual magnitude of the velocity vector of the center-of-gravity point of the vehicle system diminishes continuously from the magnitude in the velocity hold mode even when the occupant is not actively performing an active maneuvering operation with the movement of his or her upper body.

In this case, when ↑Vb_aim1, determined immediately before the transition from the velocity hold mode to the braking mode (i.e., ↑Vb_aim1 being determined immediately before the transition from the velocity following mode to the velocity hold mode) is different from the direction of the x axis and is relatively close to the direction of the x axis, the magnitude of the velocity vector of the vehicle system center of gravity diminishes, and the direction of this velocity vector automatically approaches the direction of the x axis (the fore-and-aft direction of the occupant), even when the occupant does not actively perform a maneuvering operation with the movement of his or her upper body. Therefore, the vehicle 1 runs straight to a greater degree with respect to the fore-and-aft direction of the occupant.

Here, when the vehicle 1 is to be accelerated, in most cases, it is required to accelerate the vehicle 1 in particularly the fore-and-aft direction of the occupant. In this case, the vehicle 1 according to the present invention runs straight to a greater degree with respect to the fore-and-aft direction, as described above. Therefore, even when the direction of the impellent force applied to the vehicle 1 is slightly deviated from the fore-and-aft direction, in the braking mode following the subsequent velocity hold mode, the velocity of the wheel assembly 5 is controlled so that the velocity vector of the vehicle system center of gravity automatically faces the fore-and-aft direction.

Therefore, a discrepancy of the moving direction of the vehicle 1 is not likely to occur. Further, the vehicle 1 may run straight to a greater degree with respect to the fore-and-aft direction of the occupant (the vehicle 1 may move more easily in the fore-and-aft direction of the occupant). Further, when the vehicle 1 is moved in the fore-and-aft direction, the vehicle 1 may be moved in the fore-and-aft direction even when the impellent force applied to the vehicle 1 is not precisely facing the fore-and-aft direction. As a result, the maneuvering operation of running the vehicle 1 in the fore-and-aft direction may be executed more easily.

In addition, when the direction of the base required center-of-gravity point velocity vector ↑Vb_aim1 determined immediately before the transition from the velocity hold mode to the braking mode (=↑Vb_aim1 determined immediately before transitioning from the velocity following mode to the velocity hold mode) is different from the direction of the x axis and is relatively far apart from the direction of the x axis, the magnitude of the velocity vector of the vehicle system center of gravity diminishes while the direction of the velocity vector is maintained approximately constant even when the occupant does not perform an active maneuvering operation with the movement of his or her upper body. In other words, when the direction of ↑Vb_aim1 determined immediately before the transition from the velocity hold mode to the braking mode is relatively far from the direction of the x axis, it is highly likely that the direction of the velocity vector of the vehicle system center of gravity which was finally intended by the occupant in the velocity following mode is the same direction as the x axis direction. Therefore, after the velocity following mode, it is possible to prevent the vehicle system center of gravity from moving in the direction different from a direction that the occupant intends.

Explanation of Modified Example of Vehicle 1

Next, a variation of the vehicle 1 (example of a basic configuration), described above, is described with reference to FIG. 21. Incidentally, this variation differs from the basic configuration in that only a part of a processing in the velocity hold mode is different. Therefore, in the description of this variation, the same configuration and processing already described with regards to the vehicle 1 of example of the basic configuration described above is not described here.

Figure 21:
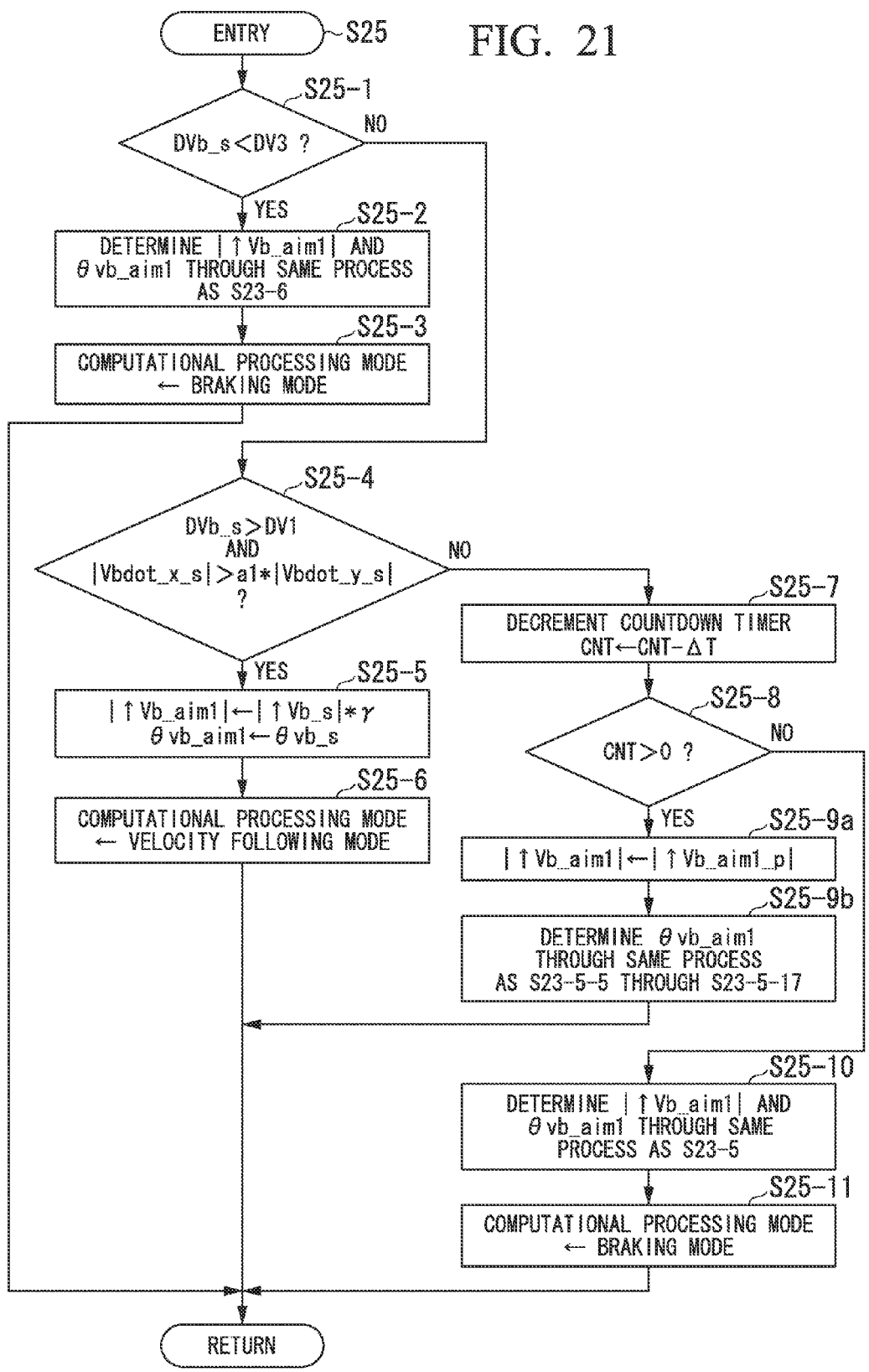
FIG. 21 is a flowchart showing a subroutine processing in step S25 shown in FIG. 14.

According to this variation, the computational processing of the velocity hold mode in step S25 shown in FIG. 14 is executed as indicated in the flowchart of FIG. 21. In this case, other than the processing in case the determination result of step S25-8 in FIG. 21 becomes positive, the processing is the same as that described above with regards to example of the basic configuration described above (i.e., the processing shown in FIG. 20).

Further, according to the present variation, when the determination result of step S25-8 in FIG. 21 is positive, i.e., when the predetermined amount of time indicated by the initial value Tm of the countdown timer has not yet passed, in a condition in which neither an acceleration requirement nor a deceleration requirement has occurred after the velocity hold mode has begun, the required center-of-gravity point velocity generator 74 determines the base required center-of-gravity point velocity vector absolute value |↑Vb_aim1| in step S25-9a. Further, the required center-of-gravity point velocity generator 74 determines the basic required center-of-gravity velocity vector directional angle θvb_aim1 in step S25-9b.

In this case, in step S25-9a, the current value of |↑Vb_aim1↑ is determined to be the same value as the previous value |↑Vb_aim1_p|, in a manner similar to the example of the basic configuration described above.

Further, in step S25-9b, the current value of θvb_aim1 is determined by the same process as steps S25-5-5 to 25-5-17 shown in FIGS. 16 and 17 described above in the example of the basic configuration. Therefore, when the direction of the basic required center-of-gravity velocity vector ↑Vb_aim1, determined immediately before the transition from the velocity following mode to the velocity hold mode, is different from the x axis direction and is a direction relatively close to the x axis direction (in more precise terms, when the directional angle θvb_aim1 of ↑Vb_aim1 determined immediately before the transition is an angle satisfying either one of the following inequalities: 0°<θvb_aim1_p≦θth1+, θth1−≦θvb_aim1_p<0°, θth2+≦θvb_aim1_p<180°, −180°<θvb_aim1_p≦θth2−), during the continuation period of the velocity hold mode, θvb_aim1 approaches the convergent target angle 0° or 180° or −180° at a constant temporal rate of change. Finally, θvb_aim1 is determined so as to be maintained at 0° or 180° or −180°. Here, the direction of the vector ↑Vb_aim1 refers to a direction determined in the control processing period in which the determination result of step S24-3 in FIG. 19 is positive.

Therefore, during a period combining the velocity hold mode and the subsequent braking mode, θvb_aim1 approaches the convergent target angle (0° or 180° or −180°) at a certain temporal rate of change. Thus, θvb_aim1 is finally determined so as to be maintained at the convergent target angle.

Meanwhile, when the direction of the basic required center-of-gravity velocity vector ↑Vb_aim1, determined immediately before the transition from the velocity following mode to the velocity hold mode, is different from the x axis direction and is a direction relatively different from the x axis direction (in more precise terms, when the directional angle θvb_aim1 of ↑Vb_aim1 determined immediately before the transition is an angle satisfying either one of the following inequalities: θth1+<θvb_aim1_p<θth2+, θth2−<θvb_aim1_p<θth1−), during the continuation period of the velocity hold mode, θvb_aim1 is maintained to be constant at the same angular value as the directional angle θvb_aim1 of ↑Vb_aim1 determined immediately before the transition. Here, the direction of the vector ↑Vb_aim1 refers to a direction determined in the control processing period in which the determination result of step S24-3 in FIG. 19 is positive. Therefore, the determination process of the directional angle 0vb_aim1 in this case is the same as the example of the basic configuration. Therefore, θvb_aim1 is maintained to be constant during the period combining the velocity hold mode and the subsequent braking mode.

Other than the processing described above, the processing of the present variation is the same as that of the example of the basic configuration.

According to the present variation, when the direction of the basic required center-of-gravity velocity vector ↑Vb_aim1, determined immediately before the transition from the velocity following mode to the velocity hold mode, is different from the x axis direction and is a direction relatively close to the x axis direction, the direction of the velocity vector of the vehicle system center-of-gravity automatically approaches the x axis direction (i.e., the fore-and-aft direction of the occupant), even when an active control operation is not performed with the movement of the upper body of the occupant in either the velocity hold mode or the subsequent braking mode. Therefore, the vehicle 1 is able to move straight in the fore-and-aft direction of the occupant to a greater degree.

Next, some description related to the vehicle 1 and the variation of the basic configuration described above will be provided.

In the basic configuration and the variation, the predetermined representative point of the vehicle 1 is the vehicle system center of gravity (in particular, the vehicle and occupant entire the center-of-gravity point), however, the representative point may be set, for example, the center point of the wheel assembly 5 and the point of the predetermined component (for example, the supporting frame 13) of the base body 9, and the like.

In the basic configuration and the variation, in step S23-1, 25-4, to determine whether or not the acceleration request has been generated, for the estimated center-of-gravity point velocity absolute value rate of change DVb_s and the center-of-gravity point acceleration estimation values Vbdot_x_s, Vbdot_y_s, it is determined whether or not the conditions DVb_s>DV1 and |Vbdot_x_s|>a1*|Vbdot_y_s|.

However, for example, when the temporal rate of change of the absolute value of the estimated center-of-gravity velocity value Vb_x_s in the x axis direction is larger than the predetermined threshold value, it may be determined that the acceleration request has been generated.

Alternatively, for example, the condition related to the center-of-gravity point acceleration estimation value Vbdot_x_s, Vbdot_y_s is not considered, it may be determined whether or not the acceleration request has been generated due to the simply determining whether or not DVb_s>DV1. In this case, the vehicle 1 can be performed to run so that after the velocity vector ↑Vb of the vehicle system center of gravity is accelerated in substantially the y axis direction, the velocity vector is maintained the constant magnitude thereof, then, the magnitude of ↑Vb is reduced.

Further, in the basic configuration and the variation, in a case that the determination result in step S23-5-14 of FIG. 17 is negative, when θvb_aim1_p is a value relatively close to 90° (a value within the predetermined range around 90°), θvb_aim1 may be determined to gradually come closer to 90°, and when θvb_aim1 is a value relatively close to −90° (a value within the predetermined range around −90°), θvb_aim1 may be determined to gradually come closer to −90°. Alternatively, when the determination result in step S23-5-14 is negative, θvb_aim1 may be constantly performed to approach 90° or −90° (the angle value closer to θvb_aim1_p). In those case, the method that θvb_aim1 is performed to approach 90° or −90° may be, for example, the same method that 0vb_aim1 is performed to approach 0° or 180° or −180° in the basic configuration and the variation.

In this case, when the direction of ↑Vb_aim1 immediately before the transition from the velocity following mode to the velocity hold mode is relatively close to the y axis direction, in the braking mode following the velocity hold mode or in the velocity hold mode and the braking mode, the required center-of-gravity point velocity vector ↑Vb_aim can approach the direction of the y axis direction.

Further, in the braking mode after the velocity following mode or in the velocity hold mode and the braking mode, it may selectively switch corresponding to the switching operation, and the like that the direction of ↑Vb_aim1 (furthermore, the direction of ↑Vb_aim) approaches which direction the x axis direction or the y axis direction.

Further, in the basic configuration and the variation, when the magnitude of ↑Vb_aim1 is reduced in the braking mode, |↑Vb_aim1| is continuously reduced to "0" in the constant temporal rate of change, however, |↑Vb_aim1| may be reduced to "0" in other features. For example, |↑Vb_aim1| may be exponentially reduced in the predetermined time constant.

Similarly, when the direction of ↑Vb_aim1 approaches the x axis direction, instead of θvb_aim1 approaching the convergent target angle (0° or 180° or −180°) in the constant temporal rate of change, for example, θvb_aim1 may exponentially approach the convergent target angle in the predetermined time constant. Even if the direction of ↑Vb_aim1 approaches the y axis direction, the above method is similarly applied.

Further, in the basic configuration and the variation, when the direction of ↑Vb_aim1 approaches the x axis direction, θvb_aim1 (furthermore, θvb_aim) is successively determined to approach the convergent target angle (0° or 180° or −180°). However, instead of successively determining 0vb_aim1, a ratio |Vb_y_aim1|/|Vb_x_aim1| of the absolute value of the y axis direction component Vb_y_aim1 of ↑Vb_aim1 with respect to the absolute value of the x axis direction component Vb_x_aim1 of ↑Vb_aim1 is successively determined to approach "0", and by using this ratio |Vb_y_aim1|/|Vb_x_aim1|, the direction of ↑Vb_aim1 may be determined In this case, the polarities of Vb_x_aim1, Vb_y_aim1 are maintained in the constant polarity until the magnitude thereof is equal to "0", respectively.

When the direction of ↑Vb_aim1 approaches the y axis direction, the ratio |Vb_x_aim1|/|Vb_y_aim1| of the absolute value of the x axis direction component Vb_x_aim1 with respect to the absolute value of the y axis direction component Vb_y_aim1 of ↑Vb_aim1 is successively determined to approach "0", by using this ratio |Vb_x_aim1|/|Vb_y_aim1|, the direction of ↑Vb_aim1 may be determined Further, in the basic configuration and the variation, the velocity hold mode is provided between the velocity following mode and the braking mode, however, this velocity hold mode may be omitted. In this case, the process in step S24-4 of FIG. 19 may be omitted and, instead of the process of step S24-5, the process that the computational processing mode changes to the braking mode may be executed. Further, the features except the above, for example, may be the same as the basic configuration example.

In this case, a velocity decay process is realized by the process of the braking mode in the state where the acceleration request and deceleration required is not generated (the process of FIG. 15 in the state where the determination results in step S23-1, 23-4 are negative) and by the process in steps S26 to 28 following that.

Further, in the basic configuration and the variation, the required center-of-gravity point velocity vector ↑Vb_aim is increased corresponding that the additional impellent force is additionally added to the vehicle 1, then, the processes of the velocity hold mode and the braking mode as the velocity decay process are execute. However, for example, the required center-of-gravity point velocity vector ↑Vb_aim is increased to accelerate the vehicle 1 corresponding to the switching operation by the occupant, and the like, then, the processes of the velocity hold mode and the braking mode (the velocity decay process) may be executed to start corresponding to the release of the switching operation, and the like. Further, the environmental condition, and the like may be considered as a condition to start the processes of the velocity hold mode and the braking mode.

Further, in the basic configuration and the variation, in the autonomous mode, the required center-of-gravity point velocity vector ↑Vb_aim is constantly set to "0", however, when the operator, and the like pushes and moves the vehicle 1 where the occupant is not boarding, as necessary, the same process as in the boarding mode may be executed to determine ↑Vb_aim that the required center-of-gravity point velocity vector ↑Vb_aim changes.

Explanation of an Omnidirectional Vehicle Operation System According to a First Embodiment Next, an omnidirectional vehicle operation system according to a first embodiment of the present invention will be described.

Figure 22:
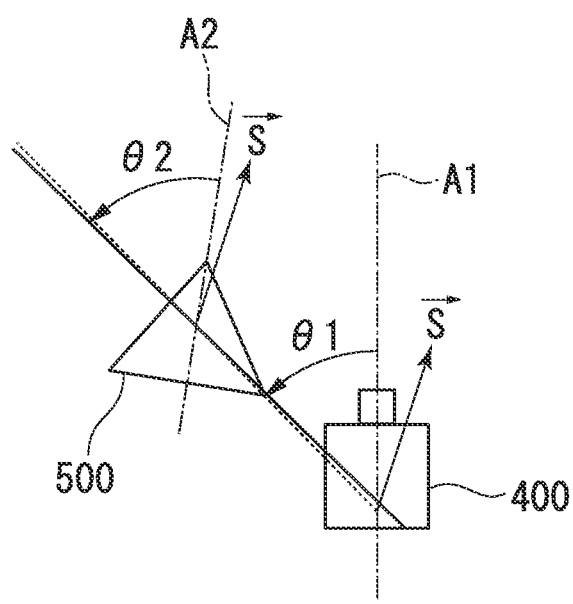
FIG. 22 is a top view of the omnidirectional vehicle operation system according to a first embodiment of the present invention.

FIG. 22 shows a top view of the omnidirectional vehicle operation system according to the first embodiment of the present invention. As shown in FIG. 22, the omnidirectional vehicle operation system of the present embodiment includes an operation device 400 of a remote controller, and the like and an omnidirectional vehicle 500(hereinafter, describing "a vehicle 500"). The vehicle 500 is configured that the configuration to be controlled by the operation device 400 is provided in addition to the vehicle 1 of the basic configuration described above or the variation of the vehicle 1.

In the operation device 400, an operation portion such as a joystick and a cross key is provided to instruct the direction to move the vehicle 500, the direction where the operator has operated the operation portion is represented, for example, by the manipulated vector ↑S where the fore-and-aft direction of a chassis of the operation device 400 is the x axis and the lateral direction thereof is the y axis. That is, the operation device 400 uses the relative coordinate system using the coordinate axis A1 as shown in FIG. 22. This relative coordinate system is described as "an operation device chassis coordinate system".

As described in the basic configuration, the vehicle 500 is envisioned in xyz coordinate system comprising the x axis, referring to the horizontal axis in the fore-and-aft direction, the y axis, referring to the horizontal axis in the lateral direction and the z axis, referring to the orthogonal axis. Further, "the fore-and-aft direction" and "the lateral direction" mean the directions which are equal to or approximately equal to the fore-and-aft direction and the lateral direction of the occupant's upper body boarding on the payload supporting part 3 with normal posture. That is, the vehicle 500 uses the relative coordinate system using the coordinate axis A2 as shown in FIG. 22 for the fore-and-aft direction and the lateral direction. This relative coordinate system is described as "a vehicle coordinate system".

The direction where the chassis of the operation device 400 is instructed when the operator controls the vehicle 500 is not constant, further, the vehicle 500 is movable on the driving surface in the omnidirection, thus the operation device chassis coordinate system is not equal to the vehicle coordinate system in most cases. The presence direction of the vehicle 500 acquired in the operation device 400 (hereinafter, describing "the vehicle presence direction")θ1 is indicated as an angle from the coordinate axis A1 in the operation device chassis coordinate system. Further, similarly, the manipulated vector ↑S acquired in the operation device 400 is a vector with a direction indicated as an angle from the coordinate axis A1 in the operation device chassis coordinate system. Meanwhile, the presence direction of the chassis of the operation device 400 acquired in the vehicle 500 (hereinafter, "the operation device presence direction" describing)θ2 is indicated as an angle from the coordinate axis A2 in the vehicle coordinate system. In this time, the displacement between the operation device chassis coordinate system and the vehicle coordinate system is equal to the difference between the vehicle presence direction θ1 and the operation device presence direction θ2. That is, the relative direction of the vehicle 500 viewed from the operation device 400 is (θ1-θ2), and is the direction of the coordinate axis A2 with respect to the coordinate axis A1. Thus, the vehicle 500 performs a moving control to rotate the manipulated vector ↑S in the operation device chassis coordinate system received from the operation device 400 by the displacement between the direction of the operation device 400 and the direction of the vehicle 500 and to convert it to the manipulated vector ↑S in the vehicle coordinate system.

Figure 23:
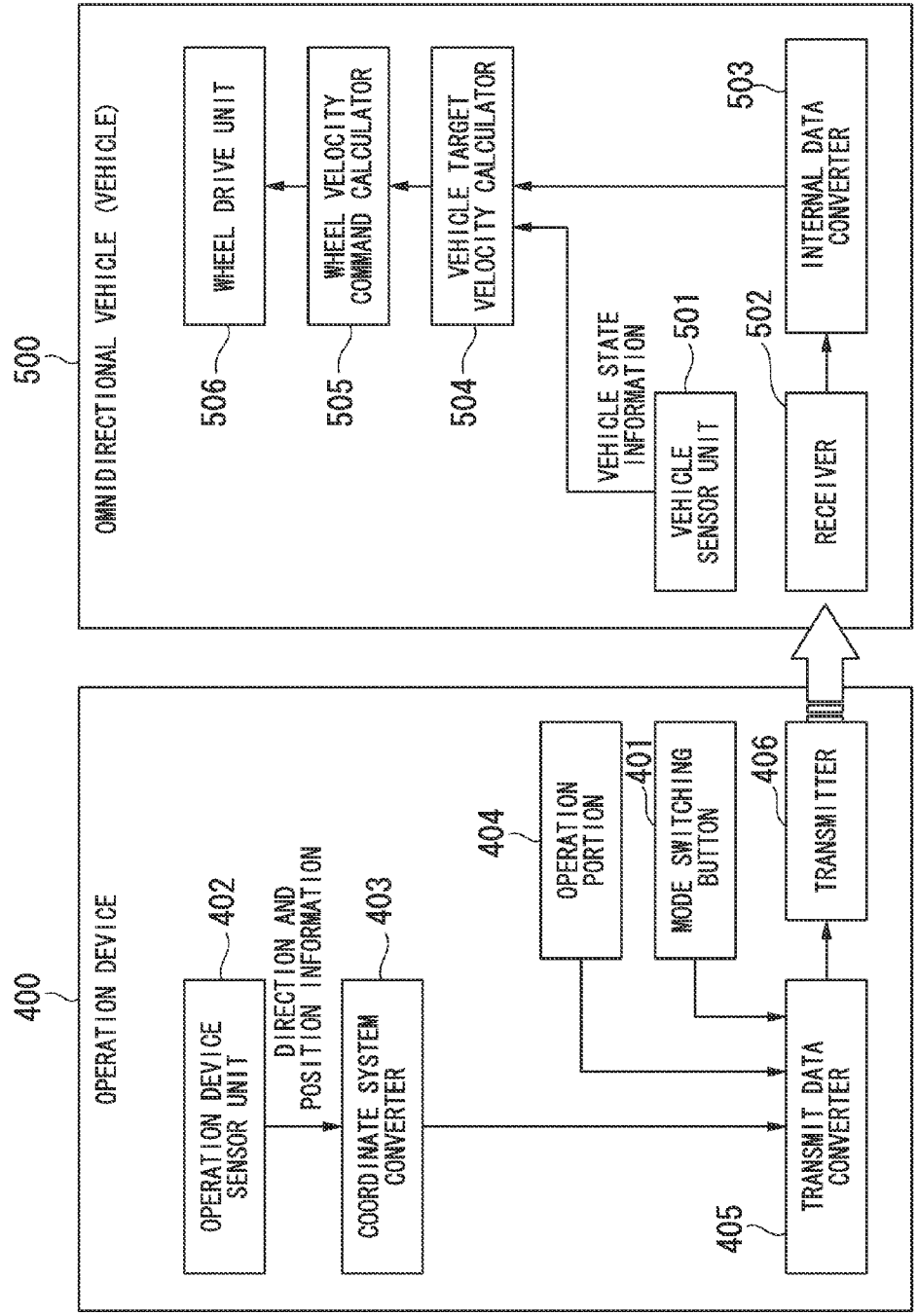
FIG. 23 is a block diagram showing a configuration of the omnidirectional vehicle operation system according to the present embodiment.

FIG. 23 is a block diagram showing a configuration of the omnidirectional vehicle operation system according to the present embodiment. Hereinafter, for the vehicle 500, the additional configuration which is different from the vehicle 1 of the basic configuration described above or the variation of the vehicle 1 will be mainly described.

As shown in FIG. 23, the operation device 400 is configured to include a mode switching button 401, an operation device sensor unit 402, a coordinate system converter 403, an operation portion 404, a transmit data converter 405 and a transmitter 406.

The mode switching button 401 inputs one of the remote control mode and the remote control stop mode as modes to instruct the vehicle 500. The operation device sensor unit 402 detects the vehicle presence direction θ1 which is the presence direction of the vehicle 500 viewed from the operation device 400. Any sensors can be used as the operation device sensor unit 402, for example, an ESPAR antenna, an ultrasonic wave, laser (light) such as an infrared light sensor, and the like. When the coordinate system where the operation device sensor unit 402 uses is different from the operation device chassis coordinate system, the coordinate system converter 403 converts the vehicle presence direction θ1 detected by the operation device sensor unit 402 to the vehicle presence direction θ1 in the operation device chassis coordinate system. When the operation device sensor unit 402 uses the operation device chassis coordinate system, it is not necessary to perform the conversion. The operation portion 404 outputs the manipulated direction vector ↑S input by the operator, for example, with the joystick, the cross key, or the like. The manipulated direction vector ↑S is the manipulated variable viewed from the operator showing the direction to progress the vehicle 500. The transmit data converter 405 converts the transmit data into the data format which can be received by the vehicle 500. The transmitter 406 transmits the data converted by the transmit data converter 405 for the data format to the vehicle 500 by the radio or the wireline.

The vehicle 500 is configured to include a vehicle sensor unit 501, a receiver 502, an internal data converter 503, a vehicle target velocity calculator 504, a wheel velocity command calculator 505, and a wheel drive unit 506.

The vehicle sensor unit 501 is a sensor that detects states of the vehicle 500 which are the posture, the wheel velocity, the direction, position, or the like of the vehicle 500. The vehicle sensor unit 501 is configured such that a sensor that detects the operation device presence direction 02 which is the presence direction of the operation device 400 viewed from the vehicle 500 is added to the sensors provided in the vehicle 1 of the basic configuration (the tilting sensor 52, the load sensor 54 and the rotary encoders 56R, 56L as the angle sensor). As the sensor that detect the operation device presence direction, for example, the ESPAR antenna, ultrasonic waves, laser (light), the image process, or the like can be used. The receiver 502 receives the data transmitted from the transmitter 406 of the operation device 400 by the radio or the wireline.

The internal data converter 503 converts the received data received by the receiver 502 from the operation device 400 into the data format which can be processed in the vehicle 500. The vehicle target velocity calculator 504 rotates by the difference between the vehicle presence direction θ1 received from the operation device 400 and the operation device presence direction θ2 detected in the vehicle sensor unit 501, converts the manipulated vector ↑S received from the operation device 400 to the vehicle coordinate system and calculates the target direction and velocity to progress the vehicle 500. The wheel velocity command calculator 505 calculates the command value for the wheel drive unit 506 to be equal to the target direction and velocity calculated by the vehicle target velocity calculator 504. The wheel drive unit 506 drives the wheel according to the command value calculated by the wheel velocity command calculator 505.

Figure 24:
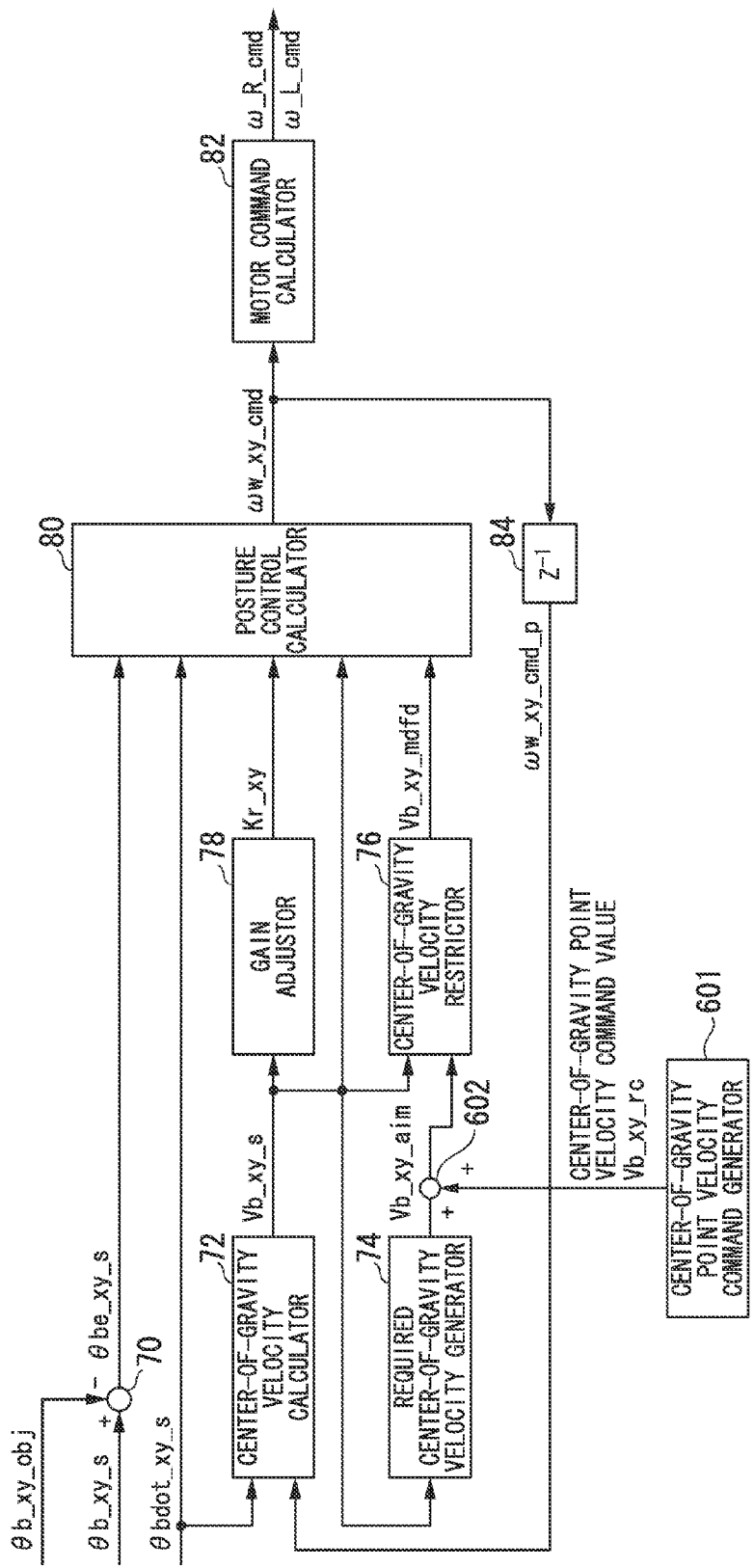
FIG. 24 is a block diagram showing a detailed configuration of the vehicle target velocity calculator according to the present embodiment.

FIG. 24 is a diagram showing the feature in detail provided in the vehicle target velocity calculator 504 as shown in FIG. 23.

In FIG. 24, the same feature as the feature provided in a control unit 50 in the vehicle 1 of the basic configuration as shown in FIG. 9 is denoted by the same reference number, the description in detail will be arbitrarily omitted. The different feature of the vehicle target velocity calculator 504 as shown in FIG. 24 from the feature provided in the control unit 50 of the vehicle 1 as shown in FIG. 9 is the feature that the center-of-gravity point velocity command generator 601 and the addition calculator 602 is further provided.

After rotating the manipulated vector ↑S received from the operation device 400 by the difference between the vehicle presence direction 01 received from the operation device 400 and the operation device presence direction θ2 detected in the vehicle sensor unit 501, the center-of-gravity point velocity command generator 601 determines the center-of-gravity point velocity command value in the vehicle coordinate system. The addition calculator 602 adds the required center-of-gravity point velocity output from a required center-of-gravity point velocity generator 74 and the center-of-gravity point velocity command value generated by the center-of-gravity point velocity command generator 601 and outputs the center-of-gravity point velocity restrictor 76.

A wheel velocity command calculator 505 as shown in FIG. 23 corresponds to the motor command calculator 82 as shown in FIG. 9, FIG. 24 and a wheel drive unit 506 as shown in FIG. 23 corresponds to the actuator 7 of the vehicle 1. That is, the vehicle 500 is configured such that the sensor that detects the operation device presence direction in the vehicle sensor unit 501 as shown in FIG. 23, the receiver 502, the internal data converter 503 and the center-of-gravity point velocity command generator 601 and the addition calculator 602 in the vehicle target velocity calculator 504 are added to the vehicle 1 of the basic configuration described above or the variation of the vehicle 1.

Figure 25:
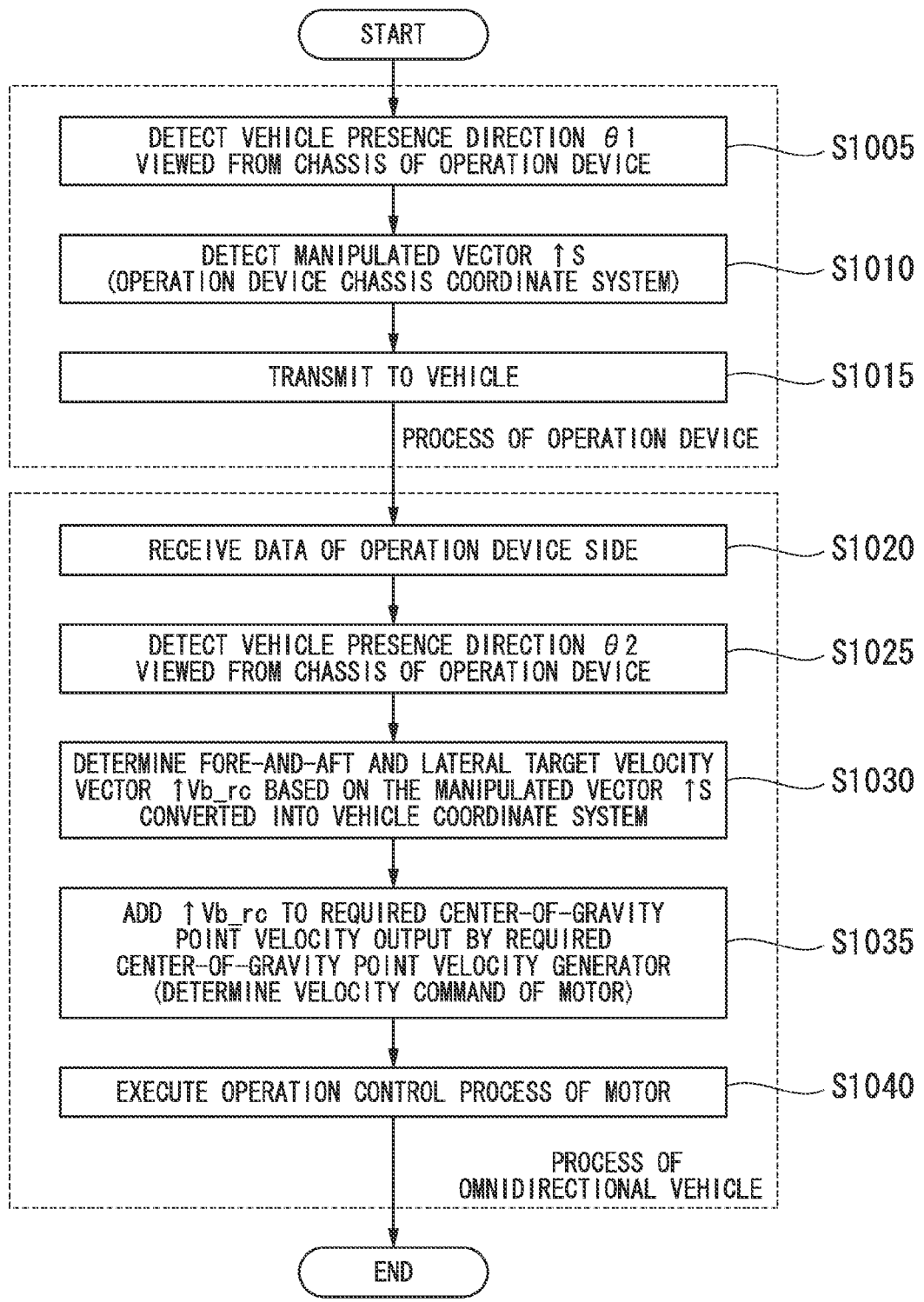
FIG. 25 is a flowchart showing a processing of the omnidirectional vehicle operation system according to the present embodiment.

FIG. 25 is a diagram showing a process flow of the omnidirectional vehicle operation system according to the present embodiment and shows an operation in step S9 of FIG. 7.

Firstly, in the remote control stop mode, the vehicle 500 outputs the detection value of the tilting sensor 52 of the vehicle sensor unit 501, the load sensor 54 and the rotary encoders 56R, 56L as the angle sensor to the vehicle target velocity calculator 504 and is operated in the same manner as the vehicle 1 or the variation of the basic configuration described above.

Here, the operator input the remote control mode by using the mode switching button 401 of the operation device 400, thus the transmitter 406 transmits the mode switching instruction with the remote control mode to the vehicle 500 according to the instruction of the transmit data converter 405. The internal data converter 503 of the vehicle 500 receives the mode switching instruction via the receiver 502, thus the vehicle target velocity calculator 504 is capable of receiving the operation instruction from the operation device 400.

Further, due to the input of the remote control mode, the operation device sensor unit 402 of the operation device 400 detects the vehicle presence direction θ1 which is the presence direction of the vehicle 500 viewed from the chassis of the operation device 400 and outputs to the coordinate system converter 403 (step S1005). Here, the operation device sensor unit 402 uses the operation device chassis coordinate system, the coordinate system converter 403 directly outputs the vehicle presence direction θ1 input from the operation device sensor unit 402 to the transmit data converter 405.

Subsequently, the operator inputs a manipulated direction by the operation portion 404. Thus, a manipulated vector ↑S of the direction where the joystick is tilted or the direction where the cross key is pushed is output from the operation portion 404 (step S1010). The manipulated vector ↑S in this case is an unit vector in the operation device chassis coordinate system.

The transmit data converter 405 sets the data where the vehicle presence direction 01 input from the coordinate system converter 403 and the manipulated vector ↑S input from the operation portion 404 are set into the predetermined transmit data format. The transmitter 406 transmits the vehicle presence direction θ1 and the manipulated vector ↑S where the format conversion is performed by the transmit data converter 405 to the vehicle 500 (step S1015).

The receiver 502 of the vehicle 500 receives the data transmitted by the operation device 400 in step S1015 and the internal data converter 503 acquires the vehicle presence direction θ1 and the manipulated vector ↑S from the data received by the receiver 502 and outputs to the vehicle target velocity calculator 504 (step S1020). The vehicle sensor unit 501 detects the operation device presence direction θ2 which is the presence direction of the chassis of the operation device 400 and outputs to the vehicle target velocity calculator 504 (step S1025). This operation device presence direction θ2 is the angle in the vehicle coordinate system.

The center-of-gravity point velocity command generator 601 of the vehicle target velocity calculator 504 calculates the fore-and-aft and lateral target velocity vector ↑Vb_rc (the target velocity vector) as the center-of-gravity point velocity command value based on the manipulated vector ↑S converted to the vehicle coordinate system according to the following equation 11 (step S1030). In the equation 11, the target velocity proportional to the direction of the manipulated vector ↑S and to the magnitude of the manipulated vector ↑S is determined $$\uparrow Vb\_rc = c \cdot Rot(\theta2-\theta1) \cdot \uparrow S \qquad \text{Equation 11}$$

Here, "·" represents the inner product, "Rot" represents the rotation. Further, "c" is an arbitrary coefficient. According to the equation 11, the fore-and-aft and lateral target velocity vector ↑Vb_rc is determined by converting the manipulated vector ↑S, which is the unit vector of the operation device chassis coordinate system, to the vector in the vehicle coordinate system by rotating by (θ2−θ1), and by multiplying it by the predetermined coefficient c. Thus, when c is a positive value, the direction of the manipulated vector ↑S instructed by the operation portion 404 of the operation device 400 and the direction of the fore-and-aft and lateral target velocity vector ↑Vb_rc are the same direction as in the absolute coordinate system.

The addition calculator 602 of the vehicle target velocity calculator 504 adds the fore-and-aft and lateral target velocity Vb_xy_rc which is a pair of a component of the x axis direction of the fore-and-aft and lateral target velocity vector ↑Vb_rc calculated in step S1030 and a component of the y axis direction and the required center-of-gravity point velocity Vb_xy_aim output from the required center-of-gravity point velocity generator 74, and outputs to the center-of-gravity point velocity restrictor 76 (step S1035). The center-of-gravity point velocity restrictor 76 executes the process performed in the vehicle 1 of the basic configuration or the variation of the vehicle 1 by using the required center-of-gravity point velocity Vb_xy_aim added the fore-and-aft and lateral target velocity Vb_xy_rc output from the addition calculator 602 instead of by using the required center-of-gravity point velocity Vb_xy_aim.

The subsequent processes where the wheel velocity command calculator 505 instructs to drive the wheel according to the target velocity calculated by the vehicle target velocity calculator 504 and the wheel drive unit 506 drives the wheel according to the direction from the wheel velocity command calculator 505 are similar to the processes in the vehicle 1 of the basic configuration or the variation of the vehicle 1 (step S1040).

In the above, the fore-and-aft and lateral target velocity vector ↑Vb_rc is calculated from the manipulated variable based on only the manipulated direction by the operation portion 404, however, the velocity may be controlled by further using the velocity instruction input by the operation portion 404 as the manipulated variable and by changing the magnitude of the fore-and-aft and lateral target velocity vector ↑Vb_rc.

The velocity instruction is output from the operation portion 404 in step S1010. For example, if the operation portion 404 is the joystick, the velocity instruction is the tilt angle θ3 of the joystick. Alternatively, the operation portion 404 may be velocity instruction buttons of the slow speed, the high speed, or the like. Further, in step S1030, the center-of-gravity point velocity command generator 601 of the vehicle 500 calculates the fore-and-aft and lateral target velocity vector ↑Vb_rc which is the center-of-gravity point velocity command value by using the following equation 13 in the operation device 400 and using the velocity control coefficient t(t>0) determined corresponding to the velocity instruction of the slow speed, the high speed, or the like input by the tilt angle θ3 and the velocity instruction button.

$$\uparrow Vb\_rc = c \cdot Rot(\theta2-\theta1) \cdot \uparrow S \cdot t \qquad \text{Equation 13}$$

According to the equation 13, the fore-and-aft and lateral target velocity vector ↑Vb_rc is calculated by using the inner product of the manipulated vector ↑S and the velocity control coefficient t instead of using the manipulated vector ↑S of the equation 11. The velocity control coefficient t increases with increasing the instruction of the high speed. When, for example, the joystick is used, the value of the velocity control coefficient t continuously or in stages increases with increasing the tilt angle θ3, however, the upper limit of the velocity control coefficient t may be provided.

In the transmit data converter 405 of the operation device 400, the velocity instruction input from the operation portion 404 is converted to the velocity control coefficient t, then may be transmitted to the vehicle 500 in conjunction with the vehicle presence direction θ1 and the manipulated vector ↑S, or, the velocity instruction is transmitted from the operation device 400 to the vehicle 500 in conjunction with the vehicle presence direction θ1 and the manipulated vector ↑S, then the operation instruction may be converted to the velocity control coefficient t in the center-of-gravity point velocity command generator 601 of the vehicle 500.

Explanation of an Omnidirectional Vehicle Operation System According to a Second Embodiment Subsequently, an omnidirectional vehicle operation system according to a second embodiment of the present invention will be described. In the first embodiment, the center-of-gravity point velocity command value is calculated in the vehicle, however, in the present embodiment, it is calculated in the operation device.

Figure 26:
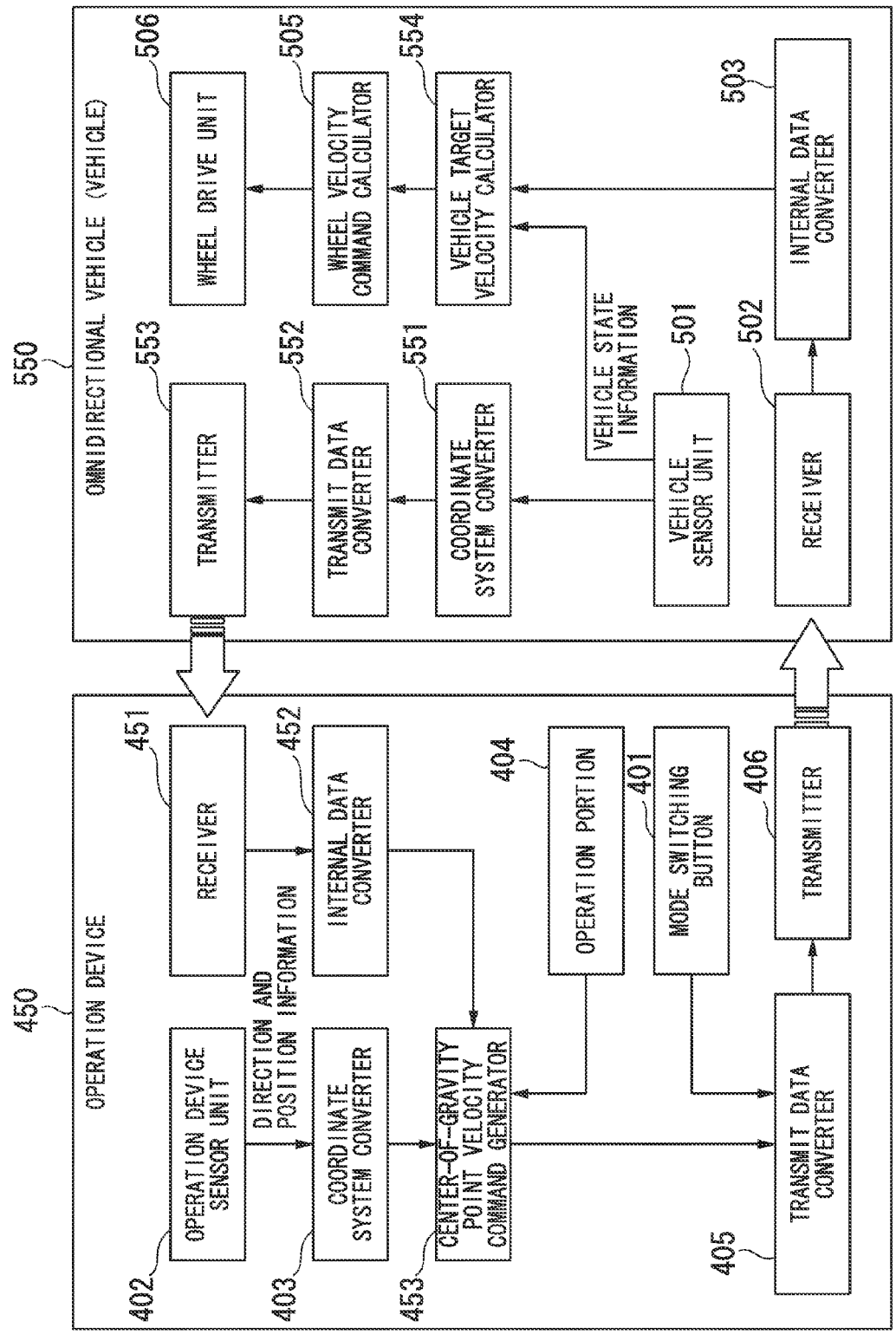
FIG. 26 is a block diagram showing a configuration of the omnidirectional vehicle operation system according to a second embodiment of the present invention.

FIG. 26 shows a feature block diagram of the omnidirectional vehicle operation system according to the second embodiment of the present invention, the same part as the omnidirectional vehicle operation system in the first embodiment as shown in FIG. 23 is denoted by the same reference number, the description in detail will be arbitrarily omitted.

The different feature of the operation device 450 as shown in FIG. 26 from the feature of the operation device 400 as shown in FIG. 23 is the feature that a receiver 451, an internal data converter 452 and a center-of-gravity point velocity command generator 453 are further provided.

The receiver 451 receives the data transmitted from the vehicle 550 by the radio or the wireline. The internal data converter 452 converts the received data from the vehicle 550 received by the receiver 451 to a data format which can be processed in the operation device 450. The center-of-gravity point velocity command generator 453 calculates the fore-and-aft and lateral target velocity vector ↑Vb_rc which is the center-of-gravity point velocity command value by the method similar to the center-of-gravity point velocity command generator 601 of the vehicle 500 in the first embodiment.

The different feature of the vehicle 550 as shown in FIG. 26 from the vehicle 500 as shown in FIG. 23 is the feature that the coordinate system converter 551, the transmit data converter 552 and the transmitter 553 further are provided, and the vehicle target velocity calculator 554 is provided instead of the vehicle target velocity calculator 504.

When the coordinate system where the vehicle sensor unit 501 uses is different from the vehicle coordinate system, the coordinate system converter 551 converts the operation device presence direction detected by the vehicle sensor unit 501 into the vehicle coordinate system. When the vehicle sensor unit 501 uses the vehicle coordinate system, it is not necessary to perform the conversion. The transmit data converter 552 converts the transmit data to the data format where the operation device 450 can receive. The transmitter 553 transmits the data converted for the data format by the transmit data converter 552 to the operation device 450 by the radio or the wireline.

The vehicle target velocity calculator 554 calculates the target velocity to progress the vehicle 500 by using the center-of-gravity point velocity command value received from the operation device 450. The feature of the configuration features of the vehicle target velocity calculator 554 is similar to the configuration features of the vehicle target velocity calculator 504 as shown in FIG. 24 except for not having the center-of-gravity point velocity command generator 601. In the present embodiment, the addition calculator 602 adds the required center-of-gravity point velocity $Vb\_xy\_aim$ output from the required center-of-gravity point velocity generator 74 and the fore-and-aft and lateral target velocity $Vb\_xy\_rc$ which is a pair of a component of the x axis direction and a component of the y axis direction in the fore-and-aft and lateral target velocity vector $\uparrow Vb\_rc$ indicated by the center-of-gravity point velocity command value received from the operation device 450, and outputs to the center-of-gravity point velocity restrictor 76.

By having the above configuration, the omnidirectional vehicle operation system of the second embodiment is operated as following.

When the remote control mode is input by the operator by the mode switching button 401 of the operation device 450, similar in the first embodiment, the vehicle 500 receives the mode switching instruction from the operation device 400. The vehicle sensor unit 501 of the vehicle 550 detects the operation device presence direction $\theta 2$ which is the presence direction of the operation device 450, and outputs to the coordinate system converter 551. Here, the vehicle sensor unit 501 uses the vehicle coordinate system, the coordinate system converter 551 directly outputs the input operation device presence direction $\theta 2$ to the transmit data converter 552. The operation device presence direction $\theta 2$ is set to the predetermined transmit data format in the transmit data converter 552 and is transmitted to the operation device 450 by the transmitter 553.

The operation device 450 acquires the vehicle presence direction $\theta 1$ and the manipulated vector $\uparrow S$ similar to steps S1005 to S1010 in the first embodiment. The center-of-gravity point velocity command generator 453 of the operation device 450 calculates the fore-and-aft and lateral target velocity vector $\uparrow Vb\_rc$ by the equation 11 by using the vehicle presence direction $\theta 1$ output from the coordinate system converter 403, the manipulated vector $\uparrow S$ output from the operation portion 404 and the operation device presence direction $\theta 2$ output from the internal data converter 452 similar to the center-of-gravity point velocity command generator 601 provided in the vehicle 500 of the first embodiment, and outputs to the transmit data converter 405. The center-of-gravity point velocity command value which is the fore-and-aft and lateral target velocity vector $\uparrow Vb\_rc$ input from the center-of-gravity point velocity command generator 453 is set to the predetermined transmit data format by the transmit data converter 405, and is transmitted to the vehicle 500 by the transmitter 406.

The receiver 502 of the vehicle 500 receives the data transmitted by the operation device 400, and the internal data converter 503 acquires the center-of-gravity point velocity command value from the received data and output to the addition calculator 602 inside of the vehicle target velocity calculator 554. The subsequent process is similar in the first embodiment.

The center-of-gravity point velocity command generator 453 may calculate the fore-and-aft and lateral target velocity vector $\uparrow Vb\_rc$ by the equation 13 by using the velocity instruction input by the operation portion 404 similar in the first embodiment.

In the first, the second embodiments described above, the fore-and-aft and lateral target velocity $Vb\_xy\_rc$ calculated by the center-of-gravity point velocity command generator 601 or the center-of-gravity point velocity command generator 453 is added to the required center-of-gravity point velocity $Vb\_xy\_aim$ output from the required center-of-gravity point velocity generator 74 and is output to the center-of-gravity point velocity restrictor 76, however, only the fore-and-aft and lateral target velocity vector $\uparrow Vb\_rc$ may be output to the center-of-gravity point velocity restrictor 76 without the addition of the required center-of-gravity point velocity $Vb\_xy\_aim$. The center-of-gravity point velocity restrictor 76 executes the process performed in the vehicle 1 of the basic configuration or the variation of the vehicle 1 by using the fore-and-aft and lateral target velocity vector $\uparrow Vb\_rc$ instead of by using the required center-of-gravity point velocity $Vb\_xy\_aim$. Thus, the omnidirectional vehicle can be controlled by only operation of the operation device 400, 450.

Further, in the embodiments described above, the operation device 400 may detect the relative position instead of the relative direction of the vehicle 500 and the vehicle 500 may detect the relative position instead of the relative direction of the operation device 400. The operation device sensor unit 402 of the operation device 400 detects the direction vector which is the relative position of the vehicle 500 viewed from the operation device 400. Similarly, the vehicle sensor unit 501 of the vehicle 500 detects the direction vector which is the relative position of the operation device 400 viewed from the vehicle 500. The ESPAR antenna, ultrasonic wave, laser (light) and the image process may be used as a sensor that detects the relative position in the operation device sensor unit 402, the vehicle sensor unit 501.

If the relative position of the vehicle 500 detected by the operation device sensor unit 402 is represented as (X1, Y1), the vehicle presence direction $\theta 1$ can be obtained by $\tan \theta 1 = (Y1/X1)$. Similarly, if the relative position of the operation device 400 detected by the vehicle sensor unit 501 is represented as (X2, Y2), the operation device presence direction $\theta 2$ can be obtained by $\tan \theta 2 = (Y2/X2)$.

In this way, the relative relationship between the direction of the operation device 400 and the direction of the vehicle 500 is obtained from the relative position of the vehicle 500 detected in the operation device 400, the relative position of the operation device 400 viewed from the vehicle 500.

Further, the sensor such as a GPS (Global Positioning System) that detects the absolute coordinate which is the position in the absolute coordinate system may be used as the operation device sensor unit 402, the vehicle sensor unit 501. In this case, a sensor that detects the absolute coordinate position is provided in both of the operation device 400 and the vehicle 500. Further, the operation device 400 can receive the absolute coordinate position of the vehicle 500 detected by the vehicle sensor unit 501 of the vehicle 500 and can calculate the direction vector of the vehicle 500 viewed from the operation device 400 from the difference between the absolute coordinate position of the operation device 400 detected by the operation device sensor unit 402 and the absolute coordinate position of the vehicle 500. The calculated direction vector in this time is the direction vector in the absolute coordinate system, thus in the coordinate system converter 403, it is converted to the vehicle presence direction 01 similar in the above after being converted to the direction vector in the operation device chassis coordinate system or is converted to the vehicle presence direction θ1 in the operation device chassis coordinate system after acquiring the vehicle presence direction in the absolute coordinate system from the calculated direction vector. When the coordinate system converter 403 uses the absolute coordinate system, it is not necessary to perform the conversion.

The rotation angle to convert the direction vector in the absolute coordinate system to the direction vector in the operation device chassis coordinate system is equal to the direction of the operation device 400 in the absolute coordinate system and can be acquired by using a sensor such as a geomagnetism sensor that detects the direction in the absolute coordinate system as the operation device sensor unit 402. Alternatively, two sensors such as GPS that detect the absolute coordinate may be used as the operation device sensor unit 402. For example, the two GPSs are provided in the position separated from each other in the fore-and-aft direction of the chassis of the operation device 400. The angle between the vector that is acquired as the difference between the absolute coordinate positions detected by these GPSs and the x axis (the fore-and-aft direction) in the absolute coordinate system is the direction of the operation device 400 in the absolute coordinate system.

In a similar fashion, the vehicle 500 can acquire the operation device presence direction θ2. In other words, the vehicle 500 receives the absolute coordinate position of the operation device 400 detected by the operation device sensor unit 402 of the operation device 400 and calculates the direction vector in the absolute coordinate system of the operation device 400 viewed from the vehicle 500 from the difference between the absolute coordinate position of the vehicle 500 detected by the vehicle sensor unit 501 and the absolute coordinate position of the operation device 400. The direction vector of this absolute coordinate system is converted to the operation device presence direction θ2 after being converted to the vector in the vehicle coordinate system or is converted to the operation device presence direction 02 in the vehicle coordinate system after acquiring the operation device presence direction in the absolute coordinate system.

The rotation angle to convert the direction vector in the absolute coordinate system to the direction vector in the vehicle coordinate system is equal to the direction of the vehicle 500 in the absolute coordinate system and can be acquired in the absolute coordinate system by using the geomagnetism sensor, the two GPSs, or the like as the vehicle sensor unit 501, similar in the case of acquiring the direction of the operation device 400.

The case where the presence direction is acquired from the direction vector (the presence position) has been described by use of the operation device 400, the vehicle 500 in the first embodiment, it can be also described by use of the operation device 450, the vehicle 550 of the second embodiment. Further, in the case of the first embodiment, the operation device 400 may transmit the direction vector (the relative position) of the vehicle 500 viewed from the operation device 400 to the vehicle 500 and the vehicle presence direction θ1 may be acquired from the received direction vector in the vehicle 500. Further, in the case of the second embodiment, the vehicle 550 may transmit the direction vector (the relative position) of the operation device 450 viewed from the vehicle 550 to the operation device 450 and the operation device presence direction θ2 may be acquired from the received direction vector in the operation device 450.

According to the present embodiment, even if the omnidirectional vehicle rotates and the direction with respect to the operator changes, the relative relationship between the direction of the omnidirectional vehicle and the direction of the operation device is acquired from the presence direction or the presence position of one of the omnidirectional vehicle and the operation device acquired by the other, and the operation instruction direction by the operation device is converted to the relative direction in the omnidirectional vehicle according to this acquired relative relationship, thus the moving direction and velocity of the omnidirectional vehicle can be determined Therefore, it is not necessary for the operator to perform the operation considered for the direction of the omnidirectional vehicle, thus the operator can easily operate the omnidirectional vehicle with reflecting its purpose by using the operation device. Thus, the operator can control to move the omnidirectional vehicle to, for example, the direction where the joystick of the remote controller is tilted or the direction where the cross key is pushed viewed from the operator.

Explanation of an Omnidirectional Vehicle
Operation System According to a Third Embodiment
Of The Present Invention Next, an omnidirectional vehicle operation system according to a third embodiment of the present invention will be described.

Figure 27:
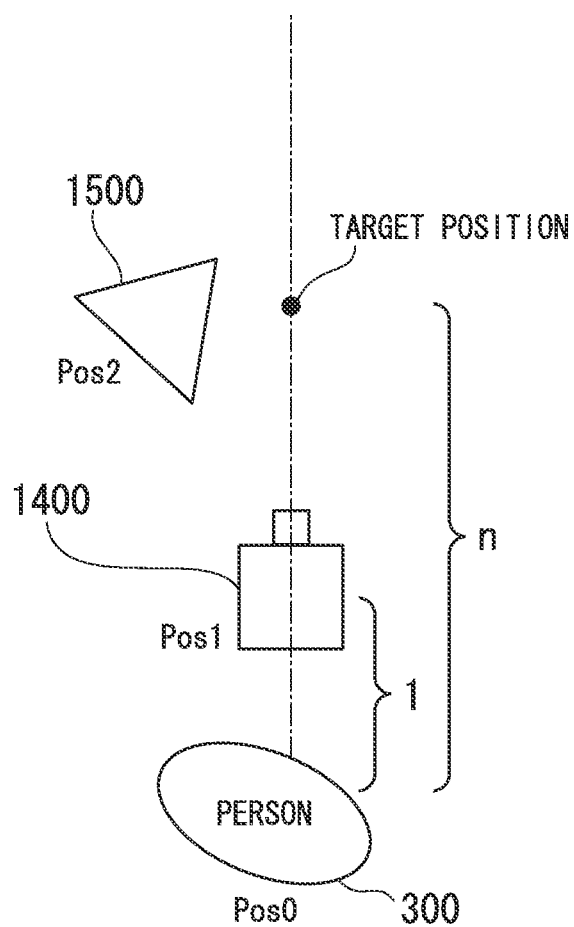
FIG. 27 is a top view of the omnidirectional vehicle operation system according to a third embodiment of the present invention.

FIG. 27 shows a top view of the omnidirectional vehicle operation system according to the third embodiment of the present invention. As shown in FIG. 27, the omnidirectional vehicle operation system of the present embodiment includes an operation device 1400 such as the remote controller used by the operator 300 with holding and an omnidirectional vehicle 1500(hereinafter, describing "a vehicle 1500"). The vehicle 1500 is configured such that the configuration to be controlled by the operation device 1400 is added to the vehicle 1 of the basic configuration described above or the variation of the vehicle 1.

The operator 300 remotely operates the vehicle 1500 by instructing the target position to progress the vehicle 1500 with the operation device 1400. The target position to progress the vehicle 1500 is the position to which a straight line connecting the operator position Pos0 which is the position where the operator 300 is present and the operation device position Pos1 which is the position where the operation device 1400 is present is extended by n times (n>0) from the operator position Pos1 as a base point. For example, the operator 300 holds the operation device 1400 with their hands, instructs the operation device 1400 toward the direction of the target position to move the vehicle 1500 and moves this operation device 1400 to the position separated from the operator's body when moving the vehicle 1500 far from the operator 300 and to the position close to the operator's body when moving the vehicle 1500 near to the operator 300. The vehicle 1500 moves to be close to the target position from the vehicle position Pos2 which is the position where the vehicle 1500 is present.

Figure 28:
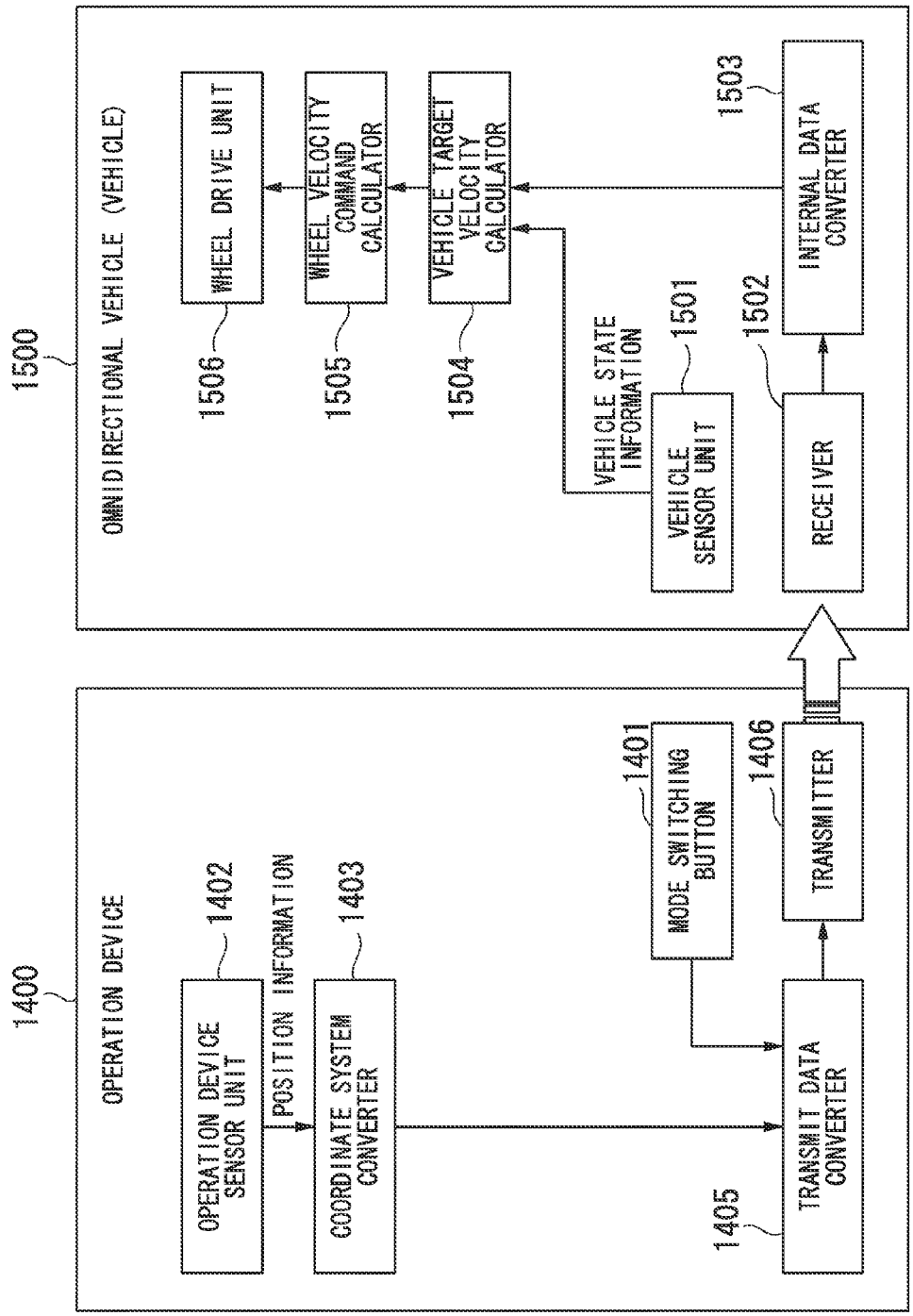
FIG. 28 is a block diagram showing a configuration of the omnidirectional vehicle operation system according to the present embodiment.

FIG. 28 is a block diagram showing a configuration of the omnidirectional vehicle operation system according to the present embodiment. Hereinafter, for the vehicle 1500, the additional configuration which is different from the vehicle 1 of the basic configuration described above or the variation of the vehicle 1 will be mainly described.

As shown in FIG. 28, the operation device 1400 is configured to include a mode switching button 1401, an operation device sensor unit 1402, a coordinate system converter 1403, a transmit data converter 1405 and a transmitter 1406.

The mode switching button 1401 inputs one of the remote control mode and the remote control stop mode as modes to instruct to the vehicle 1500. The operation device sensor unit 1402 detects the operator position Pos0 which is the presence position of the operator 300 and the operation device position Pos1 which is the presence position of the operation device 1400. Any sensors may be used in the operation device sensor unit 1402, for example, a GPS and the geomagnetism sensor that acquires the position in the absolute coordinate system can be used as the sensor that detects the operation device position Pos1. Further, the sensor such as the ESPAR antenna, ultrasonic wave, laser (light) such as the infrared light sensor and the image process that acquires the position in the relative coordinate system is used as the sensor that detects the operator position Pos0. In this time, in the relative coordinate system, for example, the fore-and-aft direction of the chassis of the operation device 1400 is the x axis, the lateral direction thereof is the y axis. Alternatively, the GPS (Global Positioning System) and/or the geomagnetism sensor may be mounted on the operator 300, the operator position Pos0 in the absolute coordinate system detected by this sensor (the absolute position of the operator 300) may be received by the radio and/or the wireline. When the operator position Pos0 and the operation device position Pos1 which are represented in the different coordinates by the operation device sensor unit 1402 are acquired, the coordinate system converter 1403 converts those positions into positions in the same coordinate system. For example, when the operation device position Pos1 is the position in the absolute coordinate system and the operator position Pos1 is the position in the relative coordinate system, the operator position Pos1 is converted to the position in the absolute coordinate system. The transmit data converter 1405 converts the transmit data into the data format where the vehicle 1500 can receive. The transmitter 1406 transmits the data converted by the transmit data converter 1405 for the data format to the vehicle 1500 by the radio or the wireline.

The vehicle 1500 is configured to include a vehicle sensor unit 1501, a receiver 1502, an internal data converter 1503, a vehicle target position and velocity calculator 1504, a wheel velocity command calculator 1505 and a wheel drive unit 1506.

The vehicle sensor unit 1501 is a sensor that detects states of the vehicle 1500 which are the posture, the wheel velocity, the direction, the position, or the like of the vehicle 1500 and is configured such that a sensor that detects the vehicle position Pos2 which is the position of the vehicle 1500 and a sensor that detects the direction of the vehicle 1500 in the absolute coordinate system are provided in addition to the sensors provided in the vehicle 1 of the basic configuration (the tilting sensor 52, the load sensor 54 and the rotary encoders 56R, 56L as the angle sensor). For example, the GPS and the geomagnetism sensor may be used as the sensor that detects the vehicle position Pos2. Further, the geomagnetism sensor may be used as the sensor that detects the direction of the vehicle 1500 in the absolute coordinate. The receiver 1502 receives the data transmitted from the transmitter 1406 of the operation device 1400 by the radio or the wireline. The internal data converter 1503 converts the received data from the operation device 1400 received by the receiver 1502 into a data format which can be processed in the vehicle 1500. The vehicle target position and velocity calculator 1504 calculates a target direction and velocity to move to the target position of the vehicle 1500 acquired from the relative position relationship between the operator position Pos0 received from the operation device 1400 and the operation device position Pos1 from the vehicle position Pos2 detected in the vehicle sensor unit 1501. The wheel velocity command calculator 1505 calculates a command value for the wheel drive unit 1506 to be the target direction and velocity calculated by the vehicle target position and velocity calculator 1504. The wheel drive unit 1506 drives the wheel according to the command value calculated by the wheel velocity command calculator 1505.

Figure 29:
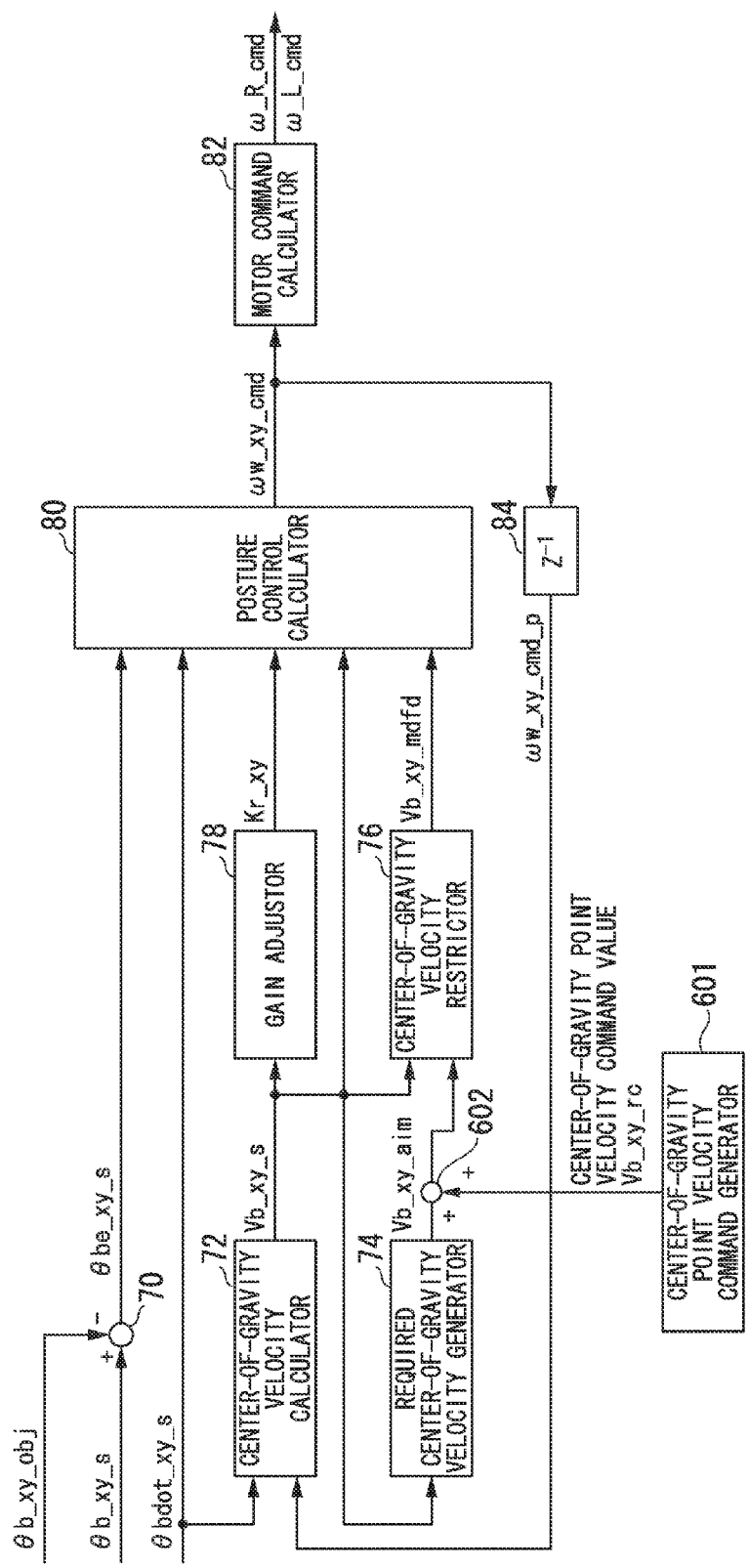
FIG. 29 is a block diagram showing a detailed configuration the vehicle target position and velocity calculator according to the present embodiment.

FIG. 29 is a diagram showing the feature in detail provided in the vehicle target position and velocity calculator 1504 as shown in FIG. 28. In FIG. 29, the same feature as the feature provided in the control unit 50 of the vehicle 1 of the basic configuration as shown in FIG. 9 is denoted by the same reference number, the description in detail will be arbitrarily omitted. The different feature of the vehicle target position and velocity calculator 1504 as shown in FIG. 29 from the feature provided in the control unit 50 of the vehicle 1 as shown in FIG. 9 is that the center-of-gravity point velocity command generator 601 and the addition calculator 602 are further provided.

The center-of-gravity point velocity command generator 601 acquires the target position of the vehicle 1500 from the operator position Pos0 and the operation device position Pos1 which are received from the operation device 1400, then determines the center-of-gravity point velocity command value to be proportional to the vector from the vehicle position Pos2 detected in the vehicle sensor unit 1501 to the target position. The addition calculator 602 adds the required center-of-gravity point velocity output from the required center-of-gravity point velocity generator 74 and the center-of-gravity point velocity command value generated by the center-of-gravity point velocity command generator 601, and outputs to the center-of-gravity point velocity restrictor 76.

The wheel velocity command calculator 1505 as shown in FIG. 28 corresponds to the motor command calculator 82 as shown in FIG. 9, FIG. 29 and the wheel drive unit 1506 as shown in FIG. 28 corresponds to the actuator 7 of the vehicle 1. That is, the vehicle 1500 is configured such that a sensor that detects the vehicle position Pos2, the receiver 1502, the internal data converter 1503 inside of the vehicle sensor unit 1501 as shown in FIG. 28 and the center-of-gravity point velocity command generator 601 and the addition calculator 602 inside of the vehicle target position and velocity calculator 1504 as shown in FIG. 29 are further provided in addition to the configuration of the vehicle 1 of the basic configuration described above or the variation of the vehicle 1.

Figure 30:
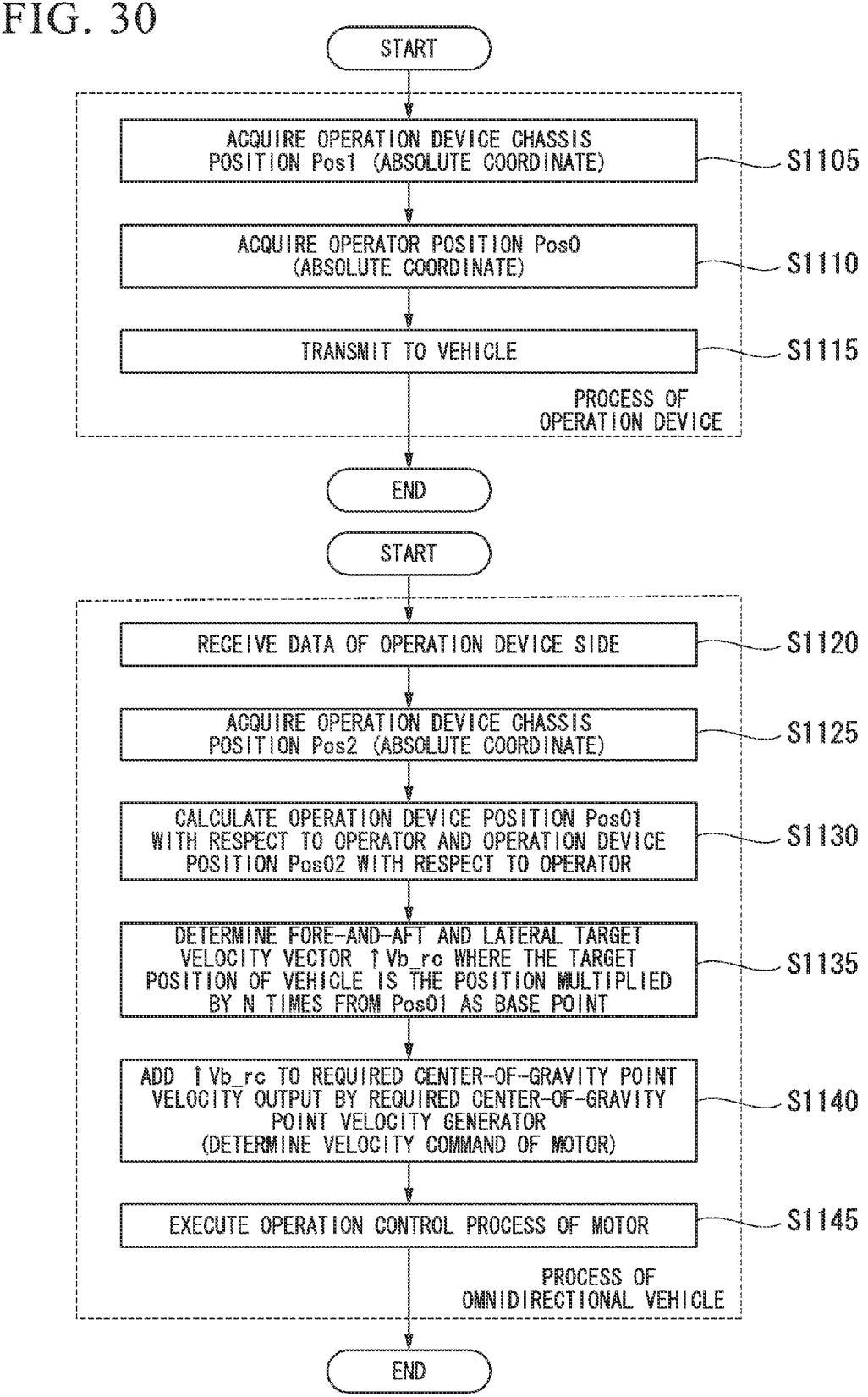
FIG. 30 is a flowchart showing a processing of the omnidirectional vehicle operation system according to the present embodiment.

FIG. 30 is a diagram showing a process flow of the omnidirectional vehicle operation system according to the present embodiment and shows the operation in step S9 of FIG. 7.

Firstly, in the remote control stop mode, the vehicle 1500 outputs the detection values of the tilting sensor 52 and the load sensor 54 in the vehicle sensor unit 1501, and the rotary encoders 56R, 56L as the angle sensor to the vehicle target position and velocity calculator 1504 and is operated similar to the vehicle 1 of the basic configuration described above or the variation thereof.

Here, when the operator inputs the remote control mode by using the mode switching button 1401 of the operation device 1400, the transmitter 1406 transmits the mode switching instruction with the remote control mode to the vehicle 1500 according to the instruction of the transmit data converter 1405. When the internal data converter 1503 of the vehicle 1500 receives the mode switching instruction via the receiver 1502, the vehicle target position and velocity calculator 1504 is capable of receiving the operation instruction from the operation device 1400.

Further, by the input of the remote control mode, the operation device sensor unit 1402 of the operation device 1400 detects the operation device position Pos1 which is the position of the chassis of the operation device 1400 in the absolute coordinate system and outputs to the coordinate system converter 1403 (step S1105). Further, the operation device sensor unit 1402 detects the operator position Pos0 which is the position of the operator 300 and outputs to the coordinate system converter 1403 (step S1110). Here, the operator position Pos0 in the absolute coordinate system is acquired from the GPS and/or the geomagnetism sensor mounted on the operator 300. Since the operator position Pos0 and the operation device position Pos1 are the positions in the absolute coordinate system, the coordinate system converter 1403 outputs to the transmit data converter 1405 without performing the coordinate conversion.

The transmit data converter 1405 sets the data, which is set to the operator position Pos0 and the operation device position Pos1 input from the coordinate system converter 1403, to the predetermined transmit data format.

The transmitter 1406 transmits the operator position Pos0 and the operation device position Pos1 where the format conversion has been performed by the transmit data converter 1405 to the vehicle 1500 (step S1115).

The receiver 1502 of the vehicle 1500 receives the data transmitted by the operation device 1400 in step S1115, and the internal data converter 1503 acquires the operator position Pos0 and the operation device position Pos1 from the data received by the receiver 1502 and outputs to the vehicle target position and velocity calculator 1504 (step S1120). The vehicle sensor unit 1501 detects the vehicle position Pos2 which is the position of the chassis of the vehicle 1500 in the absolute coordinate system and outputs to the vehicle target position and velocity calculator 1504 (step S 1125).

The center-of-gravity point velocity command generator 601 in the vehicle target position and velocity calculator 1504 calculates the operation device relative position Pos01 which is the position of the operation device 1400 with respect to the operator 300 from the operator position Pos0 the operation device position Pos1 and calculates the vehicle relative position Pos02 which is the position of the vehicle 1500 with respect to the operator 300 from the operator position Pos0 the vehicle position Pos2 (step S1130). For example, if the operator position Pos0 is represented as (X0, Y0), the operation device position Pos1 is represented as (X1, Y1) and the vehicle position Pos2 is represented as (X2, Y2), the operation device relative position Pos01 is represented as (X1−X0, Y1−Y0) and the vehicle relative position Pos02 is represented as (X2−X0, Y2−Y0). The center-of-gravity point velocity command generator 601 calculates the fore-and-aft and lateral target velocity vector ↑Vb_rc_a in the absolute coordinate system by the following equation 14.

$$\uparrow Vb\_rc\_a = c \cdot (Pos02 - n \cdot Pos01) \qquad \text{Equation 14}$$

Here, "c" is any coefficient. If c is a negative (−) value, in the equation 14, the target reaching position of the vehicle 1500 is set to the position where the operation device relative position Pos01 which is the position of the operation device 1400 with respect to the operator 300 and the position of the operator 300 is the base point is multiplied by n times, further, the vector leading to the target reaching position from the vehicle relative position Pos02 which is the position of the vehicle 1500 where the position of the operator 300 is the base point is multiplied by the predetermined coefficient c, thus the fore-and-aft and lateral target velocity vector ↑Vb_rc_a in the absolute coordinate system is determined The vehicle target position and velocity calculator 1504 of the vehicle 1500, as described in the vehicle 1 of the basic configuration, is envisioned in xyz coordinate system comprising the x axis, referring to the horizontal axis in the fore-and-aft direction, the y axis, referring to the horizontal axis in the lateral direction and the z axis, referring to the orthogonal axis. Further, "the fore-and-aft direction" and "the lateral direction" mean the directions which are equal to or approximately equal to the fore-and-aft direction and the lateral direction of the occupant's upper body boarding on the payload supporting part 3 with normal posture. This relative coordinate system is described as "the vehicle coordinate system".

Thus, the center-of-gravity point velocity command generator 601 converts the fore-and-aft and lateral target velocity vector ↑Vb_rc_a in the absolute coordinate system to the vector in the vehicle coordinate system and calculates the manipulated variable of the vehicle 1500, namely, the fore-and-aft and lateral target velocity vector ↑Vb_rc(the manipulated vector) which is the center-of-gravity point velocity command value (step S1135). Specifically, the center-of-gravity point velocity command generator 601 calculates the fore-and-aft and lateral target velocity vector ↑Vb_rc in the vehicle coordinate system by operating the rotation matrix to rotate by the angle of the difference between the direction of the vehicle 1500 in the absolute coordinate system detected in the vehicle sensor unit 1501 and the direction of the vehicle 1500 in the vehicle coordinate system used in the vehicle target position and velocity calculator 1504 with respect to the fore-and-aft and lateral target velocity vector ↑Vb_rc_a in the absolute coordinate system.

The addition calculator 602 in the vehicle target position and velocity calculator 1504 adds the fore-and-aft and lateral target velocity Vb_xy_rc which is the pair of the component of the x axis direction and the component of the y axis direction of the fore-and-aft and lateral target velocity vector ↑Vb_rc calculated in step S1135 to the required center-of-gravity point velocity Vb_xy_aim output from the required center-of-gravity point velocity generator 74 and outputs to the center-of-gravity point velocity restrictor 76 (step S1140). The center-of-gravity point velocity restrictor 76 executes the process performed in the vehicle 1 of the basic configuration or the variation of the vehicle 1 by using the required center-of-gravity point velocity Vb_xy_aim, to which the fore-and-aft and lateral target velocity Vb_xy_rc output from the addition calculator 602 is added, instead of by using the required center-of-gravity point velocity Vb_xy_aim.

The subsequent processes where the wheel velocity command calculator 1505 instructs to drive the wheel according to the target velocity calculated by the vehicle target position and velocity calculator 1504 and the wheel drive unit 1506 drives the wheel according to the direction from the wheel velocity command calculator 1505 are similar to the process in the vehicle 1 of the basic configuration or the variation of the vehicle 1 (step S1145).

In the above, the fore-and-aft and lateral target velocity vector ↑Vb_rc is calculated from the manipulated variable based on only the manipulated direction by the operation portion 1404, however, the tilting sensor may be provided in the operation device sensor unit 1402 of the operation device 1400 and the velocity may be controlled by further using the tilting of the operation device 1400 detected by the tilting sensor as the manipulated variable and by changing the magnitude of the fore-and-aft and lateral target velocity vector ↑Vb_rc. In this case, the transmitter 1406 of the operation device 1400 transmits the detection value of the tilting sensor in conjunction with the operator position Pos0 and the operation device position Pos1 to the vehicle 1500 and determines the coefficient c used in the equation 14 corresponding to the detection value in the vehicle target position and velocity calculator 1504 of the vehicle 1500. Alternatively, the transmitter 1406 of the operation device 1400 may transmit a coefficient c corresponding to the detection value.

Further, the input device such as the cross key and buttons is provided in the operation device 1400, the coefficients c, n used in the equation 14 may be variable corresponding to the input. In this case, the transmitter 1406 of the operation device 1400 transmits the input value by the input device to the vehicle 1500 and determines c, n corresponding to the input value in the vehicle target position and velocity calculator 1504 of the vehicle 1500. Alternatively, the transmitter 1406 of the operation device 1400 may transmit c, n corresponding to the input value.

In the above, the center-of-gravity point velocity command value is calculated in the vehicle 1500, however, it may be calculated in the operation device 1400. In this case, the center-of-gravity point velocity command generator 601 is provided in not the vehicle 1500 but the operation device 1400. Further, the vehicle 1500 transmits the vehicle position Pos2 in the absolute coordinate system and the angle of the difference between the direction of the vehicle 1500 in the vehicle coordinate system and the direction of the vehicle 1500 to the operation device 1400 by the radio or the wireline, calculates the fore-and-aft and lateral target velocity ↑Vb_rc in the center-of-gravity point velocity command generator 601 provided in the operation device 1400 similar in steps S1130 to S1135 and transmits to the vehicle 1500 as the center-of-gravity point velocity command value. The internal data converter 1503 of the vehicle 1500 acquires the center-of-gravity point velocity command value from the received data and outputs to the addition calculator 602 inside of the vehicle target position and velocity calculator 1504. The subsequent processes are similar to the above.

In the embodiment described above, the fore-and-aft and lateral target velocity Vb_xy_rc calculated by the center-of-gravity point velocity command generator 601 is added to the required center-of-gravity point velocity Vb_xy_aim output from the required center-of-gravity point velocity generator 74 and is output to the center-of-gravity point velocity restrictor 76, however, only the fore-and-aft and lateral target velocity vector ↑Vb_rc may be output to the center-of-gravity point velocity restrictor 76 without the addition of the required center-of-gravity point velocity Vb_xy_aim. The center-of-gravity point velocity restrictor 76 executes the process performed in the vehicle 1 of the basic configuration or the variation of the vehicle 1 by using the fore-and-aft and lateral target velocity vector ↑Vb_rc instead of by using the required center-of-gravity point velocity Vb_xy_aim. Thus, the omnidirectional vehicle can be controlled by only the operation of the operation device 1400.

In the embodiment described above, the operation device sensor unit 1402 of the operation device 1400 acquires the operator position Pos0 in the absolute coordinate system, however, when the operator position Pos0 is acquired in the relative coordinate system where the chassis of the operation device 1400 is the base point, it is converted to the operator position Pos0 in the absolute coordinate system by adding the acquired operator position Pos0 in the relative coordinate system to the operation device position Pos1 in the absolute coordinate system of the vehicle 1500.

Further, in the above, the operator position Pos0, the operation device position Pos1 and the vehicle position Pos2 in the absolute coordinate system are used, however, the position in the relative coordinate system may be used. If the relative coordinates among the operator position Pos0, the operation device position Pos 1 and the vehicle position Pos2 are different from each other, they are converted into the same relative coordinate system, and then the operation device relative position Pos01 and the vehicle relative position Pos02 are calculated. In this case, the center-of-gravity point velocity command generator 601 calculates the fore-and-aft and lateral target velocity vector ↑Vb_rc_a by using the position in the relative coordinate system, specifically, the fore-and-aft and lateral target velocity vector ↑Vb_rc(the manipulated vector) which is the center-of-gravity point velocity command value is calculated by rotating by the angle of the difference between the relative coordinate system at the time of detecting the position and the vehicle coordinate system.

For example, the sensor such as the ESPAR antenna that detects the position in the vehicle coordinate system is provided in the vehicle sensor unit 1501 of the vehicle 1500, the operator position Pos0 and the operation device position Pos1 in the vehicle coordinate system may be detected. In this case, the fore-and-aft and lateral target velocity vector ↑Vb_rc_a calculated by the equation 14 is equal to the fore-and-aft and lateral target velocity vector ↑Vb_rc which is the center-of-gravity point velocity command value.

According to the present embodiment, the target position of the omnidirectional vehicle can be determined from the relative relationship between the position of the operator and the position of the operation device and the moving direction and velocity of the omnidirectional vehicle can be determined to move from the position of the omnidirectional vehicle to this target position. Therefore, the operator can easily operate the omnidirectional vehicle by holding the operation device with a simplified operation of moving it to the left and the right or moving it to approach or move away from the operator's body without consideration of the direction of the omnidirectional vehicle. Further, since the target position of the omnidirectional vehicle is the position where the distance between the operator and the operation device from the operator as the base point is multiplied by the predetermined number of times, the instruction of the close position to the operator when the operation device is operated to approach the operator's body or the far position when the operation device is operated to move away from the operator's body in the direction to which the operator instructs the operation device can be performed, thus the operator can intuitively control the omnidirectional vehicle.

Explanation of an Omnidirectional Vehicle Operation System According to a Fourth Embodiment Of The Present Invention Next, an omnidirectional vehicle operation system according to a fourth embodiment of the present invention will be described.

Figure 31:
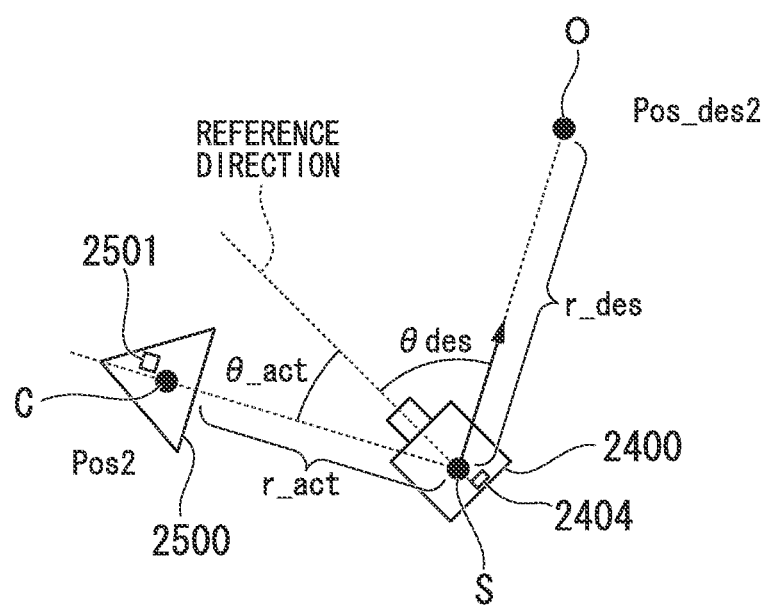
FIG. 31 is a top view of the omnidirectional vehicle operation system according to a fourth embodiment of the present invention.

FIG. 31 shows a top view of the omnidirectional vehicle operation system according to the fourth embodiment of the present invention. As shown in FIG. 31, the omnidirectional vehicle operation system of the present embodiment includes an operation device 2400 such as a remote controller and an omnidirectional vehicle 2500(hereinafter, "a vehicle 2500" describing). The vehicle 2500 is configured such that the configuration to be controlled by the operation device 2400 is provided in addition to the vehicle 1 of the basic configuration described above or the variation of the vehicle 1.

An operation portion 2404 such as the joystick and the cross key to instruct the moving direction to move the vehicle 2500 (in other words, the target position) is provided in the operation device 2400. A manipulated variable applied by the operator to this operation portion 2404 may be represented, for example, as the target position O that is represented in a coordinate system where the operation body reference position S showing the position of the operator is an origin. This target position O may be represented by converting a target coordinate Pos_des2[x, y] to a target coordinate Pos_des2 [r_des×sin(θ_des), r_des×cos(θ_des)] in the polar coordinate system where the operation body reference position S is the origin.

Incidentally, θ_des represents the azimuth angle where the coordinate axis showing the front direction of the chassis of the operation device 2400 is 0 degree (the reference direction). Further, r_des represents the distance from the operation body reference position S to the target position O.

Further, the operation body reference position S shows the reference position when the omnidirectional moving body 2500 is operated.

This operation body reference position S may be the position of the operator who operates the operation portion 2404 of the operation device 2400 or may be the position of the operation device 2400. Further, an operation body is a concept that includes both of the operation device 2400 and the operator.

A vehicle sensor unit 2501 that detects the coordinate in the operation device chassis coordinate system is provided in the vehicle 2500. For example, the ESPAR antenna, ultrasonic waves, laser (light) such as the infrared light sensor, the image process and the GPS (Global Positioning System) may be used as this vehicle sensor unit 2501. This vehicle sensor unit 2501 detects the position of the vehicle 2500 with respect to the operation device 2400, in other words, the relative position relationship of the vehicle 2500 with respect to the operation body reference position S as the vehicle position C.

This vehicle position C can be represented by converting the vehicle coordinate Pos2[x, y] to the vehicle coordinate Pos2[r_act×sin(θ_act), r_act×cos(θ_act)] showing the position where the vehicle 2500 is present in the polar coordinate system where the operation body reference position S is the origin.

θ_act represents the azimuth angle where the coordinate axis showing the front direction of the chassis of the operation device 2400 is 0 degree (the reference direction). "y=r_act" in the vehicle coordinate represents the distance r_act from the operation body reference position S to the vehicle position C. This reference direction is determined in the operation device 2400 in advance.

In this way, the manipulated variable is represented as the target coordinate Pos_des2 in the same polar coordinate system where the operation body reference position S is the origin with respect to the vehicle coordinate Pos2(θ_act, r_act) showing the relative position relationship between the operation body reference position S detected by the vehicle sensor 2501 and the vehicle 2500.

Next, an example of the operation portion 2404 will be described referring to FIG. 32.

Figure 32A:
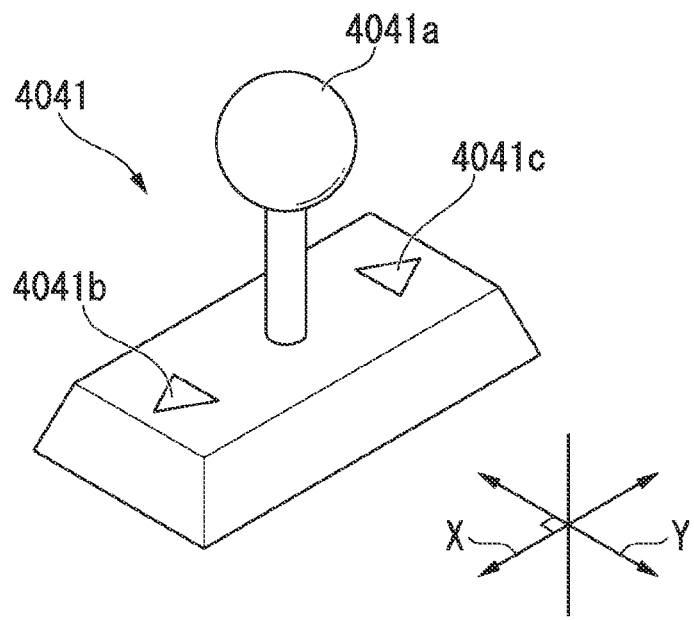
FIG. 32A is a diagram showing an example of an operation portion according to the present embodiment.
Figure 32B:
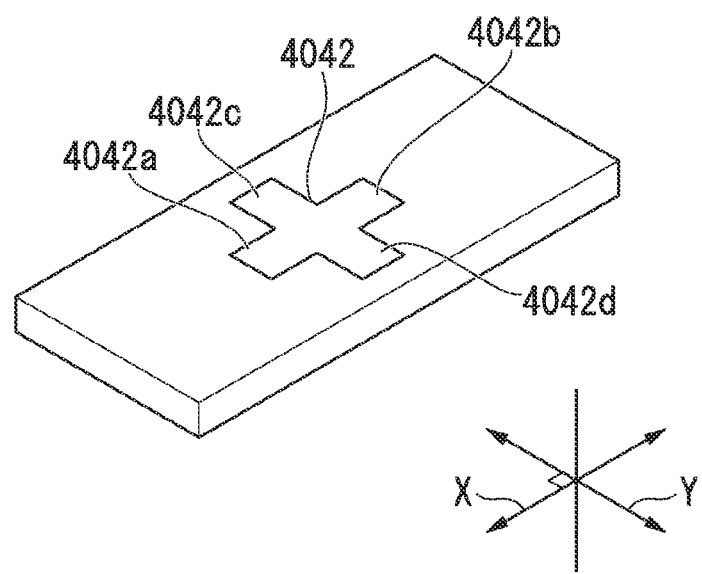
FIG. 32B is a diagram showing an example of an operation portion according to the present embodiment.

The operation portion 2404 may include, for example, a joystick 4041 as shown in FIG. 32A and/or a cross key 4042 as shown in FIG. 32B.

As shown in FIG. 32A, a joystick 4041 is the operation portion that inputs the manipulated variable applied by the operator and includes a lever portion 4041a, a far button 4041b and a near button 4041c. This lever portion 4041a can be operated to the 360 degrees radius. When the operator controls this lever portion 4041a, the azimuth angle θ_des showing the direction of the target position O with respect to the operation body reference position S can be specified as the manipulated variable. Further, when the operator pushes down the far button 4041b, the distance r_des of the target position O with respect to the operation body reference position S can be specified as the manipulated variable.

In x-y surface as illustrated, the direction to which the lever portion 4041a of the joystick 4041 is tilted shows the azimuth angle θ_des showing the direction of the target position O with respect to the operation body reference position S.

Further, the cross key 4042 may be provided in the operation portion 2404 as shown in FIG. 32B.

As shown in FIG. 32B, the cross key 4042 includes a front direction button 4042a, a back direction button 4042b, a right direction button 4042c and a left direction button 4042d. The operator pushes down these buttons 4042a to 4042d, thus the manipulated variable representing the target position O in the operation device chassis coordinate system is detected.

For example, when the operator pushes down the right direction button 4042c, the azimuth angle θ_des in the plus (+) direction of the target position O with respect to the operation body reference position S may be specified as the manipulated variable and when the operator pushes down the left direction button 4042d, the azimuth angle θ_des in the minus (−) direction of the target position O with respect to the operation body reference position S may be specified as the manipulated variable. Further, when the operator pushes down the front direction button 4042a, the increase of the distance r_des from the operation body reference position S to the target position O may be specified as the manipulated variable and when the operator pushes down the back direction button 4042b, the decrease of the distance r_des from the operation body reference position S to the target position O may be specified as the manipulated variable.

In x-y surface as illustrated, when the right direction button 4042c is pushed down at a single time, the azimuth angle θ_des showing the direction of the target position O with respect to the operation body reference position S is the right side direction than the reference direction by a predetermined angle (for example, 5 degrees). In x-y surface as illustrated, when the left direction button 4042d is pushed down at a single time, the azimuth angle θ_des showing the direction of the target position O with respect to the operation body reference position S is the left side direction than the reference direction by a predetermined angle (for example, 5 degrees).

Figure 33:
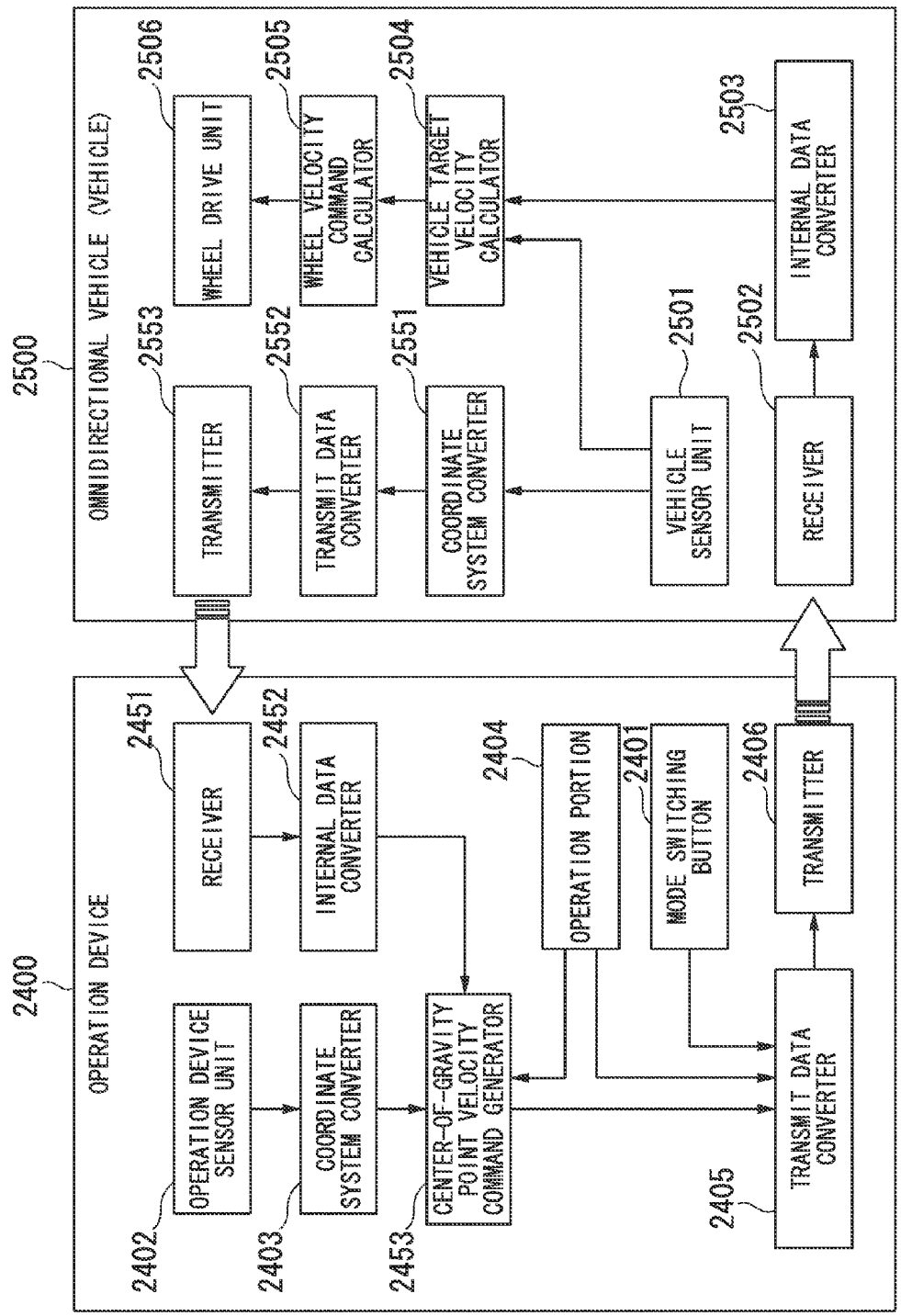
FIG. 33 is a block diagram showing a configuration of the omnidirectional vehicle operation system according to the present embodiment.

FIG. 33 is a block diagram showing a configuration of the omnidirectional vehicle operation system according to the present embodiment. Hereinafter, the vehicle 2500, the additional configuration which is the difference from the vehicle 1 of the basic configuration described above or the variation of the vehicle 1 will be mainly described.

As shown in FIG. 33, an operation device 2400 is configured to include a mode switching button 2401, an operation device sensor unit 2402, a coordinate system converter 2403, an operation portion 2404, a transmit data converter 2405, a transmitter 2406, a receiver 2451, an internal data converter 2452 and a center-of-gravity point velocity command generator 2453.

The mode switching button 2401 inputs one of the remote control mode and the remote control stop mode as modes to be instructed to the vehicle 2500.

The operation device sensor unit 2402 detects the vehicle position C which is the presence direction of the vehicle 2500 viewed from the operation device 2400, that is, the relative position of the vehicle 2500 with respect to the operation body reference position S. Any sensor may be used in the operation device sensor unit 2402, for example, the ESPAR antenna, the ultrasonic waves, the laser (light) such as the infrared light sensor, the image process, the GPS, or the like may be used.

The coordinate system converter 2403 converts the coordinate system where the operation device sensor unit 2402 uses into the polar coordinate system and outputs information showing the vehicle coordinate Pos2 in the polar coordinate system as the vehicle position C.

The receiver 2451 receives the data transmitted from the vehicle 2500 by the radio or the wireline.

The internal data converter 2452 converts the received data received by the receiver 2451 from the vehicle 2500 into the data format which can be processed in the operation device 2400.

The center-of-gravity point velocity command generator 2453 calculates the fore-and-aft and lateral target velocity vector ↑Vb_rc which is the center-of-gravity point velocity command value by the same method as in the center-of-gravity point velocity command generator 601 of the vehicle 2500 in the fourth embodiment. When the mode where the fore-and-aft and lateral target velocity vector ↑Vb_rc is calculated in the operation device 2400 is set, this center-of-gravity point velocity command generator 2453 calculates the fore-and-aft and lateral target velocity vector ↑Vb_rc based on the vehicle position C output from the operation device sensor unit 2402, the received data output from the internal data converter 2452 and the manipulated variable output from the operation portion 2404 and outputs to the transmit data converter 2405.

The operation portion 2404 outputs the manipulated variable corresponding to the operation input by the operator with the joystick 4041, the Four-way controller Key buttons 4042, or the like as described above. This operation portion 2404 converts the manipulated variable corresponding to the input operation into the target coordinate Pos_des2 in the polar coordinate system and outputs to the transmit data converter 2405.

The transmit data converter 2405 convert the target coordinate Pos_des2 input from the operation portion 2404 into the data format where the vehicle 2500 can receive and outputs to the transmitter 2406. Further, the transmit data converter 2405 converts the fore-and-aft and lateral target velocity vector ↑Vb_rc input from the center-of-gravity point velocity command generator 2453 into the data format where the vehicle 2500 can receive and outputs to the transmitter 2406.

The transmitter 2406 transmits the data converted by the transmit data converter 2405 for the data format to the vehicle 2500 via the radio or the wireline.

The vehicle 2500 is configured to include the vehicle sensor unit 2501, a receiver 2502, an internal data converter 2503, a vehicle target velocity calculator 2504, a wheel velocity command calculator 2505, a wheel drive unit 2506, a coordinate system converter 2551, a transmit data converter 2552 and a transmitter 2553.

The vehicle sensor unit 2501 is a sensor that detects the states of the vehicle 2500 which are the posture, the wheel velocity, the direction, the position, or the like of the vehicle 2500 and is configured such that a sensor that detects the vehicle position C of the vehicle 2500 with respect to the operation device 2400 is provided in addition to the sensors provided in the vehicle 1 of the basic configuration (the tilting sensor 52, the load sensor 54, the rotary encoders 56R, 56L as the angle sensor).

The receiver 2502 receives the data transmitted from the transmitter 2406 of the operation device 2400 by the radio or the wireline.

The internal data converter 2503 converts the received data received by the receiver 2502 from the operation device 2400 into the data format which can be processed in the vehicle 2500.

The vehicle target velocity calculator 2504 converts the vehicle position C input from the vehicle sensor unit 2501 into the vehicle coordinate Pos2 in the polar coordinate system. This vehicle target velocity calculator 2504 calculates the moving direction and the moving velocity toward the target position Pos_des2 to progress the vehicle 2500 based on the difference between this vehicle coordinate Pos2 and the target coordinate Pos_des2 received from the operation device 2400. For example, this vehicle target velocity calculator 2504 calculates by the following equation 15 the fore-and-aft and lateral target velocity vector ↑Vb_rc(the target velocity vector) which is the center-of-gravity point velocity command value based on the target coordinate Pos_des2.

$$\uparrow Vb\_rc = c \cdot (Pos2 - Pos\_des2) \qquad \text{Equation 15}$$

Here, "·" represents the inner product, Pos2 represents the vehicle position C in the polar coordinate system and Pos_des2 represents the target position O in the polar coordinate system. Further, c is any coefficient. According to the equation 15, the fore-and-aft and lateral target velocity vector ↑Vb_rc is determined by subtracting the coordinate in the same polar coordinate system from the moving direction from the vehicle position C toward the target position O.

Further, the vehicle target velocity calculator 2504 may calculate the fore-and-aft and lateral target velocity vector ↑Vb_rc(the target velocity vector) which is the center-of-gravity point velocity command value based on the target coordinate Pos_des2 by the following equation 16.

$$\uparrow Vb\_rc = c \cdot (Pos2 - Pos\_des2) \qquad \text{Equation 16}$$

Here, $Pos\_des2 = \text{sign}(\theta\_des) \cdot r\_des \cdot f(\text{step})$

"sign" shows a sign (plus (+) or minus (−)) of the angular velocity, θ_des shows the azimuth angle showing the direction of the target position Pos_des2 from the operation body reference position S as the origin, r_des shows the distance from the operation body reference position S to the target position Pos_des2 and f(step) shows a function generate a circular orbit from when starting to the operation.

For example, when the joystick 4041 is used as the operation portion 2404, the direction to which the lever portion 4041a is tilted is θ_des and the distance specified by the far button 4041b or the near button 4041c is r_des.

Further, when the cross key 4042 is used as the operation portion 2404, the distance specified by the front direction button 4042a or the back direction button 4042b is r_des. Further, when the right direction button 4042c is pushed down, the angular velocity corresponding to the number of the pushed is a sign with the value of the positive (+). Meanwhile, when the left direction button 4042D is pushed down, the angular velocity corresponding to the number of the pushed is a sign with the value of the positive (−).

The wheel velocity command calculator 2505 calculate the command value to the wheel drive unit 2506 to be the moving direction and the moving velocity toward the target position Pos_des2 calculated by the vehicle target velocity calculator 2504.

The wheel drive unit 2506 drives the wheel (the drive unit 5) according to the command value calculated by the wheel velocity command calculator 2505.

When the coordinate system used in the vehicle sensor unit 2501 is different from the operation device chassis coordinate system, the coordinate system converter 2551 converts the vehicle position C detected by the vehicle sensor unit 2501 into the operation device chassis coordinate system. When the vehicle sensor unit 2501 uses the operation device chassis coordinate system, it is not necessary to perform the conversion.

The transmit data converter 2552 converts the transmit data into the data format which can be received in the operation device 2400.

The transmitter 2553 transmits the data converted by the transmit data converter 2552 in the data format to the operation device 2400 by the radio or the wireline.

Figure 34:
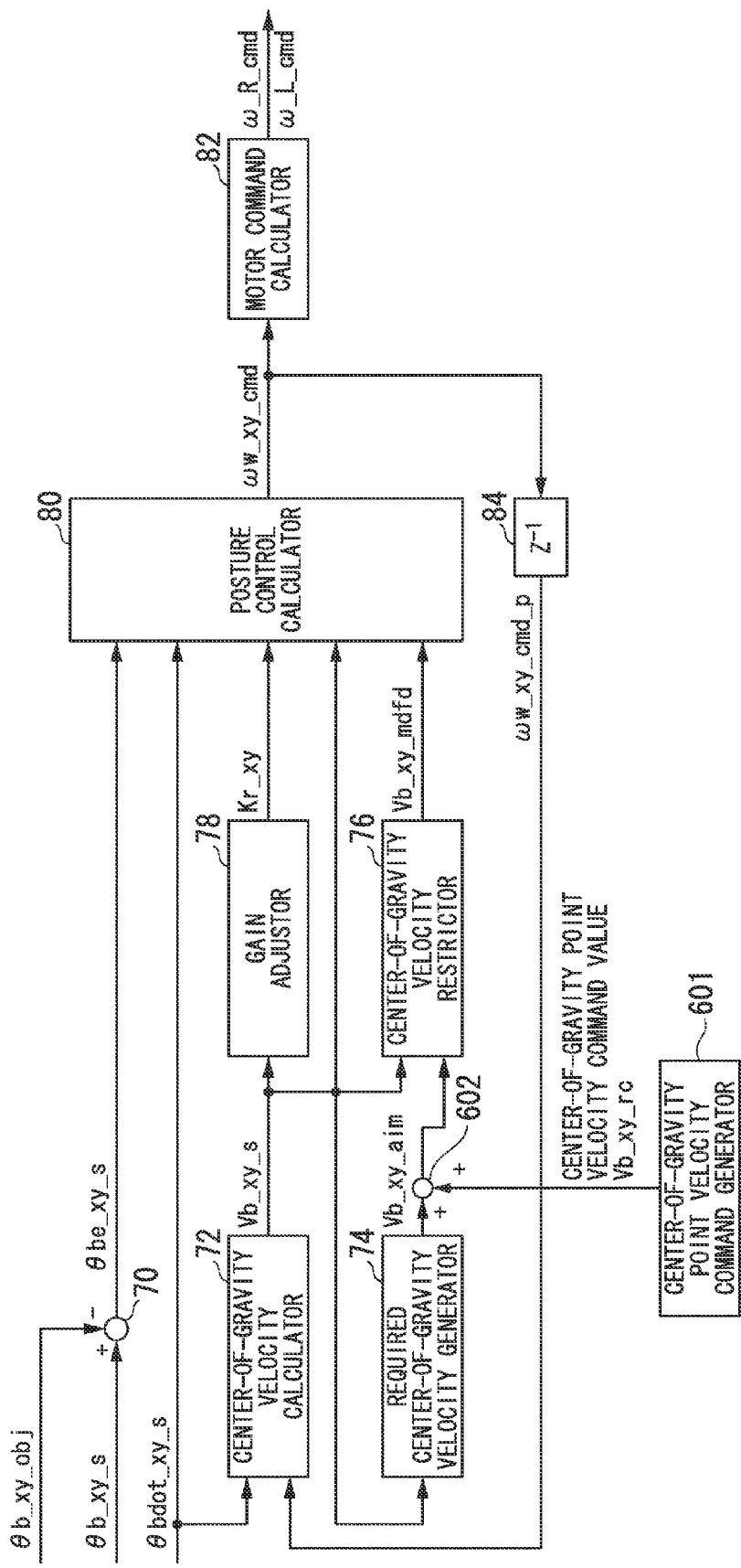
FIG. 34 is a block diagram showing a detailed configuration of the vehicle target velocity calculator according to the present embodiment.

FIG. 34 is a diagram showing the feature in detail provided in the vehicle target velocity calculator 2504 as shown in FIG. 33.

In FIG. 34, the same feature as the feature provided in the control unit 50 of the vehicle 1 of the basic configuration as shown in FIG. 9 is denoted by the same reference number and the description in detail will be arbitrarily omitted. The different feature of the vehicle target velocity calculator 2504 as shown in FIG. 34 from the feature provided in the control unit 50 of the vehicle 1 as shown in FIG. 9 is the feature that the center-of-gravity point velocity command generator 601 and the addition calculator 602 are further provided.

The center-of-gravity point velocity command generator 601 determines the center-of-gravity point velocity command value in the vehicle coordinate system based on the difference between the target coordinate Pos_des2 received from the operation device 2400 and the vehicle coordinate Pos2(θ_act, r_act) detected in the vehicle sensor unit 2501. The addition calculator 602 adds the required center-of-gravity point velocity output from the required center-of-gravity point velocity generator 74 and the center-of-gravity point velocity command value generated by the center-of-gravity point velocity command generator 601 and outputs to the center-of-gravity point velocity restrictor 76.

The wheel velocity command calculator 2505 as shown in FIG. 33 corresponds to the motor command calculator 82 as shown in FIG. 9, FIG. 34 and the wheel drive unit 2506 as shown in FIG. 33 corresponds to the actuator 7 of the vehicle 1. That is, the vehicle 2500 is configured such that the sensor that detects the operation device presence direction inside of the vehicle sensor unit 2501 as shown in FIG. 33, the receiver 2502, the internal data converter 2503 and the center-of-gravity point velocity command generator 601 and the addition calculator 602 inside of the vehicle target velocity calculator 2504 are provided in addition to the vehicle 1 of the basic configuration described above or the variation of the vehicle 1.

Figure 35:
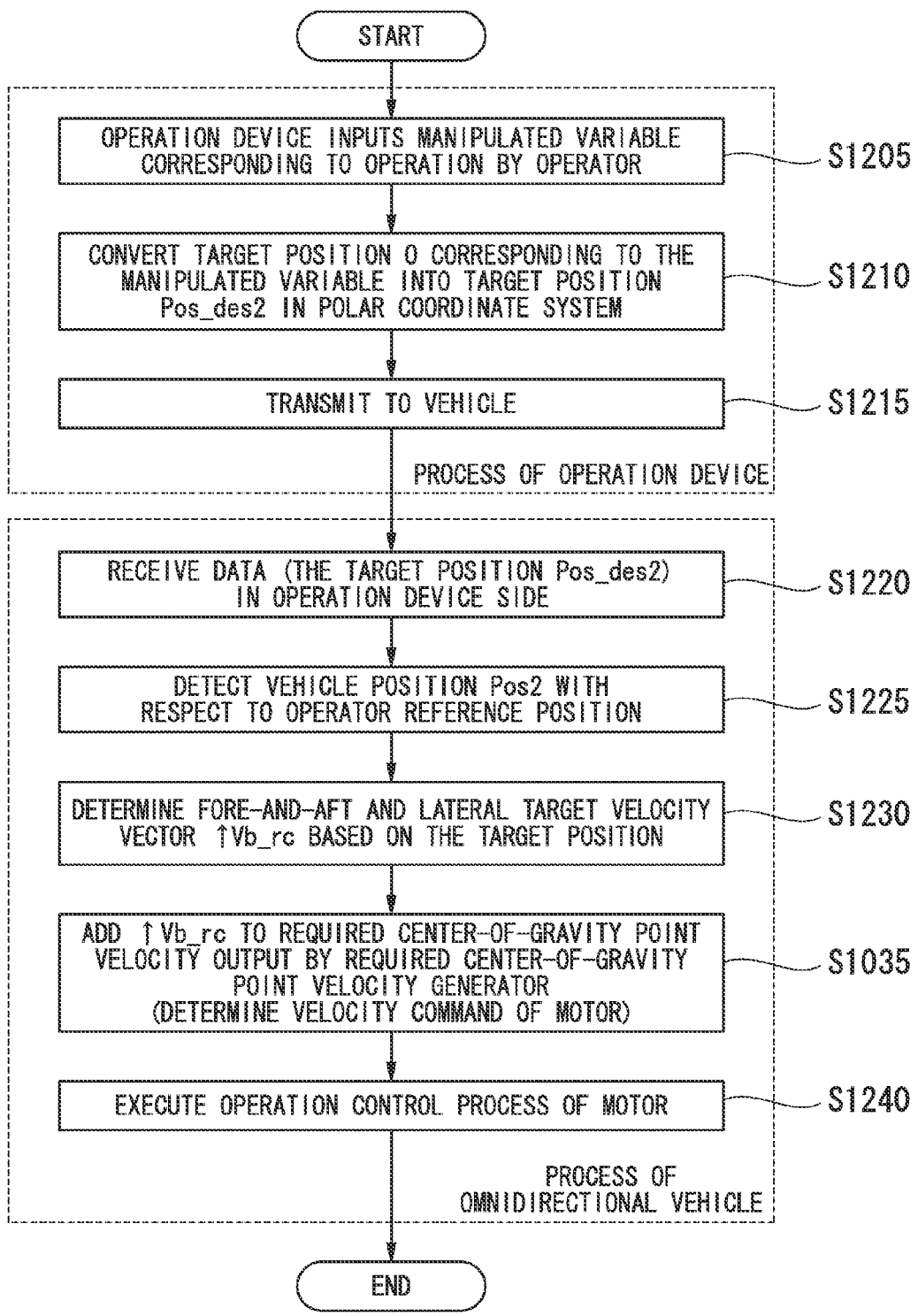
FIG. 35 is a flowchart showing a processing of the omnidirectional vehicle operation system according to the present embodiment.

FIG. 35 is a diagram showing a process flow of the omnidirectional vehicle operation system according to the present embodiment and shows the operation in step S9 of FIG. 7.

Firstly, in the remote control stop mode, the vehicle 2500 outputs the detection value of the tilting sensor 52 of the vehicle sensor unit 2501, the load sensor 54 and the rotary encoders 56R, 56L as the angle sensor to the vehicle target velocity calculator 2504 and is operated similar in the vehicle 1 or the variation of the basic configuration described above.

Here, when the operator input the remote control mode by using the mode switching button 2401 of the operation device 2400, the transmitter 2406 transmits the mode switching instruction signal with the remote control mode to the vehicle 2500 according to the instruction of the transmit data converter 2405. When the internal data converter 2503 of the vehicle 2500 receives the mode switching instruction signal via the receiver 2502, the vehicle target velocity calculator 2504 is capable of receiving the operation instruction signal from the operation device 2400.

Further, the operator applies the operation corresponding to the manipulated variable by the operation portion 2404. Thus, for example, the manipulated variable, which shows the direction where the lever portion 4041a of the joystick 4041 as the operation portion 2404 is tilted and the distance specified by the far button 4041b or the near button 4041c, is applied to the operation portion 2404 (step S1205).

The operation portion 2404 converts the target position O corresponding to the manipulated variable to the target coordinate Pos_des2 in the polar coordinate system and outputs to the transmit data converter 2405 (step S1210).

This transmit data converter 2405 converts the data format of the target coordinate Pos_des2 input from the operation portion 2404 and transmits to the vehicle 2500 (step S1215).

The receiver 2502 of the vehicle 2500 receives the target coordinate Pos_des2 from the operation device 2400 (step S1220).

Further, the vehicle sensor unit 2501 detects the position (the vehicle position C) of the vehicle 2500 with respect to the operation body reference position S and converts this vehicle position C into the vehicle coordinate Pos2 in the polar coordinate system (step S1225).

The center-of-gravity point velocity command generator 601 of the vehicle target velocity calculator 2504 calculates the fore-and-aft and lateral target velocity vector ↑Vb_rc(the target velocity vector) which is the center-of-gravity point velocity command value based on the target coordinate Pos_des2 by the above equation 15 (step S 1230). Thus, the direction of the target position O instructed by the operation portion 2404 of the operation device 2400 and the direction of the fore-and-aft and lateral target velocity vector ↑Vb_rc are the same direction in the absolute coordinate system.

The addition calculator 602 of the vehicle target velocity calculator 2504 adds the fore-and-aft and lateral target velocity Vb_xy_rc which is a pair of a component of the x axis direction and a component of the y axis direction in the fore-and-aft and lateral target velocity vector ↑Vb_rc calculated in step S1230 to the required center-of-gravity point velocity Vb_xy_aim output from the required center-of-gravity point velocity generator 74 and outputs to the center-of-gravity point velocity restrictor 76 (step S1235). The center-of-gravity point velocity restrictor 76 executes the process performed in the vehicle 1 of the basic configuration or the variation of the vehicle 1 by using the required center-of-gravity point velocity Vb_xy_aim, where the fore-and-aft and lateral target velocity Vb_xy_rc output from the addition calculator 602 is added, instead of by using the required center-of-gravity point velocity Vb_xy_aim.

The subsequent processes where the wheel velocity command calculator 2505 instructs to drive the wheel according to the target velocity calculated by the vehicle target velocity calculator 2504 and the wheel drive unit 2506 drives the wheel according to the instruction from the wheel velocity command calculator 2505 is similar in the vehicle 1 of the basic configuration or the variation of the vehicle 1 (step S1240).

In the above, the fore-and-aft and lateral target velocity vector ↑Vb_rc is calculated from the manipulated variable based on only the manipulated direction by the operation portion 2404, however, the velocity may be controlled by further using the velocity instruction input by the operation portion 2404 as the manipulated variable and by changing the magnitude of the fore-and-aft and lateral target velocity vector ↑Vb_rc.

This velocity instruction is output from the operation portion 2404 in step S1210. For example, if the operation portion 2404 is the joystick 4041, the tilt angle of the lever portion 4041a of the joystick 4041 is the velocity indication. Alternatively, the velocity instruction buttons such as the slow speed and the high speed may be included in the operation portion 2404. Further, in step S1230, the center-of-gravity point velocity command generator 601 of the vehicle 2500 calculates by the following equation 17 the fore-and-aft and lateral target velocity vector ↑Vb_rc which is the center-of-gravity point velocity command value by the operation device 2400 by using the velocity control coefficient t determined corresponding to the velocity instruction such as the slow speed and the high speed input by the tilt angle or the velocity instruction button.

$$\uparrow Vb\_rc = c \cdot (Pos2 - Pos\_des2) \cdot t \qquad \text{Equation 17}$$

The velocity control coefficient t increases with increasing the instruction of the high speed. For example, when the joystick 4041 is used, the value of the velocity control coefficient t continuously or in stages increases with increasing the tilt angle thereof; however, the upper limit of the velocity control coefficient t may be provided.

In the transmit data converter 2405 of the operation device 2400, the velocity instruction input from the operation portion 2404 is converted to the velocity control coefficient t, then this velocity control coefficient t may be transmitted to the vehicle 2500 in conjunction with the target coordinate Pos_des2, or, the velocity instruction may be transmitted from the operation device 2400 to the vehicle 2500 in conjunction with the target position Pos_des2, then the operation instruction may be converted to the velocity control coefficient t in the center-of-gravity point velocity command generator 601 of the vehicle 2500.

As described above, according to the present invention, the vehicle position C and the target position O are represented by using the same polar coordinate system where the operation body reference position S is the origin, the difference between the coordinate Pos2 of the vehicle position C and the coordinate Pos_des2 of the target position O is calculated, thus the moving direction of the vehicle 2500 which is present in the vehicle position C can be easily calculated.

Thus, the vehicle 2500 can be moved corresponding to the moving direction viewed from the operation body reference position S. Therefore, even if the vehicle 2500 faces any directions, the direction to move the vehicle 2500 may be constantly instructed viewed from the operator, thus the vehicle 2500 can be controlled by a simplified operation. That is, the operator can more sensuously specify the moving direction of the vehicle 2500.

Further, since the vehicle 2500 calculates in the polar coordinate system the moving direction to the target position O in the polar coordinate system, the vehicle 2500 can move to rotate about the operation body reference position S. Thus, the vehicle 2500 can be moved to rotate about the operator viewed from the operator.

Further, even if the omnidirectional vehicle 2500 rotates and the direction with respect to the operator changes, the relative relationship between the direction of the omnidirectional vehicle and the direction of the operation device is acquired from the presence direction or the presence position of one of the omnidirectional vehicle 2500 and the operation device 2400 acquired by the other, and the target position by the operation device 2400 is converted into the same polar coordinate system according to this acquired relative relationship, thus the moving direction and velocity of the omnidirectional vehicle 2500 can be determined Therefore, it is not necessary for the operator to perform the operation considered for the direction of the omnidirectional vehicle 2500, thus the operator can easily operate the omnidirectional vehicle 2500 with reflecting their intention by the operation device 2400.

In the above embodiments, the vehicle 1 configured as shown in FIG. 1 and FIG. 2 has been exemplified as the basic configuration and the variation of the vehicle 500, but it is not limited to the vehicle exemplified the basic configuration and the variation.

Specifically, the wheel assembly 5 as the drive unit of the vehicle 1 has an integral construction, but, may have the configuration disclosed in FIG. 10 of PCT International Publication No. WO 08/132779. In other words, the wheel assembly may be configured such that a plurality of rollers is rotatably inserted into a annular shaft body having the rigidity so that the shaft center thereof faces the tangential direction of the shaft body and the plurality of the roller is arranged along the shaft body in the peripheral direction.

Furthermore, the drive unit may be configured with crawler-shaped, for example, disclosed in FIG. 3 of PCT International Publication No. WO 08/132778.

Alternatively, for example, as disclosed in FIG. 5 of PCT International Publication No. WO 08/132778, FIG. 7 of PCT International Publication No. WO 08/132779 or FIG. 1 of Japanese Patent No. 3070015, the drive unit is configured with a sphere and the vehicle may be configured such that this sphere is driven to rotate by the actuator (for example, the actuator having the wheel assembly 5) in the direction around the x axis and the direction around the y axis.

Further, in the present basic configuration and the variation, the vehicle 1 where the seat 3 is provided as the payload supporting part of the occupant has been exemplified, however, for example, as seen in FIG. 8 of PCT International Publication No. WO 08/132779, the vehicle may be configured to assemble the step where the occupant's both feet rests and the part where the occupant standing on the step holds to the base body thereof.

As seen in PCT International Publication No. WO 08/132779, PCT International Publication No. WO 08/132778, Japanese Patent No. 3070015, or the like, it is possible to apply to the omnidirectional vehicle configured in the variations.

Furthermore, multiple drive units (for example, two drive units in the lateral direction, two drive units in the fore-and-aft direction, or three or more drive units) which are movable on the floor surface in the omnidirection may be provided in the vehicle 500 in the embodiments of the present invention. In this case, for example, if three or more drive units are provided so that the base body does not tilt, the control of the tilt angle of the base body may be omitted.

What is claimed is:

1. An omnidirectional moving body operation system comprising:
an omnidirectional moving body; and
an operation device that communicates with the omnidirectional moving body and operates the omnidirectional moving body,
wherein:
the operation device includes
a manipulated variable generator that generates a manipulated variable which is a manipulated vector related to a movement of a base body provided in the omnidirectional moving body, and
a manipulated variable transmitter that transmits the manipulated variable generated by the manipulated variable generator;
the omnidirectional moving body includes
the base body,
a drive portion that is connected to the base body and is capable of omnidirectionally driving the base body on a driving surface,
a manipulated variable receiver that receives the manipulated variable transmitted by the manipulated variable transmitter, and
a drive control unit that controls the drive portion by using the manipulated variable received by the manipulated variable receiver;
the omnidirectional moving body operation system further comprises
a detector that detects the relative relationship between a direction of the omnidirectional moving body and a direction of the operation device, and
a manipulated variable converter that converts the manipulated variable from a coordinate system used in the operation device to a coordinate system used in the omnidirectional moving body based on the relative relationship between the direction of the omnidirectional moving body detected by the detector and the direction of the operation device.

2. The omnidirectional moving body operation system according to claim 1, wherein:
the drive control unit has a target moving velocity vector generator that generates a target moving velocity vector of the omnidirectional moving body from the manipulated variable converted by the manipulated variable converter; and
the target moving velocity vector generator generates the target moving velocity vector so as to be the same direction as the direction of the manipulated vector generated by the manipulated variable generator in an absolute coordinate system.

3. The omnidirectional moving body operation system according to claim 1, wherein:
the omnidirectional moving body further includes a sensor unit that detects a tilting movement of the base body; and
the drive control unit calculates the manipulated variable of the base body based on the detection result of the sensor unit, adds the calculated manipulated variable and the manipulated variable converted by the manipulated variable converter, and controls the drive portion by using the addition resultant manipulated variable.

4. An omnidirectional moving body operation method used for an omnidirectional moving body operation system that comprises an omnidirectional moving body, and an operation device that communicates with the omnidirectional moving body operates the omnidirectional moving body, the omnidirectional moving body including a base body, and a drive portion that is connected to the base body and is capable of omnidirectionally driving the base body on a driving surface,
the method comprising:
generating a manipulated variable which is a manipulated vector related to the movement of the base body provided in the omnidirectional moving body;
communicating the generated manipulated variable;
controlling the drive portion by using the communicated manipulated variable;
detecting the relative relationship between the direction of the omnidirectional moving body and the direction of the operation device; and
converting the manipulated variable from a coordinate system used in the operation device to a coordinate system used in the omnidirectional moving body based on the relative relationship between the detected direction of the omnidirectional moving body and the detected direction of the operation device.

5. An omnidirectional moving body operation system comprising:
an omnidirectional moving body;
an operation device with which an operator controls the omnidirectional moving body;
a detector that detects the relative relationship among the position of the omnidirectional moving body, the position of the operator and the position of the operation device;
a manipulated variable generator that generates a manipulated variable which is 25 a manipulated vector related to a movement of a base body provided in the omnidirectional moving body based on the relative relationship among the position of the omnidirectional moving body, the position of the operator and the position of the operation device detected by the detector,
wherein
the omnidirectional moving body includes:
the base body;
a drive portion that is connected to the base body and is capable of omnidirectionally driving the base body on a driving surface; and
a drive control unit controls the drive portion by using the manipulated variable generated by the manipulated variable generator.

6. The omnidirectional moving body operation system according to claim 5, wherein
the manipulated variable generator generates the manipulated variable so that distance between the operator and the omnidirectional moving body increases with increasing the distance between the operator and the operation device.

7. The omnidirectional moving body operation system according to claim 6, wherein:
the omnidirectional moving body further includes a sensor unit that detects a tilting movement of the base body; and
the drive control unit calculates the manipulated variable of the base body based on the detection result of the sensor unit, adds the calculated manipulated variable and the manipulated variable generated by the manipulated variable generator, and controls the drive portion by using the addition resultant manipulated variable.

8. The omnidirectional moving body operation system according to claim 5,
wherein:
the omnidirectional moving body further includes a sensor unit that detects a tilting movement of the base body; and the drive control unit calculates the manipulated variable of the base body based on the detection result of the sensor unit, adds the calculated manipulated variable and the manipulated variable generated by the manipulated variable generator, and controls the drive portion by using the addition resultant manipulated variable.

9. An omnidirectional moving body operation method used for an omnidirectional moving body operation system that comprises an omnidirectional moving body; and an operation device with which an operator controls the omnidirectional moving body, the omnidirectional moving body including a base body, and a drive portion that is connected to the base body and is capable of omnidirectionally driving the base body on a driving surface, the method comprising:
detecting the relative relationship among the position of the omnidirectional moving body, the position of the operator and the position of the operation device;
generating a manipulated variable which is a manipulated vector related to the movement of the base body based on the relative relationship among the position of the detected omnidirectional moving body, the position of the operator and the position of the operation device; and
controlling the drive portion by using the generated manipulated variable.

10. An omnidirectional moving body operation system comprising an omnidirectional moving body, and an operation device that communicates with the omnidirectional moving body and operates the omnidirectional moving body,
wherein:
the operation device includes
a manipulated variable generator that outputs a manipulated variable related to a movement of a base body provided in the omnidirectional moving body, and
a manipulated variable transmitter that transmits the manipulated variable output by the manipulated variable generator;
the omnidirectional moving body includes
the base body,
a drive portion that is connected to the base body and is capable of omnidirectionally driving the base body on a driving surface,
a manipulated variable receiver that receives the manipulated variable transmitted by the manipulated variable transmitter, and
a drive control unit that controls the drive portion by using the manipulated variable received by the manipulated variable receiver;
the omnidirectional moving body operation system further comprises a detector that detects a relative position relationship between an operation body reference position, which indicates a reference position for operating the omnidirectional moving body, and the omnidirectional moving body; and
the manipulated variable indicates a movement to a target position, which is represented in a coordinate system where an origin thereof is the operation body reference position, with respect to the relative position relationship detected by the detector.

11. The omnidirectional moving body operation system according to claim 10,
wherein
the manipulated variable represents the movement to the target position in a polar coordinate system.

12. The omnidirectional moving body operation system according to claim 11,
wherein
the detector detects a presence position of the omnidirectional moving body as the relative position relationship in the polar coordinate system where the origin thereof is the operation body reference position.

13. An omnidirectional moving body operation system comprising an omnidirectional moving body, and an operation device that communicates with the omnidirectional moving body and operates the omnidirectional moving body,
wherein:
the operation device includes
a manipulated variable generator that outputs a first manipulated variable for operating the distance between an operation body reference position, which represents a reference position for operating the omnidirectional moving body, and the omnidirectional moving body and a second manipulated variable for operating the direction of the omnidirectional moving body viewed from the operation body reference position as the manipulated variable related to the movement of the base body provided in the omnidirectional moving body, and
a manipulated variable transmitter that transmits the first manipulated variable and the second manipulated variable output by the manipulated variable generator; and
the omnidirectional moving body includes
a base body,
a drive portion that is connected to the base body and is capable of omnidirectionally driving the base body on a driving surface,
a manipulated variable receiver that receives the first manipulated variable and the second manipulated variable transmitted by the manipulated variable transmitter, and
a drive control unit that changes the distance between the operation body reference position and the omnidirectional moving body based on the first manipulated variable, and controls the drive portion to operate the omnidirectional moving body about the operation body reference position based on the second manipulated variable;
the omnidirectional moving body operation system further comprises a detector that detects a relative position relationship between the operation body reference position and the omnidirectional moving body; and
the first manipulated variable and second manipulated variable indicates a movement to a target position, which is represented in a coordinate system where an origin thereof is the operation body reference position, with respect to the relative position relationship detected by the detector.

14. An omnidirectional moving body operation method which operates the omnidirectional moving body in an omnidirectional moving body operation system that comprises an omnidirectional moving body, and an operation device communicates with the omnidirectional moving body and operates the omnidirectional moving body,
the method comprising:
outputting a manipulated variable related to a movement of a base body provided in the omnidirectional moving body;
communicating the manipulated variable;
detecting a relative position relationship between an operation body reference position, which represents a reference position for operating the omnidirectional moving body, and the omnidirectional moving body; and performing an omnidirectional drive control of the base body on a driving surface based on the manipulated variable which represents a movement to a target position, which is represented in a coordinate system where an origin thereof is the operation body reference position, with respect to the detected relative position relationship.

* * * * *